(12) United States Patent
Jin et al.

(10) Patent No.: US 11,588,524 B2
(45) Date of Patent: Feb. 21, 2023

(54) CHANNEL MEASUREMENT METHOD AND COMMUNICATIONS APPARATUS

(71) Applicant: HUAWEI TECHNOLOGIES CO., LTD., Shenzhen (CN)

(72) Inventors: Huangping Jin, Shanghai (CN); Zhimeng Zhong, Shanghai (CN); Haitan Yin, Shenzhen (CN); Xiaoyan Bi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/349,364

(22) Filed: Jun. 16, 2021

(65) Prior Publication Data
US 2021/0314035 A1   Oct. 7, 2021

Related U.S. Application Data

(63) Continuation of application No. PCT/CN2019/124510, filed on Dec. 11, 2019.

(30) Foreign Application Priority Data

Dec. 18, 2018   (CN) .......................... 201811551146.X

(51) Int. Cl.
*H04W 72/04*   (2009.01)
*H04B 7/0456*   (2017.01)
*H04B 7/0413*   (2017.01)

(52) U.S. Cl.
CPC ......... *H04B 7/0456* (2013.01); *H04B 7/0413* (2013.01); *H04W 72/042* (2013.01)

(58) Field of Classification Search
CPC ... H04L 5/0048; H04L 5/0023; H04L 5/0053; H04L 5/0051; H04L 5/0057;
(Continued)

(56) References Cited

U.S. PATENT DOCUMENTS 10,367,568 B1 * 7/2019 Nammi ................ H04B 7/0639
2019/0052529 A1 * 2/2019 Lei ...................... H04L 41/0816
(Continued)

FOREIGN PATENT DOCUMENTS

CN   107733485 A   2/2018
CN   107888265 A   4/2018
(Continued)

OTHER PUBLICATIONS

3GPP TS 38.214 V15.3 0 (Sep. 2018), "3rd Generation Partnership Project; Technical Specification Group Radio Access Network; NR; Physical layer procedures for data (Release 15)", 96 pages.

*Primary Examiner* — Eva Y Puente
(74) *Attorney, Agent, or Firm* — Maier & Maier, PLLC

(57) ABSTRACT

A channel measurement method and a communications apparatus. The method includes: a terminal device receives precoded reference signals from a network device, where the precoded reference signals are obtained by precoding reference signals based on K angle vectors; and generates and sends first indication information, where the first indication information is used to indicate P weighting coefficients corresponding to P angle-delay pairs, the P weighting coefficients are determined based on the precoded reference signals, each of the P angle-delay pairs includes one angle vector and one delay vector corresponding to the angle vector, a delay vector corresponding to each angle vector is preconfigured, each angle vector and the delay vector corresponding to each angle vector are obtained through uplink channel measurement, and the P angle-delay pairs and the P weighting coefficients corresponding to the P angle-delay pairs are used to determine a precoding matrix.

20 Claims, 6 Drawing Sheets

(58) Field of Classification Search
CPC . H04L 25/0224; H04L 1/0026; H04L 5/0055; H04L 25/0204; H04W 72/042; H04W 72/0446; H04W 72/0413; H04W 24/10; H04W 72/04; H04W 72/0453; H04W 88/08; H04W 72/0406; H04W 88/02; H04B 7/0456; H04B 7/0413; H04B 17/309; H04B 17/364; H04B 7/0417; H04B 7/0421; H04B 7/0469; H04B 7/0478; H04B 7/0695
USPC .......................................................... 375/267
See application file for complete search history.

(56) References Cited

U.S. PATENT DOCUMENTS

| | | | | |
|---|---|---|---|---|
| 2020/0091974 A1* | 3/2020 | Zhao | ..................... | H04B 7/0868 |
| 2021/0359731 A1* | 11/2021 | Sahraei | ................ | H04B 7/0426 |

FOREIGN PATENT DOCUMENTS

| | | | |
|---|---|---|---|
| CN | 108631891 A | 10/2018 | |
| CN | 108633107 A | 10/2018 | |
| WO | 2009084876 A2 | 7/2009 | |
| WO | 2012117374 A1 | 9/2012 | |
| WO | 2018129319 A1 | 7/2018 | |

* cited by examiner

CHANNEL MEASUREMENT METHOD AND COMMUNICATIONS APPARATUS

CROSS-REFERENCE TO RELATED APPLICATIONS

This application is a continuation of International Application No. PCT/CN2019/124510, filed on Dec. 11, 2019, which claims priority to Chinese Patent Application No. 201811551146.X, filed on Dec. 18, 2018. The disclosures of the aforementioned applications are hereby incorporated by reference in their entireties.

TECHNICAL FIELD

The embodiments relate to the wireless communications field, and more specifically, to a channel measurement method and a communications apparatus.

BACKGROUND

In a massive multiple-input multiple-output (MIMO) technology, a network device may reduce interference between a plurality of users and interference between a plurality of signal flows of one user through precoding. This helps improve signal quality, implement spatial multiplexing, and increase spectrum utilization.

A terminal device may, for example, determine a precoding matrix through downlink channel measurement, and expect to use feedback to enable the network device to obtain a precoding matrix that is the same as or similar to the precoding matrix determined by the terminal device. Specifically, the terminal device may indicate the precoding matrix, for example, by feeding back one or more beam vectors and a weighting coefficient corresponding to the one or more beam vectors. For details of the feedback of the terminal device, refer to a type II (type II) codebook feedback mode defined in the new radio (NR) protocol TS38.214.

However, such a feedback mode causes relatively high feedback overheads.

SUMMARY

The embodiments provide a channel measurement method and a communications apparatus, to reduce feedback overheads.

According to a first aspect, a channel measurement method is provided. The method may be performed by a terminal device, or may be performed by a chip disposed in the terminal device.

The method includes: receiving precoded reference signals, where the precoded reference signals are obtained by precoding reference signals based on K angle vectors; generating first indication information, where the first indication information is used to indicate P weighting coefficients corresponding to P angle-delay pairs, the P weighting coefficients are determined based on the precoded reference signals, each of the P angle-delay pairs includes one of the K angle vectors and one of one or more delay vectors corresponding to the one angle vector, one or more delay vectors corresponding to each angle vector are preconfigured, and the P angle-delay pairs and the P weighting coefficients corresponding to the P angle-delay pairs are used to determine a precoding matrix, where both K and P are positive integers; and sending the first indication information.

According to the foregoing solution, a network device may precode a downlink reference signal based on a predetermined angle vector, so that the terminal device can perform downlink channel measurement based on a precoded reference signal and a preconfigured delay vector. Because the precoded reference signal received by the terminal device is obtained through precoding based on the angle vector, and the delay vector is also preconfigured, the terminal device may not need to determine and feed back a space domain vector and a frequency domain vector (for example, the angle vector and the delay vector described above), but only needs to determine and feed back a weighting coefficient corresponding to each angle-delay pair. Therefore, a downlink channel measurement process performed by the terminal device is simplified, calculation complexity of the terminal device in the channel measurement process is reduced, and feedback overheads of the terminal device are reduced. In addition, a precoding matrix may be constructed based on a plurality of space domain vectors and a plurality of frequency domain vectors, so that the precoding matrix determined by the network device may adapt to a downlink channel. This still ensures relatively high feedback precision while reducing the feedback overheads. Moreover, precoding a downlink reference signal based on an angle vector can reduce a quantity of reference signal ports, thereby reducing pilot overheads.

With reference to the first aspect, in some implementations of the first aspect, the method may further include: receiving second indication information, where the second indication information is used to indicate the one or more delay vectors corresponding to each of the K angle vectors.

The network device may indicate a delay vector corresponding to each angle vector to the terminal device by using signaling. However, it may be understood that the foregoing manner in which the network device indicates a delay vector is merely a possible implementation, and shall not constitute any limitation the embodiments. The delay vector may alternatively be predefined, for example, defined in a protocol, or may be determined by the terminal device based on one or more previous downlink channel measurements. A specific delay vector configuration manner is not limited in the embodiments.

According to a second aspect, a channel measurement method is provided. The method may be performed by a network device, or may be performed by a chip disposed in the network device.

The method may include: sending precoded reference signals, where the precoded reference signals are obtained by precoding reference signals based on K angle vectors; receiving first indication information, where the first indication information is used to indicate P weighting coefficients corresponding to P angle-delay pairs, the P weighting coefficients are determined based on the precoded reference signals, each of the P angle-delay pairs includes one of the K angle vectors and one of one or more delay vectors corresponding to the one angle vector, one or more delay vectors corresponding to each angle vector are preconfigured, and the P angle-delay pairs and the P weighting coefficients corresponding to the P angle-delay pairs are used to determine a precoding matrix, where both K and P are positive integers; and determining the precoding matrix based on the first indication information.

According to the foregoing solution, the network device may precode a downlink reference signal based on a predetermined angle vector, so that a terminal device can perform downlink channel measurement based on a precoded reference signal and a preconfigured delay vector.

Because the precoded reference signal received by the terminal device is obtained through precoding based on the angle vector, and the delay vector is also preconfigured, the terminal device may not need to determine and feed back a space domain vector and a frequency domain vector (for example, the angle vector and the delay vector described above), but only needs to determine and feed back a weighting coefficient corresponding to each angle-delay pair. Therefore, a downlink channel measurement process performed by the terminal device is simplified, calculation complexity of the terminal device in the channel measurement process is reduced, and feedback overheads of the terminal device are reduced. In addition, a precoding matrix is constructed based on a plurality of space domain vectors and a plurality of frequency domain vectors, so that the precoding matrix determined by the network device can adapt to a downlink channel. This still ensures relatively high feedback precision while reducing the feedback overheads. Moreover, precoding a downlink reference signal based on an angle vector can reduce a quantity of reference signal ports, thereby reducing pilot overheads.

With reference to the second aspect, in some implementations of the second aspect, the method further includes: sending second indication information, where the second indication information is used to indicate the one or more delay vectors corresponding to each of the K angle vectors.

To be specific, the network device may indicate a delay vector corresponding to each angle vector to the terminal device by using signaling. However, it may be understood that the foregoing manner in which the network device indicates a delay vector is merely a possible implementation, and shall not constitute any limitation on the embodiments. The delay vector may alternatively be predefined, for example, defined in a protocol, or may be determined by the terminal device based on one or more previous downlink channel measurements. A specific delay vector configuration manner is not limited in the embodiments.

The second indication information may include K bitmaps, a $k^{th}$ bitmap in the K bitmaps is used to indicate $L_k$ delay vectors that are in a delay vector set and that correspond to a $k^{th}$ angle vector in the K angle vectors, and the delay vector set includes a plurality of delay vectors, where $L_k \geq 1$, and $L_k$ is an integer.

The network device may indicate, by using a bitmap, a delay vector corresponding to each angle vector. A length of each bitmap may be, for example, a quantity of delay vectors in the delay vector set.

The second indication information may include K indexes, a $k^{th}$ index in the K indexes is an index, in a delay vector set, of a combination of $L_k$ delay vectors corresponding to a $k^{th}$ angle vector in the K angle vectors, and the delay vector set includes a plurality of delay vectors, where $L_k \geq 1$, and $L_k$ is an integer.

The network device may indicate, by using an index of a combination of the one or more delay vectors corresponding to each angle vector, the one or more delay vectors corresponding to each angle vector.

The second indication information may further be used to indicate a quantity of delay vectors corresponding to each angle vector.

The network device and the terminal device may predefine a one-to-one correspondence between a plurality of delay vector combinations and a plurality of indexes. Combinations of a same quantity of delay vectors may correspond to one group of indexes. Indexes corresponding to combinations of different quantities of delay vectors may be repeated. This may reduce bit overheads caused by a plurality of indexes corresponding to a plurality of combinations. Therefore, the second indication information may further indicate the quantity of delay vectors, so that the terminal device accurately determines the indicated delay vector.

The second indication information is used to indicate an index of a combination of the P angle-delay pairs.

The one or more delay vectors corresponding to each angle vector may be from a same delay vector set. Therefore, the network device may combine each of the K angle vectors with a delay vector set in a predefined order, to obtain an angle-delay pair set. It may be understood that the combination of each of the K angle vectors and the delay vector set may be a logical combination, and is not necessarily a combination of an angle vector set and a delay vector set. Therefore, the angle-delay pair set may be a logical set, and the network device and the terminal device do not necessarily pre-store the angle delay pair set.

The network device may determine, based on a group of delay vectors corresponding to each angle vector, positions of K groups of delay vectors corresponding to the K angle vectors in K delay vector sets, and determine an index of a combination of the K groups of delay vectors. The index also implicitly indicates a plurality of angle-delay pairs corresponding to the K angles.

With reference to the first aspect or the second aspect, in some implementations, in the K angle vectors, one or more delay vectors corresponding to a first angle vector may be the same as one or more delay vectors corresponding to a second angle vector, and the first angle vector and the second angle vector may be any two angle vectors in the K angle vectors.

Each of the K angle vectors may correspond to one or more delay vectors indicated by the network device, for example, L delay vectors, to obtain an angle-delay pair used to construct the precoding matrix. In other words, the L delay vectors indicated by the network device may be shared by the K angle vectors.

The information used to indicate the delay vector corresponding to each angle vector may be generated and used for indication once, for example, by using one bitmap, an index of a combination of one group of delay vectors, an index of one group of delay vectors, or an index of a combination of one group of angle-delay pairs.

With reference to the first aspect or the second aspect, in some implementations, the K angle vectors and the one or more delay vectors corresponding to each angle vector may be determined through uplink channel measurement.

Based on reciprocity between uplink and downlink channels, the network device loads a reciprocal angle vector to a downlink reference signal for downlink channel pre-compensation, so that the terminal device determines, based on a received precoded reference signal, information about a downlink channel that does not have complete reciprocity. Therefore, a downlink channel measurement process performed by the terminal device is simplified, calculation complexity of the terminal device in the channel measurement process is reduced, and relatively high feedback precision can be ensured.

It may be understood that the foregoing manner of determining the K angle vectors based on the uplink channel is merely a possible implementation, and shall not constitute any limitation on the embodiments. The angle vector may alternatively be predefined, for example, defined in a protocol, or may be determined by the network device based on a feedback of one or more previous downlink channel measurements. A specific manner in which the network device determines an angle vector is not limited in the embodiments.

With reference to the first aspect or the second aspect, in some implementations, the P weighting coefficients include one or more weighting coefficients fed back for each of the K angle vectors; and for the $k^{th}$ angle vector in the K angle vectors, the first indication information is used to indicate $L_k$ weighting coefficients, the $L_k$ weighting coefficients correspond to $L_k$ angle-delay pairs in the P angle-delay pairs, and each of the $L_k$ angle-delay pairs includes the $k^{th}$ angle vector and one of the $L_k$ delay vectors corresponding to the $k^{th}$ angle vector.

Regardless of whether delay vectors corresponding to any two of the K angle vectors are the same, each of the P angle-delay pairs may correspond to one weighting coefficient. The terminal device may determine, based on a received precoded reference signal obtained through precoding based on each angle vector, the one or more weighting coefficients corresponding to each angle vector. When the angle vectors correspond to same delay vectors, the angle vectors may correspond to a same quantity of weighting coefficients.

According to a third aspect, a channel measurement method is provided. The method may be performed by a terminal device, or may be performed by a chip disposed in the terminal device.

The method may include: receiving precoded reference signals, where the precoded reference signals are obtained by precoding reference signals based on L delay vectors; generating third indication information, where the third indication information is used to indicate P weighting coefficients corresponding to P angle-delay pairs, the P weighting coefficients are determined based on the precoded reference signals, each of the P angle-delay pairs includes one of the L delay vectors and one of one or more angle vectors corresponding to the one delay vector, one or more angle vectors corresponding to each delay vector are preconfigured, and the P angle-delay pairs and the P weighting coefficients corresponding to the P angle-delay pairs are used to determine a precoding matrix, where both K and P are positive integers; and sending the third indication information.

According to the foregoing solution, a network device may precode a downlink reference signal based on a predetermined delay vector, so that the terminal device can perform downlink channel measurement based on a precoded reference signal and a preconfigured angle vector. Because the precoded reference signal received by the terminal device is obtained through precoding based on the delay vector, and the angle vector is also preconfigured, the terminal device may not need to feed back a space domain vector and a frequency domain vector (for example, the angle vector and the delay vector described above), but only needs to feed back a weighting coefficient corresponding to each angle-delay pair. Therefore, a downlink channel measurement process performed by the terminal device is simplified, calculation complexity of the terminal device in the channel measurement process is reduced, and feedback overheads of the terminal device are reduced. In addition, a precoding matrix may be constructed based on a plurality of space domain vectors and a plurality of frequency domain vectors, so that the precoding matrix determined by the network device can adapt to a downlink channel. This still ensures relatively high feedback precision while reducing the feedback overheads.

With reference to the third aspect, in some implementations of the third aspect, the method further includes: receiving fourth indication information, where the fourth indication information is used to indicate the one or more angle vectors corresponding to each of the L delay vectors.

The the network device may indicate an angle vector corresponding to each delay vector to the terminal device by using signaling. However, it may be understood that the foregoing manner in which the network device indicates an angle vector is merely a possible implementation, and shall not constitute any limitation on the embodiments. For example, the angle vector may alternatively be predefined, for example, defined in a protocol, or may be determined by the terminal device based on one or more previous downlink channel measurements. A specific angle vector configuration manner is not limited in the embodiments.

With reference to the third aspect, in some implementations of the third aspect, the method further includes: receiving fifth indication information, where the fifth indication information is used to configure one or more reference signal resources, the one or more reference signal resources are used to carry the precoded reference signals, precoded reference signals carried on a same reference signal resource correspond to one or more ports, and when the fifth indication information is used to configure a plurality of reference signal resources, angle-delay pairs corresponding to precoded reference signals carried on the reference signal resources are different, and the reference signal resources do not overlap in frequency domain and/or time domain.

The network device may configure one or more reference signal resources in an existing reference signal resource configuration manner. Reference signals carried on the one or more reference resources all may be used for channel measurement. A quantity of ports corresponding to the precoded reference signals carried on each reference signal resource may be counted in a unit of a resource block (RB). Therefore, precoded reference signals carried on different reference signal resources may correspond to different angle vectors and/or delay vectors. Port numbers corresponding to precoded reference signals carried on different reference signal resources may be the same or may be different.

With reference to the third aspect, in some implementations of the third aspect, the method further includes: receiving sixth indication information, where the sixth indication information is used to configure one reference signal resource, the reference signal resource is used to carry the precoded reference signals, and port numbers corresponding to the precoded reference signals carried on at least two resource blocks on the reference signal resource are different.

Alternatively, the network device may configure, in a manner different from the existing reference resource configuration manner, one reference signal resource for precoded reference signals corresponding to a plurality of angle vectors and a plurality of delay vectors. A quantity of ports corresponding to the precoded reference signals carried on the reference signal resource may be counted across RBs. Therefore, precoded reference signals carried on at least two RBs on a same reference signal resource may correspond to different angle vectors and/or delay vectors. On a same reference signal resource, different transmit antenna ports and/or delay vectors may be distinguished by using different port numbers.

According to a fourth aspect, a channel measurement method is provided. The method may be performed by a network device, or may be performed by a chip disposed in the network device.

The method includes: sending precoded reference signals, where the precoded reference signals are obtained by precoding reference signals based on L delay vectors; receiving third indication information, where the third indication information is used to indicate P weighting coefficients corresponding to P angle-delay pairs, the P weighting coefficients are determined based on the precoded reference signals, each of the P angle-delay pairs includes one of the L delay vectors and one of one or more angle vectors corresponding to the one delay vector, one or more angle vectors corresponding to each delay vector are preconfigured, and the P angle-delay pairs and the P weighting coefficients corresponding to the P angle-delay pairs are used to determine a precoding matrix, where both L and P are positive integers; and determining the precoding matrix based on the third indication information.

According to the foregoing solution, the network device may precode a downlink reference signal based on a predetermined delay vector, so that a terminal device can perform downlink channel measurement based on a precoded reference signal and a preconfigured angle vector. Because the precoded reference signal received by the terminal device is obtained through precoding based on the delay vector, and the angle vector is also preconfigured, the terminal device may not need to feed back a space domain vector and a frequency domain vector (for example, the angle vector and the delay vector described above), but only needs to feed back a weighting coefficient corresponding to each angle-delay pair. Therefore, a downlink channel measurement process performed by the terminal device is simplified, calculation complexity of the terminal device in the channel measurement process is reduced, and feedback overheads of the terminal device are reduced. In addition, a precoding matrix is constructed based on a plurality of space domain vectors and a plurality of frequency domain vectors, so that the precoding matrix determined by the network device can adapt to a downlink channel. This still ensures relatively high feedback precision while reducing the feedback overheads.

With reference to the fourth aspect, in some implementations of the fourth aspect, the method further includes: sending fourth indication information, where the fourth indication information is used to indicate the one or more angle vectors corresponding to each of the L delay vectors.

The network device may indicate an angle vector corresponding to each delay vector to the terminal device by using signaling. However, it may be understood that the foregoing manner in which the network device indicates an angle vector is merely a possible implementation, and shall not constitute any limitation on the embodiments. For example, the angle vector may alternatively be predefined, for example, defined in a protocol, or may be determined by the terminal device based on one or more previous downlink channel measurements. A specific angle vector configuration manner is not limited in the embodiments.

With reference to the fourth aspect, in some implementations of the fourth aspect, the method further includes: sending fifth indication information, where the fifth indication information is used to configure one or more reference signal resources, the one or more reference signal resources are used to carry the precoded reference signals, precoded reference signals carried on a same reference signal resource correspond to one or more ports, and when the fifth indication information is used to configure a plurality of reference signal resources, angle-delay pairs corresponding to precoded reference signals carried on the reference signal resources are different, and the reference signal resources do not overlap in frequency domain and/or time domain.

The network device may configure one or more reference signal resources in an existing reference signal resource configuration manner. Reference signals carried on the one or more reference resources all may be used for channel measurement. A quantity of ports corresponding to the precoded reference signals carried on each reference signal resource may be counted in a unit of an RB. Therefore, precoded reference signals carried on different reference signal resources may correspond to different angle vectors and/or delay vectors. Port numbers corresponding to precoded reference signals carried on different reference signal resources may be the same or may be different.

With reference to the fourth aspect, in some implementations of the fourth aspect, the method further includes: sending sixth indication information, where the sixth indication information is used to configure one reference signal resource, the reference signal resource is used to carry the precoded reference signals, and port numbers corresponding to the precoded reference signals carried on at least two resource blocks on the reference signal resource are different.

Alternatively, the network device may configure, in a manner different from the existing reference resource configuration manner, one reference signal resource for precoded reference signals corresponding to a plurality of angle vectors and a plurality of delay vectors. A quantity of ports corresponding to the precoded reference signals carried on the reference signal resource may be counted across RBs. Therefore, precoded reference signals carried on at least two RBs on a same reference signal resource may correspond to different angle vectors and/or delay vectors. On a same reference signal resource, different transmit antenna ports and/or delay vectors may be distinguished by using different port numbers.

The fourth indication information may include L bitmaps, an $l^{th}$ bitmap in the L bitmaps is used to indicate $K_l$ angle vectors that are in an angle vector set and that correspond to an $l^{th}$ delay vector in the L delay vectors, and the angle vector set includes a plurality of angle vectors, where $K_l \geq 1$, and $K_l$ is an integer.

To be specific, the network device may indicate, by using a bitmap, an angle vector corresponding to each delay vector. A length of each bitmap may be, for example, a quantity of angle vectors in the angle vector set.

With reference to the third aspect or the fourth aspect, in some implementations, the fourth indication information includes L indexes, an $l^{th}$ index in the L indexes is an index, in an angle vector set, of a combination of $K_l$ angle vectors corresponding to an $l^{th}$ delay vector in the L delay vectors, and the angle vector set includes a plurality of angle vectors, where $K_l \geq 1$, and $K_l$ is an integer.

The network device may indicate, by using an index of a combination of the one or more angle vectors corresponding to each delay vector, the one or more angle vectors corresponding to each delay vector.

The fourth indication information may be further used to indicate a quantity of angle vectors corresponding to each delay vector.

The network device and the terminal device may predefine a one-to-one correspondence between a plurality angle vector combinations and a plurality of indexes. Combinations of a same quantity of angle vectors may correspond to one group of indexes. Therefore, indexes corresponding to combinations of different quantities of angle vectors may be repeated. This may reduce bit overheads caused by a plurality of indexes corresponding to a plurality of combinations. Therefore, the fourth indication information may further indicate the quantity of angle vectors, so that the terminal device accurately determines the indicated angle vector.

The fourth indication information may be used to indicate an index of the P angle-delay pairs.

The one or more angle vectors corresponding to each delay vector are from a same angle vector set. Therefore, the network device may combine each of the L delay vectors with an angle vector in an angle vector set in a predefined order, to obtain an angle-delay pair set. It may be understood that the combination of each of the L delay vectors and an angle vector in the angle vector set may be a logical combination, and is not necessarily a combination of a delay vector and an angle vector in the angle vector set. Therefore, the angle-delay pair set may be a logical set, and the network device and the terminal device do not necessarily pre-store the angle delay pair set.

The network device may determine, based on a group of angle vectors corresponding to each angle vector, positions of K groups of angle vectors corresponding to the L delay vectors in K angle vector sets, and determine an index of a combination of the K groups of angle vectors. The index may also implicitly indicate a plurality of angle-delay pairs corresponding to the L delays With reference to the third aspect or the fourth aspect, in some implementations, in the L delay vectors, one or more angle vectors corresponding to a first delay vector are the same as one or more angle vectors corresponding to a second delay vector, and the first delay vector and the second delay vector are any two delay vectors in the L delay vectors.

In other words, each of the L delay vectors may correspond to one or more angle vectors indicated by the network device, for example, K angle vectors, to obtain an angle-delay pair used to construct the precoding matrix. In other words, the K angle vectors indicated by the network device may be shared by the L delay vectors.

The information used to indicate the angle vector corresponding to each delay vector may be generated and used for indication once, for example, by using one bitmap, an index of a combination of one group of angle vectors, an index of one group of angle vectors, or an index of a combination of one group of angle-delay pairs.

With reference to the third aspect or the fourth aspect, in some implementations, the L delay vectors and the one or more angle vectors corresponding to each delay vector may be determined through uplink channel measurement.

Based on reciprocity between uplink and downlink channels, the network device loads a reciprocal delay vector to a downlink reference signal for downlink channel pre-compensation, so that the terminal device determines, based on a received precoded reference signal, information about a downlink channel that does not have complete reciprocity. Therefore, a downlink channel measurement process performed by the terminal device is simplified, calculation complexity of the terminal device in the channel measurement process is reduced, and relatively high feedback precision can be ensured.

It may be understood that determining the L delay vectors based on the uplink channel is merely a possible implementation, and shall not constitute any limitation on the embodiments. The delay vector may alternatively be predefined, for example, defined in a protocol, or may be determined by the network device based on a feedback of one or more previous downlink channel measurements. A specific manner in which the network device determines a delay vector is not limited in the embodiments.

With reference to the third aspect or the fourth aspect, in some implementations, the P weighting coefficients include one or more weighting coefficients fed back for each of the L delay vectors; and for the $l^{th}$ delay vector in the L delay vectors, the third indication information is used to indicate $K_l$ weighting coefficients, the $K_l$ weighting coefficients correspond to $K_l$ angle-delay pairs in the P angle-delay pairs, and each of the $K_l$ angle-delay pairs includes the $l^{th}$ delay vector and one of the $K_l$ angle vectors.

Regardless of whether angle vectors corresponding to any two of the L delay vectors are the same, each of the P angle-delay pairs may correspond to one weighting coefficient. The terminal device may determine, based on a received precoded reference signal obtained through precoding based on each delay vector, the one or more weighting coefficients corresponding to each delay vector. When the delay vectors correspond to same angle vectors, the delay vectors may correspond to a same quantity of weighting coefficients.

With reference to any one of the first aspect to the fourth aspect, in some implementations, the P weighting coefficients correspond to one receive antenna.

The first indication information and the third indication information may be used for feedback based on the receive antenna. The terminal device may feed back, based on the received precoded reference signals, the P weighting coefficients corresponding to each receive antenna. The network device may reconstruct the downlink channel based on the weighting coefficients corresponding to each receive antenna, to determine the precoding matrix.

With reference to any one of the first aspect to the fourth aspect, in some implementations, the P weighting coefficients correspond to one transport layer.

The first indication information and the third indication information may be used for feedback based on the transport layer. The terminal device may determine a quantity of transport layers based on the received precoded reference signals, and feed back the P weighting coefficients based on each transport layer. The network device may directly determine the precoding matrix based on the weighting coefficients corresponding to each transport layer.

According to a fifth aspect, a communications apparatus is provided. The communications apparatus includes modules or units configured to perform the method according to any one of the first aspect or the third aspect and the possible implementations of the first aspect or the third aspect.

According to a sixth aspect, a communications apparatus is provided. The communications apparatus includes a processor. The processor is coupled to a memory, and may be configured to execute instructions in the memory, to implement the method according to any one of the first aspect or the third aspect and the possible implementations of the first aspect or the third aspect. The communications apparatus may further include the memory. The communications apparatus may further include a communications interface, and the processor may be coupled to the communications interface.

In an implementation, the communications apparatus may be a terminal device. When the communications apparatus is the terminal device, the communications interface may be a transceiver or an input/output interface.

In another implementation, the communications apparatus mat be a chip disposed in a terminal device. When the communications apparatus is the chip disposed in the terminal device, the communications interface may be an input/output interface.

The transceiver may be a transceiver circuit. The input/output interface may be an input/output circuit.

According to a seventh aspect, a communications apparatus is provided. The communications apparatus may include modules or units configured to perform the method according to any one of the second aspect or the fourth aspect and the possible implementations of the second aspect or the fourth aspect.

According to an eighth aspect, a communications apparatus is provided. The communications apparatus may include a processor. The processor may be coupled to a memory, and may be configured to execute instructions in the memory, to implement the method according to any one of the second aspect or the fourth aspect and the possible implementations of the second aspect or the fourth aspect. The communications apparatus may further include the memory. The communications apparatus may further include a communications interface, and the processor may be coupled to the communications interface.

In an implementation, the communications apparatus may be a network device. When the communications apparatus is the network device, the communications interface may be a transceiver or an input/output interface.

In another implementation, the communications apparatus may be a chip disposed in a network device. When the communications apparatus is the chip disposed in the network device, the communications interface may be an input/output interface.

The transceiver may be a transceiver circuit. The input/output interface may be an input/output circuit.

According to a ninth aspect, a processor is provided. The processor may include an input circuit, an output circuit, and a processing circuit. The processing circuit may be configured to: receive a signal through the input circuit, and transmit a signal through the output circuit, so that the processor is enabled to perform the methods according to any one of the first aspect to the fourth aspect and the possible implementations of the first aspect to the fourth aspect.

In an implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, and a signal that is output by the output circuit may be output to, for example, but not limited to, a transmitter, and transmitted by the transmitter. In addition, the input circuit and the output circuit may be a same circuit. The circuit may be used as the input circuit and the output circuit at different moments. Specific implementations of the processor and the circuits are not limited in the embodiments.

According to a tenth aspect, a processing apparatus is provided. The processing apparatus may include a processor and a memory. The processor may be configured to: read instructions stored in the memory, receive a signal through a receiver, and transmit a signal through a transmitter, to perform the methods according to any one of the first aspect to the fourth aspect and the possible implementations of the first aspect to the fourth aspect.

There may be one or more processors, and there may be one or more memories.

The memory may be integrated with the processor, or the memory and the processor may be separately disposed.

In an implementation process, the memory may be a non-transitory memory, such as a read-only memory (ROM). The memory and the processor may be integrated into one chip, or may be disposed in different chips. A type of the memory and a manner in which the memory and the processor are disposed are not limited in the embodiments.

It may be understood that a related data exchange process, for example, sending of indication information, may be a process of outputting the indication information from the processor, and receiving of capability information, may be a process of receiving the input capability information by the processor. Data that is output by the processor may be output to the transmitter, and input data received by the processor may be from the receiver. The transmitter and the receiver may be collectively referred to as a transceiver.

The processing apparatus according to the tenth aspect may be one or more chips. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory. The memory may be integrated into the processor, or may be located outside the processor and exist independently.

According to an eleventh aspect, a computer program product is provided. The computer program product includes computer programs (which are also referred to as code or instructions), and when the computer programs are run, a computer is enabled to perform the methods according to any one of the first aspect to the fourth aspect and the possible implementations of the first aspect to the fourth aspect.

According to a twelfth aspect, a computer-readable medium is provided. The computer-readable medium stores computer programs (which are also referred to as code or instructions), and when the computer programs are run on a computer, the computer is enabled to perform the methods according to any one of the first aspect to the fourth aspect and the possible implementations of the first aspect to the fourth aspect.

According to a thirteenth aspect, a communications system is provided. The communications system includes the foregoing network device and the foregoing terminal device.

DETAILED DESCRIPTION OF THE EMBODIMENTS

The following describes solutions in the embodiments with reference to the accompanying drawings.

The solutions in the embodiments may be applied to various communications systems, for example, a global system for mobile communications (GSM), a code division multiple access (CDMA) system, a wideband CDMA (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a NR system.

Figure 1:
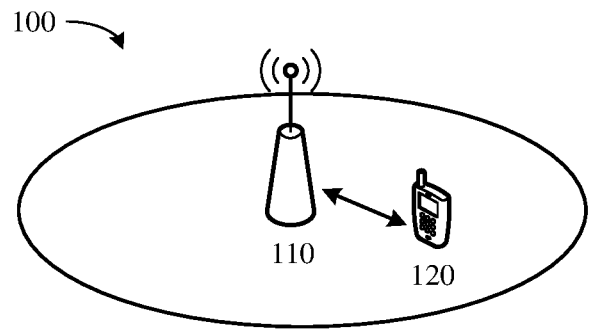
FIG. 1 is a schematic diagram of a communications system to which a channel measurement method according to an embodiment.

For ease of understanding the embodiments, a communications system 100 shown in FIG. 1 is first used as an example to describe in detail a communications system to which the embodiments are applicable. FIG. 1 is a schematic diagram of the communications system 100 in which a precoding vector indication method is used, according to an embodiment. As shown in FIG. 1, the communications system 100 may include at least one network device, for example, a network device 110. The communications system 100 may further include at least one terminal device, for example, a terminal device 120 shown in FIG. 1. The network device 110 may communicate with the terminal device 120 through a radio link. A plurality of antennas may be configured for each communications device such as the network device 110 or the terminal device 120. For each communications device in the communications system 100, the plurality of configured antennas may include at least one transmit antenna for signal sending and at least one receive antenna for signal receiving. Therefore, the communications devices in the communications system 100, for example, the network device 110 and the terminal device 120, may communicate with each other by using a multi-antenna technology.

It may be understood that the network device in the communications system 100 may be any device having a wireless transceiver function or a chip that may be disposed in the device. The device may include, but is not limited to, an evolved NodeB (eNB), a radio network controller (RNC), a NodeB, a base station controller (BSC), a base transceiver station (BTS), a home evolved NodeB (HNB), a baseband unit (BBU), an access point (AP) in a wireless fidelity (WIFI) system, a wireless relay node, a wireless backhaul node, a transmission point (TP), a transmission reception point (TRP), and the like. Alternatively, the device may be a next generation NodeB (gNB) or TP in a 5G system such as an NR system, or may be one antenna panel or a group of antenna panels (including a plurality of antenna panels) of a base station in a 5G system, or may be a network node such as a BBU or a distributed unit (DU) that constitutes a gNB or a TP.

In some deployments, the gNB may include a centralized unit (CU) and a DU. The gNB may further include a radio frequency unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in such an architecture, higher layer signaling such as RRC layer signaling or PHCP layer signaling may also be considered as being sent by the DU or sent by the DU and the RU. It may be understood that the network device may be a CU node, a DU node, or a device including a CU node and a DU node. In addition, the CU may be classified as a network device in a radio access network (RAN), or the CU may be classified as a network device in a core network CN).

It may be further understood that the terminal device in the communications system 100 may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments may be a mobile phone, a tablet computer, a computer having a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in the embodiments.

It may be further understood that FIG. 1 is merely a simplified schematic diagram used as an example for ease of understanding. The communications system 100 may further include another network device or another terminal device, which is not shown in FIG. 1.

For ease of understanding the embodiments, the following briefly describes a process of processing a downlink signal at a physical layer before the downlink signal is sent. It may be understood that the process of processing a downlink signal described below may be performed by the network device, or may be performed by a chip disposed in the network device. For ease of description, the network device and the chip disposed in the network device are collectively referred to as a network device below.

The network device may process a codeword on a physical channel. The codeword may be a coded bit obtained through coding (for example, channel coding). The codeword is scrambled to generate a scrambled bit. Modulation mapping is performed on the scrambled bit, to obtain a modulated symbol. The modulated symbol is mapped to a plurality of layers or transport layers through layer mapping. The modulated symbol that undergoes the layer mapping is precoded, to obtain a precoded signal. The precoded signal is mapped to a plurality of resource elements (RE) through RE mapping. Then, these REs are transmitted through an antenna port after orthogonal frequency division multiplexing (OFDM) modulation.

It may be understood that the process of processing a downlink signal described above is merely an example for description, and shall not constitute any limitation on the embodiments. For a process of processing a downlink signal, refer to the conventional technology. For brevity, detailed descriptions of the specific process are omitted herein.

For ease of understanding the embodiments of the embodiments, the following briefly describes several terms used in the embodiments.

1. Precoding technology: When a channel state is known, the network device may process a to-be-sent signal by using a precoding matrix that matches the channel state, so that a precoded to-be-sent signal adapts to a channel, thereby reducing complexity of eliminating inter-channel impact by a receiving device, and improving received signal quality (for example, a signal to interference plus noise ratio (SINR)) by precoding the to-be-sent signal. Therefore, the precoding technology may implement transmission between a sending device and a plurality of receiving devices on a same time-frequency resource, in other words, implement multi-user MIMO (MU-MIMO). It may be understood that related descriptions of the precoding technology are merely examples for ease of understanding. In an exemplary implementation process, the sending device may alternatively perform precoding in another manner. For example, when channel information (for example, a channel matrix) cannot be learned of, precoding is performed by using a preset precoding matrix or through weighting. For brevity, specific content thereof is not described.

2. Channel reciprocity: In a TDD mode, signals are transmitted between uplink and downlink channels on a same frequency domain resource but different time domain resources. Within a relatively short time (for example, a channel propagation coherence time), it may be considered that the signals on the uplink and downlink channels experience same channel fading. This is reciprocity between the uplink and downlink channels. Based on the reciprocity between the uplink and downlink channels, the network device may measure the uplink channel based on an uplink reference signal such as a sounding reference signal (SRS), and may estimate the downlink channel based on the uplink channel, so that a precoding matrix used for downlink transmission can be determined.

However, in a frequency division duplex (FDD) mode, because a band interval between the uplink and downlink channels is far greater than a coherence bandwidth, and the uplink and downlink channels do not have complete reciprocity, the precoding matrix that is used for downlink transmission and that is determined based on the uplink channel may not adapt to the downlink channel. However, in the FDD mode, the uplink and downlink channels may still have partial reciprocity, for example, angle reciprocity and delay reciprocity. Therefore, an angle and a delay may also be referred to as reciprocity parameters.

When a signal is transmitted through a radio channel, the signal may arrive at a receive antenna from a transmit antenna through a plurality of paths. A multipath delay causes frequency selective fading, that is, a frequency domain channel change. The delay is a transmission time of a radio signal on different transmission paths, is determined based on a distance and a speed, and is unrelated to frequency domain of the radio signal. When a signal is transmitted on different transmission paths, there are different transmission delays due to different distances. Therefore, delays on the uplink and downlink channels in the FDD mode may be considered to be the same, in other words, reciprocal.

In addition, the angle may be an angle of arrival (AOA) at which a signal arrives at a receive antenna through a radio channel, or may be an angle of departure (AOD) at which a signal is transmitted through a transmit antenna. In the embodiments, the angle may be an AOA at which an uplink signal arrives at the network device, or may be an AOD at which the network device transmits a downlink signal. The AOA of the uplink reference signal and the AOD of the downlink reference signal may be considered to be the same, in other words, reciprocal.

Therefore, there is angle reciprocity between the uplink and downlink channels in the FDD mode.

3. Reference signal: The reference signal may also be referred to as a pilot, a reference sequence, or the like. In the embodiments, the reference signal may be a reference signal used for channel measurement. For example, the reference signal may be a channel state information reference signal (CSI-RS) used for downlink channel measurement, or may be a sounding reference signal (SRS) used for uplink channel measurement. It may be understood that the foregoing enumerated reference signals are merely examples, and shall not constitute any limitation on the embodiments. The embodiments do not exclude a possibility that another reference signal is defined in a future protocol to implement a same or similar function.

A precoded reference signal may be a reference signal obtained by precoding a reference signal. The precoding may specifically include beamforming and/or phase rotation. The beamforming may be implemented, for example, by precoding a downlink reference signal based on one or more angle vectors, and the phase rotation may be implemented, for example, by precoding a downlink reference signal based on one or more delay vectors.

In the embodiments, for ease of distinguishing and description, a reference signal obtained through precoding such as beamforming and/or phase rotation is referred to as a precoded reference signal, and a reference signal that is not precoded is referred to as a reference signal for short.

In the embodiments, precoding a downlink reference signal based on one or more angle vectors may also mean loading the one or more angle vectors to the downlink reference signal to implement beamforming, and precoding a downlink reference signal based on one or more delay vectors may also mean loading the one or more delay vectors to the downlink reference signal to implement phase rotation.

4. Port: The port may be understood as a virtual antenna identified by the receiving device. In the embodiments, the port may be a transmit antenna port. For example, a reference signal corresponding to each port may be a reference signal that is not precoded, or may be a precoded reference signal obtained by precoding a reference signal based on one delay vector. Alternatively, the port may be a reference signal port obtained after beamforming. For example, a reference signal corresponding to each port may be a pre-coded reference signal obtained by precoding a reference signal based on one angle vector, or may be a precoded reference signal obtained by precoding a reference signal based on one angle vector and one delay vector. The signal corresponding to each port may be transmitted through one or more RBs.

The transmit antenna port may be an actually independent sending unit (TxRU). It may be understood that, if space domain precoding is performed on a reference signal, a quantity of ports may be a quantity of reference signal ports, and the quantity of reference signal ports may be less than a quantity of transmit antenna ports.

In the following embodiments, when the transmit antenna port is involved, the quantity of transmit antenna ports may be a quantity of ports on which no space domain precoding is performed, that is, a quantity of actually independent sending units. When the port is involved, in different embodiments, the port may be a transmit antenna port, or may be a reference signal port. A specific meaning expressed by the port may be determined according to a specific embodiment.

5. Angle vector: The angle vector may be understood as a precoding vector used to perform beamforming on a reference signal. A transmitted reference signal may have specific space directivity through beamforming. Therefore, a process of precoding a reference signal based on an angle vector may also be considered as a process of performing space domain (or space domain for short) precoding.

A quantity of ports corresponding to precoded reference signals obtained by precoding reference signals based on one or more angle vectors is the same as a quantity of the angle vectors. When a quantity K of angle vectors is less than a quantity T of transmit antennas, antenna port dimension reduction may be implemented through space domain precoding, thereby reducing pilot overheads.

An angle vector length may be T, where T is a quantity of transmit antenna ports in one polarization direction, T≥1, and T is an integer.

The angle vector may be obtained from a discrete Fourier transform (DFT) matrix, for example, $$v_{i_1,i_2} = \left[ u_{i_2} \; e^{j\frac{2\pi i_1}{O_1 I_1}} u_{i_2} \; \ldots \; e^{j\frac{2\pi i_1 (I_1-1)}{O_1 I_1}} u_{i_2} \right]^T$$

$$u_{i_2} = \begin{cases} \left[ 1 \; e^{j\frac{2\pi i_2}{O_2 I_2}} \; \ldots \; e^{j\frac{2\pi i_2 (I_2-1)}{O_2 I_2}} \right] & I_2 > 1 \\ 1 & I_2 = 1 \end{cases}.$$

Herein, $I_1$ is a quantity of antenna ports in a same polarization direction that are included in each column (or row) in an antenna array, and $I_2$ is a quantity of antenna ports in the same polarization direction that are included in each row (or column) in the antenna array. In an embodiment, $T=I_1 \times I_2$. In addition, $O_1$ and $O_2$ are oversampling factors; and $i_1$ and $i_2$ satisfy: $0 \leq i_1 \leq (O_1 \times I_1 - 1)$, and $0 \leq i_2 \leq (O_2 \times I_2 - 1)$.

The angle vector may be a steering vector in a uniform linear array (ULA), for example, $$a(\theta_k) = \begin{bmatrix} 1 \\ e^{j\frac{2\pi}{\lambda} \cos\theta_k d} \\ \vdots \\ e^{j\frac{2\pi}{\lambda} \cos\theta_k (T-1) d} \end{bmatrix}.$$

Herein, $\theta_k$ is an angle, where k=1, 2, . . . , or K, and K represents a quantity of angle vectors; $\lambda$ is a wavelength; and d is an antenna spacing.

The steering vector may represent a phase difference between responses of angles of arrival of one path on different antennas. The steering vector $a(\theta_k)$ and the vector $v_{i_1,i_2}$ in the DFT matrix satisfy:

$$\cos\theta_k d = \frac{i_1}{O_1 I_1}.$$

The angle vector may be a steering vector in a uniform plane array (UPA). The steering vector may be, for example, a steering vector including information about a horizontal angle and a pitch angle, for example, $$a(\theta_k, \varphi_k) = \begin{bmatrix} e^{j\frac{2\pi}{\lambda} u_k p_1} \\ e^{j\frac{2\pi}{\lambda} u_k p_2} \\ \vdots \\ e^{j\frac{2\pi}{\lambda} u_k p_T} \end{bmatrix}.$$

Herein, $\theta_k$ is a horizontal angle; $\varphi_k$ is a pitch angle; $p_t$ is three-dimensional coordinates of a $t^{th}$ transmit antenna port, where t=1, 2, . . . , or T; and $u_k$ is a unit spherical basis vector corresponding to a $k^{th}$ angle: $u_k = [\sin \varphi_k \cos \varphi_k \sin \varphi_k \sin \varphi_k \cos \varphi_k]$.

For ease of description below, the angle vector is denoted as $a(\theta_k)$.

It is assumed that a transmit antenna is a single-polarized antenna, a quantity of transmit antennas is T, and a quantity of frequency domain units is N, where N≥1, and N is an integer. In this case, for one receive antenna, a channel may be a matrix whose dimension is N×T. If space domain precoding is performed on a reference signal based on one angle vector, the angle vector may be loaded to the reference signal. Because a dimension of the angle vector is T×1, for one receive antenna, a dimension of a channel on which precoding is performed may be N×1, in other words, a received precoded reference signal may be represented as a matrix whose dimension is N×1.

Because the reference signal to which the angle vector is loaded may be transmitted to the terminal device through the downlink channel, a channel measured by the terminal device based on the received precoded reference signal may be equivalent to a channel to which the angle vector is loaded. For example, the angle vector $a(\theta_k)$ is loaded to the downlink channel V, which may be expressed as $Va(\theta_k)$.

Therefore, if space domain precoding is performed on a reference signal based on one angle vector, for each frequency domain unit on each receive antenna, a dimension of a channel obtained through estimation based on a precoded reference signal may be 1×1.

It may be understood that the angle vector is a form proposed in the embodiments to represent an angle. The angle vector is named only for ease of distinguishing from a delay, and shall not constitute any limitation on the embodiments. The embodiments do not exclude a possibility that another name is defined in a future protocol to represent a same or similar meaning.

6. Delay vector: The delay vector is a vector proposed in in the embodiments to indicate a change rule of a channel in the frequency domain. As described above, the multipath delay causes frequency selective fading. It may be understood from Fourier transform that a time delay of a signal in time domain may be equivalent to a phase gradient in frequency domain.

For a signal g (t), the signal may be transformed in frequency domain through Fourier transform:

$$F(g(t)) = \int_{-\infty}^{+\infty} g(t) e^{j\omega t} dt;$$

and for a signal g(t−t₀), the signal may be transformed in frequency domain through Fourier transform:

$$F(g(t - t_0)) = \int_{-\infty}^{+\infty} g(t - t_0) e^{j\omega t} dt = e^{j\omega t_0} F(g(t)).$$

Herein, ω is a frequency variable, where different frequencies correspond to different phase rotations; and t and t−t₀ indicate delays.

A signal having the two delays may be represented as $x(t)=g(t)+g(t-t_0)$. Therefore, the following frequency variable function may be obtained: $X(\omega)=g(\omega)(1+e^{j\omega t_0})$. If $g(\omega)\equiv 1$, $X(\omega)=1+e^{j\omega t_0}$. Therefore, two signals having different delays cause frequency domain selective fading.

Because a phase change of a channel on each frequency domain unit is related to a delay, a phase change rule of the channel on each frequency domain unit may be represented by using a delay vector, in other words, the delay vector may be used to represent a channel delay characteristic.

Precoding a reference signal based on a delay vector may mean performing phase rotation on each frequency domain unit in frequency domain based on an element in the delay vector, to use a precoded reference signal for pre-compensation for a frequency selective characteristic caused by the multipath delay. Therefore, a process of precoding a reference signal based on a delay vector may be considered as a process of performing frequency domain precoding.

Precoding reference signals based on different delay vectors is equivalent to performing phase rotation on each frequency domain unit of a channel based on the different delay vectors. In addition, phase rotation angles may be different for a same frequency domain unit. To distinguish between different delays, the network device may precode a reference signal based on each of L delay vectors.

In the embodiments, for ease of understanding, an example in which an RB is used as a frequency domain unit is used to describe a process of performing frequency domain precoding on a reference signal. For example, when an RB is used as as a frequency domain unit, it may be considered that each frequency domain unit includes only one RB used to carry a reference signal. Each frequency domain unit may include one or more RBs used to carry a reference signal. When each frequency domain unit includes a plurality of RBs used to carry a reference signal, the network device may load delay vectors to the plurality of RBs used to carry a reference signal in each frequency domain unit.

A delay vector length may be N, where N is a quantity of RBs that are in a frequency domain bandwidth occupied by a CSI measurement resource and that are used to carry a reference signal (for example, the precoded reference signal in the embodiments), N≥1, and N is an integer.

An $l^{th}$ delay vector in the L delay vectors may be represented as $b(\tau_1)$, and $$b(\tau_l) = \begin{bmatrix} e^{-j2\pi f_1 \tau_l} \\ e^{-j2\pi f_2 \tau_l} \\ \vdots \\ e^{-j2\pi f_N \tau_l} \end{bmatrix}.$$

Herein, l=1, 2, . . . , or L, where L may represent a quantity of delay vectors; and $f_1, f_2, \ldots,$ and $f_N$ respectively represent carrier frequencies of a first RB to an $N^{th}$ RB.

The delay vector may be obtained from the DFT matrix, for example, $$u_k = \begin{bmatrix} 1 & e^{j\frac{2\pi k}{O_f N}} & \ldots & e^{j\frac{2\pi k(N-1)}{O_f N}} \end{bmatrix}^T.$$

Each vector in the DFT matrix may be referred to as a DFT vector.

Herein, $O_f$ is an oversampling factor, and $O_f \geq 1$; and k is a DFT vector index, and satisfies: $0 \leq k \leq O_f \times N - 1$ or $1 - O_f \times N \leq k \leq 0$.

For example, when k<0, $b(\tau_l)$ and the vector $u_k$ in the DFT matrix may satisfy:

$b(\tau_l) = u_k \beta_l$, and $$\Delta f \tau_l = \frac{k}{O_f N},$$

where $\beta_l e^{-j2\pi f_1 \tau_l}$, $\Delta f = f_n - f_{n+1}$, and $1 \leq n \leq N-1$.

For ease of description below, the delay vector is denoted as $b(\tau_l)$.

The frequency domain bandwidth occupied by the CSI measurement resource may be understood as a bandwidth used to transmit a reference signal, and the reference signal may be a reference signal used for channel measurement, for example, a CSI-RS. Signaling used to indicate the frequency domain bandwidth occupied by the CSI measurement resource may be, for example, a CSI-bandwidth occupation range. The frequency domain bandwidth occupied by the CSI measurement resource may also be referred to as a pilot transmission bandwidth or a measurement bandwidth. For ease of description below, the frequency domain bandwidth occupied by the CSI measurement resource is referred to as a measurement bandwidth for short.

It may be understood that the delay vector length N is merely a possible design, and shall not constitute any limitation on the embodiments. Different delay vector lengths are defined below with reference to different embodiments. Detailed descriptions are omitted herein.

It is assumed that a transmit antenna is a single-polarized antenna, a quantity of transmit antennas is T, and a quantity of RBs is N. In this case, for one receive antenna, a downlink channel may be represented as a matrix whose dimension is N×T. If frequency domain precoding is performed on a reference signal based on a delay vector, N elements in the delay vector may be respectively loaded to reference signals carried on the N RBs, and an $n^{th}$ element in the delay vector may be loaded to a reference signal carried on an $n^{th}$ RB in the N RBs.

Because the reference signal to which the delay vector is loaded may be transmitted to the terminal device through the downlink channel, a channel measured by the terminal device based on the received precoded reference signal may be equivalent to a channel to which the delay vector is loaded. For example, the $n^{th}$ element in the delay vector is loaded to a channel $V^{(n)}$ on the $n^{th}$ RB, which may be represented as $V^{(n)} e^{j2\pi f_n \tau_l}$.

It may be noted that frequency domain precoding may be performed on a reference signal based on a delay vector before resource mapping or after resource mapping.

It may be understood that the delay vector is a form proposed the embodiments to indicate a delay. The delay vector is named only for ease of distinguishing from the angle, and shall not constitute any limitation on the embodiments. The embodiments do not exclude a possibility that another name is defined in a future protocol to represent a same or similar meaning.

7. Frequency domain unit: The frequency domain unit is a unit of a frequency domain resource, and may represent different frequency domain resource granularities. The frequency domain unit may include, for example, but is not limited to a subband, a RB, a RB group (RBG), and a precoding RBG (PRG).

In the embodiments, the network device may determine, based on a feedback of the terminal device, a precoding matrix corresponding to each frequency domain unit.

8. Angle-delay pair: The angle-delay pair may be a combination of one angle vector and one delay vector. Each angle-delay pair may include one angle vector and one delay vector. Angle vectors and/or delay vectors included in any two angle-delay pairs are different. In other words, each angle-delay pair may be uniquely determined based on one angle vector and one delay vector. The angle-delay pair may be understood as a representative form of a space-frequency basic unit determined based on one angle vector and one delay vector, but the angle-delay pair does not necessarily have a unique representative form. For example, the angle-delay pair may alternatively be represented as a space-frequency component matrix or a space-frequency component vector described below.

9. Space-frequency component matrix: One space-frequency component matrix may be determined based on one angle-delay pair. In other words, one space-frequency component matrix may be uniquely determined based on one angle vector and one delay vector. One space-frequency component matrix and one angle-delay pair may be mutually converted.

One space-frequency component matrix may be determined based on a conjugate transpose of a product of one angle vector and one delay vector, for example, $a(\theta_k) \times b(\tau_l)^H$ and a dimension of the space-frequency component matrix may be T×N.

The space-frequency component matrix may be understood as another representative form of a space-frequency basic unit determined based on one angle vector and one delay vector. The space-frequency basic unit may alternatively be represented as, for example, a space-frequency component vector, and the space-frequency component vector is determined, for example, based on a Kronecker product of one angle vector and one delay vector.

It may be further understood that a form of the space-frequency basic unit is not limited in the embodiments. Various possible forms may be determined by a person of ordinary skill in the art based on a same concept by using one angle vector and one delay vector. In addition, if definitions of the angle vector and the delay vector are different from the forms enumerated above, an operation relationship among a space-frequency component matrix, an angle vector, and a delay vector and an operation relationship among a space-frequency component vector, an angle vector, and a delay vector may also be different. The operation relationship among a space-frequency component matrix, an angle vector, and a delay vector and the operation relationship among a space-frequency component vector, an angle vector, and a delay vector are not limited in the embodiments.

10. Space-frequency matrix: In the embodiments, the space-frequency matrix may be an intermediate quantity used to determine a precoding matrix. For each frequency domain unit, the precoding matrix may be usually a matrix whose dimension is T×Z, where Z represents a quantity of transport layers, Z≥1, and Z is an integer.

In the embodiments, the space-frequency matrix may be determined based on each receive antenna, or may be determined based on each transport layer.

If the space-frequency matrix is determined based on a receive antenna, the space-frequency matrix may be referred to as a space-frequency matrix corresponding to the receive antenna. The space-frequency matrix corresponding to the receive antenna may be used to construct a downlink channel matrix of each frequency domain unit, to further determine a precoding matrix corresponding to each frequency domain unit. A channel matrix corresponding to a frequency domain unit may be, for example, a conjugate transpose of a matrix constructed by column vectors that correspond to a same frequency domain unit and that are in space-frequency matrices corresponding to receive antennas. For example, $n^{th}$ column vectors in the space-frequency matrices corresponding to the receive antennas are extracted, and a matrix whose dimension is T×R may be obtained through arrangement from left to right in an order of the receive antennas, where R represents a quantity of the receive antennas, R≥1, and R is an integer. After conjugate transpose processing is performed on the matrix, a channel matrix $V^{(n)}$ of an $n^{th}$ frequency domain unit may be obtained. A relationship between a channel matrix and a space-frequency matrix is described in detail below. Detailed descriptions of the relationship between a channel matrix and a space-frequency matrix are omitted herein.

If the space-frequency matrix is determined based on a transport layer, the space-frequency matrix may be referred to as a space-frequency matrix corresponding to the transport layer. The space-frequency matrix corresponding to the transport layer may be directly used to determine a precoding matrix corresponding to each frequency domain unit. A precoding matrix corresponding to a frequency domain unit may be, for example, constructed by column vectors that correspond to a same frequency domain unit and that are in space-frequency matrices corresponding to transport layers. For example, $n^{th}$ column vectors in the space-frequency matrices corresponding to the transport layers are extracted, and a matrix whose dimension is T×Z may be obtained through arrangement from left to right in an order of the transport layers, where Z represents a quantity of the transport layers, Z≥1, and Z is an integer. The matrix may be used as a precoding matrix $W^{(n)}$ of an $n^{th}$ frequency domain unit.

A process of determining a precoding matrix based on a space-frequency matrix is described in detail in the following embodiments. Detailed descriptions of the specific process are omitted herein.

It may be noted that a precoding matrix determined according to a channel measurement method provided in the embodiments may be a precoding matrix directly used for downlink data transmission. Alternatively, a precoding matrix finally used for downlink data transmission may be obtained according to some beamforming methods, for example, including zero forcing (ZF), regularized ZF (RZF), a minimum mean square error (MMSE), and a maximum signal-to-leakage-and-noise ratio (SLNR). All the following precoding matrices may be precoding matrices determined according to the channel measurement method provided in the embodiments.

In the embodiments, the space-frequency matrix may be determined based on one or more angle-delay pairs. For example, the space-frequency matrix may be a weighted sum of one or more space-frequency component matrices. The space-frequency matrix may alternatively be converted into a form of a space-frequency vector, and the space-frequency vector may alternatively be a weighted sum of one or more space-frequency component vectors.

A type II codebook feedback mode is defined in the NR protocol TS38.214. The following shows an example of providing a feedback in the type II codebook feedback mode when a rank is 1:

$$W = W_1 W_2 = \begin{bmatrix} a_0 v_0 & a_1 v_1 & a_2 v_2 & a_3 v_3 & & & & \\ & & & & a_4 v_0 & a_5 v_1 & a_6 v_2 & a_7 v_3 \end{bmatrix}$$

$$[c_0 \; c_1 \; c_2 \; c_3 \; c_4 \; c_5 \; c_6 \; c_7]^T = \begin{bmatrix} a_0 c_0 v_0 + a_1 c_1 v_1 + a_2 c_2 v_2 + a_3 c_3 v_3 \\ a_4 c_4 v_0 + a_5 c_5 v_1 + a_6 c_6 v_2 + a_7 c_7 v_3 \end{bmatrix}$$

Herein, W represents a to-be-fed-back precoding matrix in two polarization directions in one subband at one transport layer; $W_1$ may be fed back by using a wideband; $W_2$ may be fed back by using a subband; and $v_0$ to $v_3$ are beam vectors included in $W_1$, where the plurality of beam vectors may be indicated, for example, by using an index of a combination of the plurality of beam vectors. In the precoding matrix shown above, beam vectors in the two polarization directions are the same and the beam vectors $v_0$ to $v_3$ are all used. In addition, $\alpha_0$ to $\alpha_7$ are wideband amplitude coefficients included in $W_1$, and may be indicated by using quantized values of the wideband amplitude coefficients; and $c_0$ to $c_7$ are subband coefficients included in $W_2$. Each subband coefficient may include a subband amplitude coefficient and a subband phase coefficient. For example, $c_0$ to $c_7$ may respectively include subband amplitude coefficients $\alpha_0$ to $\alpha_7$ and subband phase coefficients $\varphi_0$ to $\varphi_7$, and may be respectively indicated by using quantized values of the subband amplitude coefficients $\alpha_0$ to $\alpha_7$ and quantized values of the subband phase coefficients $\varphi_0$ to $\varphi_7$.

The terminal device feeds back the amplitude coefficient and the phase coefficient based on each subband. Consequently, relatively high feedback overheads are caused. Therefore, a feedback mode that is based on frequency domain continuity for frequency selective fading caused by a multipath delay and in which a delay vector is used to describe a frequency domain change rule is proposed. The delay vector may also be understood as a vector used to indicate a channel delay characteristic.

The space-frequency matrix described above is an intermediate quantity that is proposed based on the frequency domain continuity and that is used to construct a precoding matrix. The space-frequency matrix H may satisfy: $H=SCF^H$, where S represents a matrix constructed by one or more (for example, K) angle vectors, for example, $S=[a(\theta_1) \; a(\theta_2) \ldots a(\theta_K)]$; F represents a matrix constructed by one or more (for example, L) delay vectors, for example, $F=[b(\tau_1) \; b(\tau_2) \ldots b(\tau_L)]$; and C represents a weighting coefficient corresponding to one angle vector and one delay vector.

In the FDD mode, because of the delay reciprocity and the angle reciprocity between the uplink and downlink channels, a space-frequency matrix $H_{UL}$ obtained through uplink channel measurement may be represented as $H_{UL}=SC_{UL}F^H$, and a space-frequency matrix $H_{DL}$ obtained through downlink channel measurement may be represented as $H_{DL}=SC_{DL}F^H$. Therefore, in the embodiments, a coefficient matrix $C_{DL}$ corresponding to a downlink channel is determined and fed back through downlink channel measurement, to determine a precoding matrix that adapts to the downlink channel.

In an implementation, $S^H H_{DL}=C_{DL}F^H$ may be obtained by transforming the formula $H_{DL}=SC_{DL}F^H$, and then $(H_{DL}^H S)^H=C_{DL}F^H$ may be obtained, so that a coefficient matrix $C_{DL}=(H_{DL}^H S)^H F$ can be further obtained through transform. Herein, $H_{DL}^H$ is a space-frequency matrix determined based on a real channel; and $H_{DL}^H$ is a real channel on which space domain precoding is performed, that is, a channel observed by the terminal device when only an angle vector is loaded to a downlink reference signal. Each element in the coefficient matrix $C_{DL}$ may be obtained by multiplying a column in I by a row in a conjugate transpose $(H_{DL}^H S)^H$ of the real channel $H_{DL}^H S$ on which space domain precoding is performed.

In another implementation, $H_{DL}F=SC_{DL}$ may be obtained by transforming the formula $H_{DL}=SC_{DL}F^H$, and then $(F^H H_{DL}^H)^H=SC_{DL}$ may be obtained, so that a coefficient matrix $C_{DL}=S^H (F^H H_{DL}^H)^H$ can be further obtained through transform. Herein, $H_{DL}^H$ is a space-frequency matrix determined based on a real channel; and $F^H H_{DL}^H$ represents a sum of channel estimation values calculated by the terminal device by loading delay vectors to the downlink channel. Each element in the coefficient matrix $C_{DL}$ may be obtained by left-multiplying $S^H$ by a conjugate transpose $(F^H H_{DL}^H)^H$ of the real channel $F^H H_{DL}^H$ on which frequency domain precoding is performed.

It may be understood that the space-frequency matrix $H_{DL}$ determined based on the weighting coefficient in the coefficient matrix $C_{DL}$ fed back by the terminal device may be obtained based on a conjugate transpose of the real channel. On the contrary, the channel matrix V may also be obtained based on a conjugate transpose (that is, $H_{DL}^H$) of the space-frequency matrix in the embodiments of the embodiments.

From another perspective, in the embodiments, the space-frequency component matrix is defined as being determined by $a(\theta_k) \times b(\tau_l)^H$. Therefore, it may be determined that a dimension of the space-frequency matrix $H_{DL}$ is: quantity of transmit antennas×quantity of frequency domain units. For example, a dimension of a space-frequency matrix corresponding to a downlink channel is T×N. In the following embodiments, unless otherwise specified, the space-frequency matrix is the matrix whose dimension is T×N.

However, this is not necessarily a space-frequency matrix determined based on a real channel. Generally, a dimension of a channel matrix is defined as: quantity of receive antennas×quantity of transmit antennas. For example, a dimension of a downlink channel is R×T. A dimension of a space-frequency matrix determined based on the channel matrix is N×T, which is exactly opposite to the dimension T×N of the foregoing space-frequency matrix $H_{DL}$. Therefore, in the embodiments, the real channel may be a conjugate transpose of the channel matrix determined based on the foregoing space-frequency matrix $H_{DL}$, and the downlink channel matrix determined based on the space-frequency matrix $H_{DL}$ may be a conjugate transpose of the real channel.

Further, the precoding matrix may be determined based on the space-frequency matrix $H_{DL}$. The precoding matrix of the $n^{th}$ frequency domain unit may be constructed by the $n^{th}$ column vectors in the space-frequency matrices corresponding to the transport layers.

An example of performing singular value decomposition (SVD) on a channel matrix is used. In this case, a conjugate transpose of a precoding matrix may be obtained by performing SVD on the channel matrix V. However, if SVD is performed on the conjugate transpose of the channel matrix, in other words, if SVD is performed on $V^H$, the precoding matrix may be exactly obtained. Therefore, in the embodiments, the space-frequency matrix $H_{DL}$ determined based on the conjugate transpose of the real channel may be directly determined to obtain the precoding matrix corresponding to each frequency domain unit.

A specific process of determining the channel matrix V and the precoding matrix W based on the space-frequency matrix $H_{DL}$ is described in detail in the following embodiments. Detailed descriptions of the specific process are omitted herein.

It may be understood that a relationship between the real channel and the space-frequency matrix $H_{DL}$ is not fixed. Different definitions of the space-frequency matrix and the space-frequency component matrix may change the relationship between the real channel and the space-frequency matrix $H_{DL}$. For example, the space-frequency matrix $H_{DL}$ may be obtained based on the conjugate transpose of the real channel, or may be obtained based on a transpose of the real channel.

When the space-frequency matrix and the space-frequency component matrix are defined differently, operations performed by the network device during delay or angle loading may also be different, and operations performed by the terminal device during channel measurement and feedback may also correspondingly change. However, these operations are only implementation behavior of the terminal device and the network device, and shall not constitute any limitation on the embodiments. In the embodiments, a case in which a space-frequency matrix is obtained based on a conjugate transpose of a real channel is shown below only for ease of understanding. The definition of the channel matrix, the dimension and the definition of the space-frequency matrix, and a transform relationship between the channel matrix and the space-frequency matrix are non-limiting. Likewise, a transform relationship between the space-frequency matrix and the precoding matrix is not limited in the embodiments.

11: Reference signal resource: The reference signal resource may be used to configure a transmission attribute of a reference signal, for example, a time-frequency resource location, a port mapping relationship, a power factor, and a scrambling code. For details, refer to the conventional technology. A transmit end device may send a reference signal based on a reference signal resource, and a receive end device may receive a reference signal based on a reference signal resource. One reference signal resource may include one or more RBs.

In the embodiments of, the reference signal resource may be, for example, a CSI-RS resource.

12. Pilot density: The pilot density is a ratio of a quantity of REs occupied by a reference signal corresponding to each port such as a precoded reference signal in the embodiments to a total quantity of RBs in an occupied bandwidth. For example, if a pilot density of a reference signal corresponding to a port is 1, it may indicate that, in a bandwidth occupied by the reference signal corresponding to the port, each RB includes an RE used to carry the reference signal corresponding to the port. For another example, if a pilot density of a reference signal corresponding to a port is 0.5, it may indicate that, in a bandwidth occupied by the reference signal corresponding to the port, one RB in every two RBs includes an RE used to carry the reference signal corresponding to the port, in other words, there is one RB between adjacent RBs used to carry the reference signal corresponding to the port.

In addition, for ease of understanding the embodiments, the following descriptions are provided.

First, for ease of understanding, the following briefly describes the main parameters of the embodiments.

P: P is a quantity of angle-delay pairs, P≥1, and P is an integer.

N: N is a quantity of frequency domain units, N≥1, and N is an integer.

T: T is a quantity of transmit antenna ports in one polarization direction, T≥1, and T is an integer.

K: K is a quantity of angle vectors, K≥1, and K is an integer.

L: L is a quantity of delay vectors, L≥1, and L is an integer.

R: R is a quantity of receive antennas, R≥1, and R is an integer.

Z: Z is a quantity of transport layers, Z≥1, and Z is an integer.

J: J is a quantity of polarization directions of a transmit antenna, J≥1, and J is an integer.

M: M is a quantity of frequency domain groups, M>1, and M is an integer.

Second, in the embodiments, for ease of description, when numbering is involved, numbers may be consecutive and start from 1. For example, the L angle vectors may include a first angle vector to an $L^{th}$ angle vector, and the K delay vectors may include a first delay vector to a $K^{th}$ delay vector. For example, numbers may alternatively be consecutive and start from 0. For example, the L angle vectors may include a $0^{th}$ angle vector to an $(L-1)^{th}$ angle vector, and the K delay vectors may include a $0^{th}$ delay vector to a $(K-1)^{th}$ delay vector.

It may be understood that the foregoing descriptions are all provided for ease of describing the solutions provided in the embodiments.

Third, in the embodiments, the transform of a matrix and a vector is designed in a plurality of places. For ease of understanding, unified descriptions are provided herein. A superscript T represents a transpose. For example, $A^T$ represents a transpose of a matrix (or a vector) A. A superscript * represents a conjugate. For example, A* represents a conjugate of the matrix (or the vector) A. A superscript H represents a conjugate transpose. For example, $A^H$ represents a conjugate transpose of the matrix (or the vector) A. For brevity, descriptions of a same or similar case are omitted below.

Fourth, in the following embodiments, an example in which both an angle vector and a delay vector are column vectors is used to describe the embodiments. However, this shall not constitute any limitation on the embodiments. Based on a same concept, a person of ordinary skill in the art may further understand other possible representations.

Fifth, in the embodiments, "used to indicate" may include "used to directly indicate" and "used to indirectly indicate". When a piece of indication information is used to indicate A, the indication information may directly indicate A or indirectly indicate A, but it does not necessarily indicate that the indication information carries A.

Information indicated by the indication information is referred to as to-be-indicated information. In a specific implementation process, the to-be-indicated information may be indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already understood or pre-agreed on. For example, information may alternatively be indicated by using an arrangement order of a plurality of pieces of information that are pre-agreed on (for example, stipulated in a protocol), to reduce indication overheads to some extent. In addition, a common part of all pieces of information may be further identified and indicated in a unified manner, to reduce indication overheads caused by separately indicating same information. For example, a person of ordinary skill in the art may understand that a precoding matrix includes precoding vectors, and each precoding vector in the precoding matrix may have a same part in terms of composition or another attribute.

In addition, an indication manner may alternatively be various existing indication manners, for example, but not limited to, the foregoing indication manners and various combinations thereof. For details of various indication manners, refer to the conventional technology. Details are not described in the embodiments. It may be understood from the foregoing descriptions that, for example, when a plurality of pieces of information of a same type need to be indicated, manners of indicating different information may be different. In an implementation process, a required indication manner may be selected according to a requirement. The selected indication manner is non-limiting. In this way, the indication manner involved in the embodiments may be understood as covering various methods that can enable a to-be-indicated party to learn of the to-be-indicated information.

In addition, the to-be-indicated information may have another equivalent form. For example, a row vector may be represented as a column vector; a matrix may be represented by using a transposed matrix of the matrix, or a matrix may be represented in a form of a vector or an array; and the vector or the array may be formed by connecting row vectors or column vectors in the matrix. The solutions provided in the embodiments may be understood as covering various forms. For example, some or all features in the embodiments may be understood as covering various representations of the features.

The to-be-indicated information may be sent as a whole, or may be divided into a plurality of pieces of sub-information for separate sending. In addition, sending periods and/or sending occasions of the sub-information may be the same or may be different. A specific sending method is not limited in the embodiments. The sending periods and/or the sending occasions of the sub-information may be predefined, for example, predefined according to a protocol; or may be configured by a transmit end device by sending configuration information to a receive end device. The configuration information may include, for example, but not limited to, one or a combination of at least two of radio resource control signaling, MAC layer signaling, and physical layer signaling. The radio resource control signaling includes, for example, RRC signaling. The MAC layer signaling includes, for example, a MAC control element. The physical layer signaling includes, for example, downlink control information (DCI).

Sixth, definitions enumerated in the embodiments for many features (for example, a Hadamard product, a Kronecker product, CSI, an RB, an angle, and a delay) are merely used to explain functions of the features by using an example. For detailed content thereof, refer to the conventional technology.

Seventh, the terms "first", "second", and various numbers in the following embodiments are merely used for distinguishing for ease of description. For example, the terms are used to distinguish between different indication information.

Eighth, in the following embodiments, "being pre-obtained" may include "being indicated by the network device by using signaling" or "being predefined", for example, "being defined in a protocol". The "being predefined" may be implemented in a manner in which corresponding code, a table, or other related indication information may be prestored in a device (for example, including the terminal device and the network device).

Ninth, "being stored" in the embodiments may be "being stored in one or more memories". The one or more memories may be separately disposed, or may be integrated into an encoder or a decoder, a processor, or a communications apparatus. Alternatively, a part of the one or more memories may be separately disposed, and a part of the one or more memories may be integrated into a decoder, a processor, or a communications apparatus. A type of the memory may be a storage medium in any form.

Tenth, a "protocol" in the embodiments may be a standard protocol in the communications field, for example, may include an LTE protocol, an NR protocol, and a related protocol applied to a future communications system.

Eleventh, "at least one" indicates one or more, and "a plurality of" indicates two or more. In addition, "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one of the following items" or a similar expression means any combination of these items, including a single item or any combination of a plurality of items. For example, at least one of a, b, and c may represent: a, b, c, a and b, a and c, b and c, or a, b, and c, where a, b, and c each may be singular or plural.

The following describes in detail the channel measurement method provided in the embodiments with reference to the accompanying drawings.

It may be understood that the method provided in the embodiments may be applied to a system in which communication is performed by using a multi-antenna technology, for example, the communications system 100 shown in FIG. 1. The communications system 100 may include at least one network device and at least one terminal device. The network device and the terminal device may communicate with each other by using the multi-antenna technology.

It may be further understood that a structure of an execution body of the method provided in the embodiments is non-limiting, provided that programs that record code of the method provided in the embodiments can be run to perform communication according to the method provided in the embodiments. For example, the method provided in the embodiments may be performed by the terminal device or the network device, or a function module that is in the terminal device or the network device and that can invoke and execute the programs.

Without loss of generality, interaction between the network device and the terminal device is used as an example below to describe in detail the channel measurement method provided in the embodiments.

In an implementation, the network device may precode a downlink reference signal based on a predetermined angle, and indicate a predetermined delay to the terminal device, so that the terminal device performs channel estimation based on a received precoded reference signal, to determine a weighting coefficient corresponding to each combination of an angle and a delay (that is, an angle-delay pair). The network device may determine, based on the weighting coefficient fed back by the terminal device and the predetermined angle and delay, a precoding matrix that adapts to a downlink channel.

In another implementation, the network device may precode a downlink reference signal based on a predetermined delay, and indicate a predetermined angle to the terminal device, so that the terminal device performs channel estimation based on a received precoded reference signal, to determine a weighting coefficient corresponding to each combination of an angle and a delay (that is, an angle-delay pair). The network device may determine, based on the weighting coefficient fed back by the terminal device and the predetermined angle and delay, a precoding matrix that adapts to a downlink channel.

For ease of understanding, in the following embodiments, one polarization direction is first used as an example to describe in detail a channel measurement method 200 provided in an embodiment. It may be understood that the polarization direction may be any one of one or more polarization directions of the transmit antenna that are configured by the network device. In other words, for a precoded reference signal transmitted through a transmit antenna in any polarization direction, the terminal device may perform channel measurement according to the method 200 provided in the embodiment, and the network device may also determine a precoding matrix according to the method 200 provided in the embodiment. It may be further understood that a quantity of polarization directions of the transmit antenna is non-limiting. For example, there may be one polarization direction, that is, a single polarization direction; or there may be a plurality of polarization directions, for example, dual polarization directions.

Figure 2:
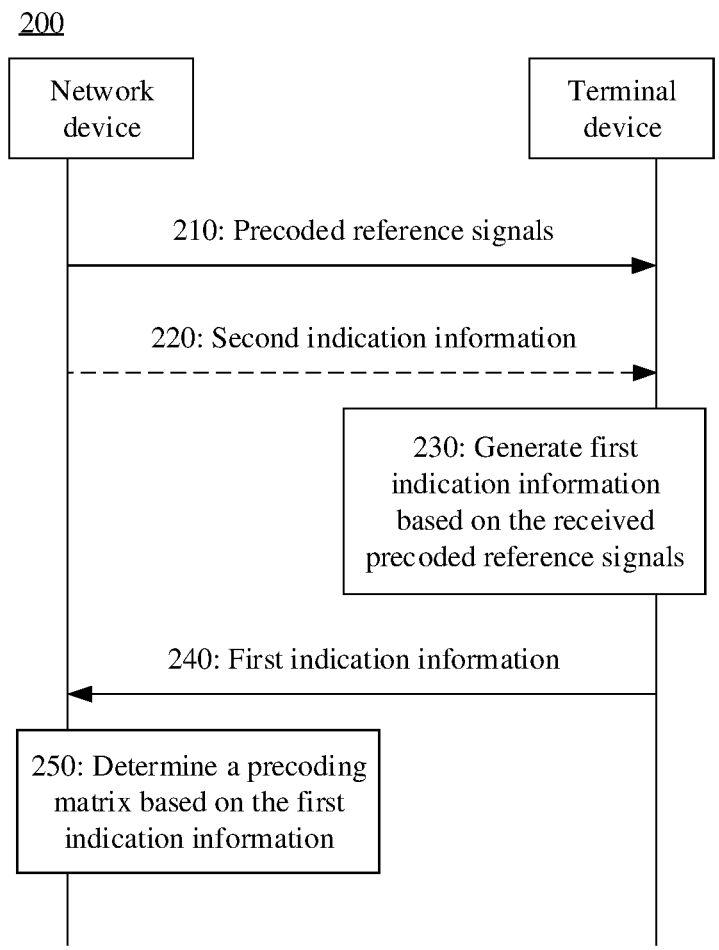
FIG. 2 is a schematic flowchart of a channel measurement method according to an embodiment.

FIG. 2 is a schematic flowchart of the channel measurement method 200 from the perspective of device interaction according to the embodiment. As shown in the figure, the method 200 may include step 210 to step 250. The following describes the steps in the method 200 in detail.

Step 210: A terminal device receives precoded reference signals, where the precoded reference signals are obtained by precoding reference signals based on K angle vectors. Correspondingly, a network device sends the precoded reference signals, where K≥1, and K is an integer.

In an embodiment, the network device may precode the reference signals based on the K predetermined angle vectors, to obtain the precoded reference signals corresponding to K ports. A precoded reference signal corresponding to each port may be obtained through precoding based on one of the K angle vectors.

Because of angle reciprocity between uplink and downlink channels, the K angle vectors may be determined through uplink channel measurement. The network device may determine K relatively strong angles based on an uplink channel matrix obtained through pre-estimation, where the K angles may be represented by using K angle vectors.

The K angle vectors may be obtained, for example, from a predefined angle vector set. Each angle vector in the angle vector set may be obtained from a DFT matrix. Each angle vector in the angle vector set may be a steering vector.

The network device may determine the K angle vectors, for example, by using a joint angle and delay estimation (JADE) algorithm in the conventional technology. The estimation algorithm may be, for example, a multiple signal classification algorithm (MUSIC), a Bartlett algorithm, or an estimation of signal parameters by rotational invariance technique algorithm (ESPRIT). Alternatively, the network device may determine the K angle vectors by performing DFT on a space-frequency matrix determined through uplink channel measurement. A specific method in which the network device determines the K angle vectors is not limited in the embodiments.

An example in which DFT is performed on a space-frequency matrix determined through uplink channel measurement is used. First, the network device may determine an uplink channel through channel estimation, and further determine a space-frequency matrix $H_{UL}$ of the uplink channel. For ease of understanding, a dimension of the space-frequency matrix $H_{UL}$ determined based on the uplink channel is consistent with a dimension of a space-frequency matrix $H_{DL}$ of a downlink channel herein. The foregoing has described the dimension of the space-frequency matrix of the downlink channel and the relationship between the space-frequency matrix and the downlink channel. Therefore, the dimension of the space-frequency matrix $H_{UL}$ determined based on the uplink channel may be N×T.

It may be understood that the dimension of the space-frequency matrix $H_{UL}$ of the uplink channel shown herein and a calculation formula used to determine a coefficient matrix $C_{UL}$ are merely examples, and shall not constitute any limitation on the embodiments. If different dimensions are defined for the space-frequency matrix $H_{UL}$, calculation formulas used to determine the coefficient matrix $C_{UL}$ are also different.

The network device may perform DFT on the space-frequency matrix to determine the K angle vectors. It is assumed that the K angle vectors are obtained from the DFT matrix. The predefined angle vector set may be, for example, a vector set including a plurality of vectors in a space domain DFT matrix. For ease of distinguishing, the vector set is referred to as an angle vector set $U_s$, and $U_s=[u_{s,1}\ u_{s,2}\ \ldots\ u_{s,T}]$. A predefined delay vector set may be, for example, a vector set including a plurality of vectors in a frequency domain DFT matrix. For ease of distinguishing, the vector set is referred to as a delay vector set $U_f$, and $U_f=[u_{f,1}\ u_{f,2}\ \ldots\ u_{f,N}]$.

The network device may perform space domain DFT transform and frequency domain DFT transform on the space-frequency matrix $H_{UL}$ obtained through uplink channel estimation, to obtain the following coefficient matrix $C_{UL}$: $C_{UL}=U_s^H U_f$. The network device may determine K relatively strong rows in the coefficient matrix $C_{UL}$. The K relatively strong rows may be used to determine the K angle vectors. For example, the network device may determine, based on a sum of squares of moduli of elements in each column in the coefficient matrix $C_{UL}$, K rows with relatively large sums of squares of moduli. The K rows with relatively large sums of squares of moduli may be used to determine the K angle vectors. Positions of the K columns in the coefficient matrix $C_{UL}$ may be positions of the K angle vectors in the foregoing angle vector set. For example, row sequence numbers of the K rows in the coefficient matrix $C_{UL}$ may be column sequence numbers of the K angle vectors in the angle vector set. Therefore, the K angle vectors may be determined. The K angle vectors are angle vectors selected from the angle vector set to precode the downlink reference signals.

It may be understood that a possible implementation in which the network device determines the K angle vectors is described in detail above only for ease of understanding. However, this shall not constitute any limitation on the embodiments. A specific implementation in which the network device determines the K angle vectors is not limited in the embodiments.

The uplink channel matrix may be, for example, obtained by the network device through channel estimation based on a pre-received uplink reference signal such as an SRS, or may be obtained based on a correctly decoded data signal. For a specific method in which the network device estimates an uplink channel matrix, refer to the conventional technology. For brevity, detailed descriptions of the specific method are omitted herein.

It may be understood that the K angle vectors are not necessarily determined through uplink channel measurement. For example, the K angle vectors may be predefined, for example, defined in a protocol; or the K angle vectors may be determined by collecting statistics about results fed back based on one or more previous downlink channel measurements. A manner of determining the K angle vectors is not limited in the embodiments.

The network device may precode the downlink reference signals such as CSI-RSs based on the K angle vectors, to obtain the precoded reference signals, and may transmit the precoded reference signals by using a preconfigured reference signal resource.

The method 200 may further include: The terminal device receives fifth indication information, where the fifth indication information is used to configure one reference signal resource. Correspondingly, the network device sends the fifth indication information.

The reference signal resource configured by using the fifth indication information may be used to carry precoded reference signals. The precoded reference signals carried on the reference signal resource may correspond to one or more same ports.

The fifth indication information may be, for example, higher layer signaling such as an RRC message.

In a possible design, the fifth indication information may be used to configure a CSI-RS resource (that is, an example of the reference signal resource) by using a higher layer parameter. The higher layer parameter may include, for example, a CSI resource configuration and a non-zero power (NZP) CSI-RS resource set (NZP-CSI-RS-ResourceSet). The higher layer parameter may be a quantity of ports, a time-frequency resource, a pilot density, and the like configured for each CSI-RS resource. Therefore, the terminal device may determine, based on the higher layer parameter, a quantity of ports corresponding to precoded reference signals carried on each RB.

It may be noted that, in a current protocol, for example, in an NR protocol, the quantity of ports may be a quantity of ports corresponding to precoded reference signals carried on one RB. As described above, when a quantity of angle vectors is K, a quantity of ports corresponding to precoded reference signals obtained by precoding downlink reference signals may be K. Each port may correspond to one angle vector. In other words, a precoded reference signal corresponding to each port is obtained by precoding a reference signal based on one angle vector. That the network device sends the precoded reference signals corresponding to the K ports may mean that the network device may map the precoded reference signals corresponding to the K ports to a same RB. That the terminal device receives the precoded reference signals corresponding to the K ports may mean that precoded reference signals that can be received by the terminal device on one RB correspond to the K ports.

It may be understood that precoded reference signals carried on one RB may correspond to the K ports, but it does not indicate that the reference signals are carried on only one RB. The network device may map the precoded reference signals corresponding to the K ports to a plurality of RBs in a measurement bandwidth, to measure channel characteristics of the ports in the entire measurement bandwidth. The precoded reference signals carried on each RB correspond to the K ports. The terminal device may receive, on each of the plurality of RBs in the measurement bandwidth, the precoded reference signals corresponding to the K ports.

For a $k^{th}$ port in the K ports, the network device may precode a reference signal based on a $k^{th}$ angle vector in the K angle vectors, to obtain a precoded reference signal corresponding to the $k^{th}$ port, where k=1, 2, ..., or K, and k is an integer. In other words, the K ports may be in a one-to-one correspondence with the K angle vectors.

Figure 3:
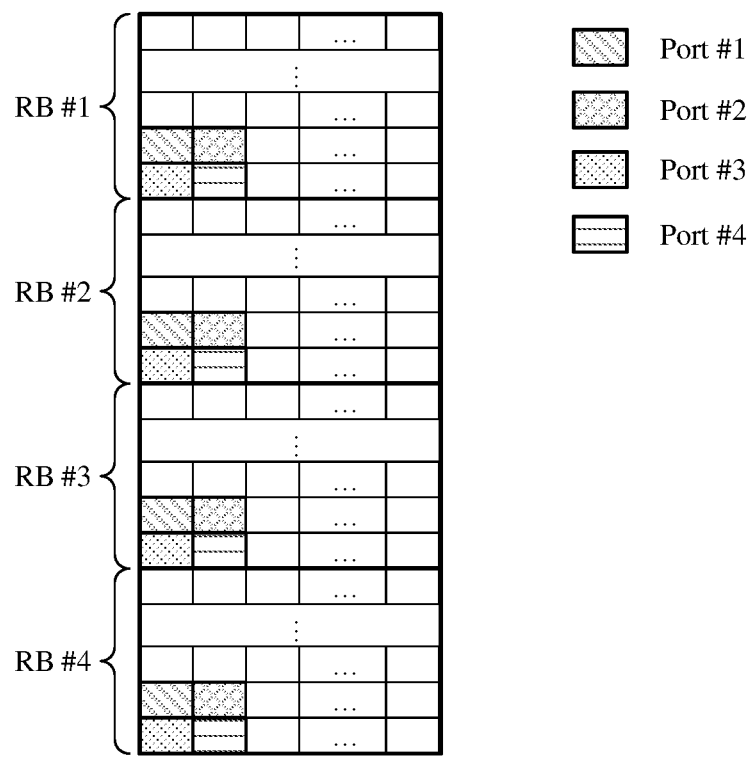
FIG. 3 is a schematic diagram in which a plurality of RBs carry precoded reference signals corresponding to a plurality of ports according to an embodiment.

For ease of understanding, FIG. 3 shows an example in which a plurality of RBs carry precoded reference signals corresponding to a plurality of ports.

Figure 6:
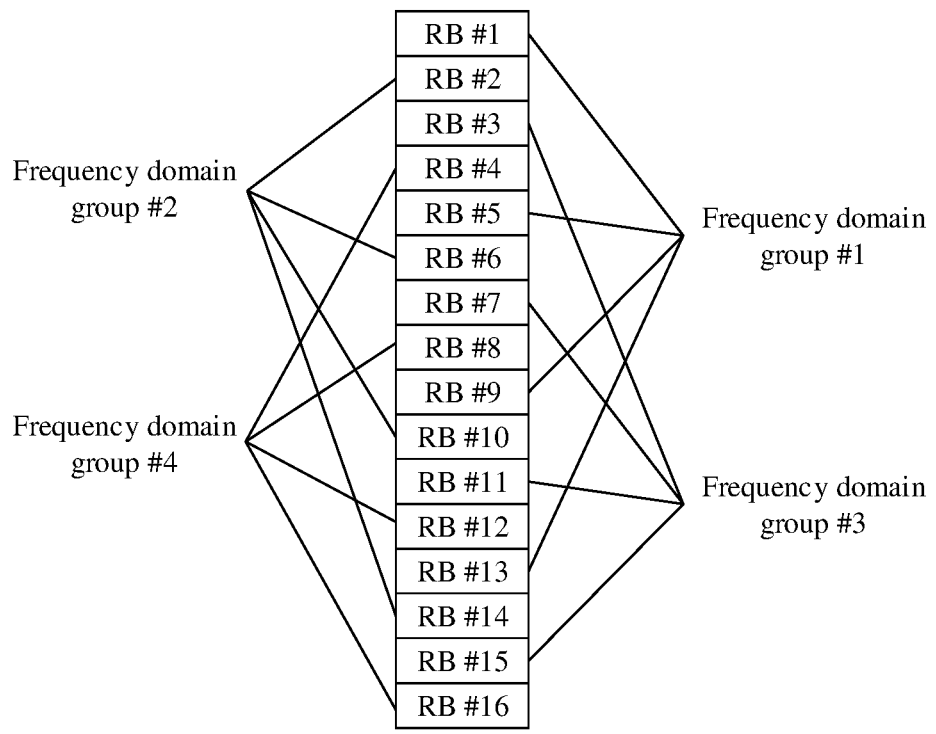
FIG. 6 is another schematic diagram in which a plurality of RBs carry precoded reference signals corresponding to a plurality of ports according to an embodiment.

It may be understood that FIG. 3 and FIG. 6 are merely examples to describe in detail, when an angle vector is loaded to a reference signal, a correspondence between a port and a precoded reference signal carried on each RB. It may be understood that an RB is merely a possible form of a frequency domain unit. The frequency domain unit may further be, for example, a subband, a PRB, or an RBG. A frequency domain unit in any form may include one or more RBs. In other words, the RB shown in FIG. 3 and the figure may be a frequency domain unit, or may be an RB that is in a frequency domain unit and that is used to carry a precoded reference signal.

Therefore, a precoded reference signal may not necessarily be carried on each RB in the measurement bandwidth, and may not necessarily be carried on a plurality of consecutive RBs either. In other words, the terminal device does not necessarily receive, on each RB in the measurement bandwidth, the precoded reference signals corresponding to the plurality of ports. In other words, the network device does not necessarily map the precoded reference signals to each RB in the measurement bandwidth. RBs used to carry downlink reference signals may be discretely distributed in the measurement bandwidth. For example, there is one RB for carrying a downlink reference signal at an interval of several RBs.

An RB #1, an RB #2, an RB #3, and an RB #4 in FIG. 3 are not necessarily consecutive in frequency domain. For example, the RB #1, the RB #2, the RB #3, and the RB #4 may be respectively located in four consecutive to-be-measured subbands, but there may be one or more RBs between every two RBs, for example, between the RB #1 and the RB #2, between the RB #2 and the RB #3, and between the RB #3 and the RB #4.

The embodiments impose no limitation either on a quantity of RBs that are in each frequency domain unit and that are used to carry a precoded reference signal. For example, each frequency domain unit may include one RB used to carry a precoded reference signal, or may include a plurality of RBs used to carry a precoded reference signal. Regardless of whether one or more RBs in a frequency domain unit carry precoded reference signals, a quantity of ports corresponding to precoded reference signals carried on each RB remains unchanged. It may be understood that, when each frequency domain unit includes a plurality of RBs used to carry precoded reference signals, angle-delay pairs corresponding to precoded reference signals carried on RBs in a same frequency domain unit may be the same or may be different, or port numbers corresponding to precoded reference signals carried on RBs in a same frequency domain unit may be the same or may be different.

FIG. 3 shows the example in which a plurality of RBs carry precoded reference signals corresponding to a plurality of ports. The figure shows an example in which a quantity of RBs is 4. In the four RBs shown in the figure, precoded reference signals carried on each RB may correspond to four ports, in other words, K=4. The precoded reference signals corresponding to the four ports may be obtained through precoding based on four different angle vectors. For example, a precoded reference signal corresponding to a port #1 may be obtained through precoding based on an angle vector $a(\theta_1)$, a precoded reference signal corresponding to a port #2 may be obtained through precoding based on an angle vector $a(\theta_2)$, a precoded reference signal corresponding to a port #3 may be obtained through precoding based on an angle vector $a(\theta_3)$, and a precoded reference signal corresponding to a port #4 may be obtained through precoding based on an angle vector $a(\theta_4)$.

As shown in the figure, precoded reference signals corresponding to a same port occupy a same RE in all the RBs, in other words, relative positions of resources occupied by the precoded reference signals corresponding to the same port in all the RBs are the same. REs occupied by precoded reference signals corresponding to different ports in a same RB may be different, for example, may be distinguished in a FDM or time division multiplexing (TDM) manner. Alternatively, REs occupied by precoded reference signals corresponding to different ports in a same RB may be the same, for example, may be distinguished in a code division multiplexing (CDM) manner. The figure is merely an example, and shows an example in which the port #1 and the port #2 are distinguished from the port #3 and the port #4 through FDM, and the port #1 and the port #3 are distinguished from the port #2 and the port #4 through TDM.

It may be understood that FIG. 3 is merely an example for ease of understanding, and does not show all REs in one RB. A quantity of REs in each RB is not limited in the embodiments. In addition, a quantity of ports corresponding to precoded reference signals carried on each RB and a specific manner of multiplexing a resource between the reference signals corresponding to the ports are not limited in the embodiments.

The four RBs shown in the figure may be an example of the reference signal resource described above. The four RBs may belong to a same reference signal resource. It may be understood that the figure is merely an example, and shows an example in which the four RBs are used as the reference signal resource. The reference signal resource may include more or fewer RBs. A quantity of RBs included in the reference signal resource is not limited in the embodiments.

As described above, precoding the reference signals based on the K angle vectors to obtain the precoded reference signals means enabling the transmitted precoded reference signals to have K different space directivity through beamforming. The K different space directivity may be K different ports that can be identified by the terminal device.

The terminal device may perform channel estimation based on the received precoded reference signals corresponding to the K ports, and process a downlink channel estimation value based on one or more preconfigured delay vectors, to determine a weighting coefficient that corresponds to each angle-delay pair and that is used to construct a precoding matrix.

The preconfigured delay vector may be predetermined by the network device, and indicated by using signaling. The preconfigured delay vector may alternatively be predefined, for example, defined in a protocol.

The method 200 may further include step 220: The terminal device receives second indication information, where the second indication information is used to indicate one or more delay vectors corresponding to each of the K angle vectors. Correspondingly, the network device sends the second indication information.

In an embodiment, a quantity of delay vectors may be denoted as, for example, L, where L≥1, and L is an integer.

For example, the network device may determine the L delay vectors through uplink channel measurement, or may determine the L delay vectors by performing statistics collection based on one or more previous downlink channel measurements.

In a possible design, the L delay vectors correspond to each of the K angle vectors. In other words, any two of the K angle vectors may correspond to L same delay vectors. For example, in the K angle vectors, L delay vectors corresponding to a first angle vector are the same as L delay vectors corresponding to a second angle vector. The first angle vector and the second angle vector may be any two angle vectors in the K angle vectors. The network device may determine the L delay vectors based on the K angle vectors. The network device may traverse the K angle vectors and the L delay vectors, to obtain K×L combinations of angle vectors and delay vectors. Each combination may correspond to one path. Each combination may be used to determine one angle-delay pair.

In another possible design, one or more of the L delay vectors may correspond to one of the K angle vectors. In other words, delay vectors corresponding to at least two of the K angle vectors are different. Because each angle may have one or more delays, the one or more delays may correspond to one or more paths that have a same angle but different delays. The network device may determine one or more delay vectors based on each angle vector. Herein, each angle and a delay corresponding to the angle may be determined based on a same path, and may be used to determine an angle-delay pair. For example, for the $k^{th}$ angle vector in the K angle vectors, the network device may determine $L_k$ ($L_k \geq 1$, and $L_k$ is an integer) delay vectors. The $k^{th}$ angle vector and any one of the $L_k$ delay vectors may be used to determine one angle-delay pair. For the K angle vectors, L may satisfy:

$$L \leq \sum_{k=1}^{K} L_k.$$

Herein, that delay vectors corresponding to at least two angle vectors are different may mean that the delay vectors corresponding to the at least two angle vectors are different, but delay vectors corresponding to other angle vectors may be the same or may be different. In other words, the delay vectors corresponding to the angle vectors may be partially or all different.

That delay vectors corresponding to two angle vectors are different may mean that the delay vectors corresponding to the two angle vectors are all different, in other words, the delay vectors corresponding to the two angle vectors are not repeated or have no intersection. For example, the angle vector $a(\theta_1)$ corresponds to a delay vector $b(\tau_2)$, and the angle vector $a(\theta_2)$ corresponds to delay vectors $b(\tau_1)$ and $b(\tau_3)$. That delay vectors corresponding to two angle vectors are different may alternatively mean that the delay vectors corresponding to the two angle vectors are partially different. In other words, the delay vectors corresponding to the two angle vectors are partially repeated but are not all the same, or the delay vectors corresponding to the two angle vectors have an intersection but are not all the same. For example, the angle vector $a(\theta_1)$ corresponds to a delay vector $b(\tau_2)$, and the angle vector $a(\theta_2)$ corresponds to delay vectors b(τ₁), b(τ₂), and b(τ₃). When delay vectors corresponding to any two of the K angle vectors are not repeated, $$L = \sum_{k=1}^{K} L_k.$$

When delay vectors corresponding to two or more of the K angle vectors are partially repeated, $$L < \sum_{k=1}^{K} L_k.$$

Therefore, the network device may obtain $$\sum_{k=1}^{K} L_k$$

combinations of angle vectors and delay vectors based on the K angle vectors and the L delay vectors. Each combination may correspond to one path. Each combination may be used to determine one angle-delay pair.

For example, the network device may determine, by using a JADE algorithm in the conventional technology, the one or more delay vectors corresponding to each angle vector, or may determine, through DFT, the one or more delay vectors corresponding to each angle vector. A specific manner in which the network device determines a delay vector corresponding to each angle vector is non-limiting.

An example in which DFT is performed on a space-frequency matrix $H_{UL}$ of an uplink channel is used. It is assumed that the delay vector is obtained from the DFT matrix. The network device may perform space domain DFT and frequency domain DFT on the uplink channel $H_{UL}$ to obtain a coefficient matrix $C_{UL}$, and may determine L relatively strong columns in the coefficient matrix $C_{UL}$. The network device may determine, based on a sum of squares of moduli of elements in each row in the coefficient matrix $C_{UL}$, L columns with relatively large sums of squares of moduli. The L columns with relatively large sums of squares of moduli may be used to determine the L delay vectors. Positions of the L rows in the coefficient matrix $C_{UL}$ may be positions of the L delay vectors in the foregoing delay vector set. For example, column sequence numbers of the L columns in the coefficient matrix $C_{UL}$ may be column sequence numbers of the L delay vectors in the delay vector set. Therefore, the L delay vectors may be determined. The L delay vectors are delay vectors selected from the delay vector set.

Alternatively, the network device may determine one or more relatively strong delay vectors based on each of the K relatively strong rows in the coefficient matrix $C_{UL}$. For example, for a $k^{th}$ row in the K rows, the network device may determine, based on a square of a modulus of each element, one or more elements whose squares of moduli each are greater than a preset value, for example, $L_k$ elements. The preset value may be a predefined value. For example, the preset value may be 80% of a sum of squares of the moduli of the elements in this column. The $L_k$ elements whose squares of moduli each are greater than the preset value may be used to determine the $L_k$ delay vectors. For example, columns in which the $L_k$ elements whose squares of the moduli each are greater than the preset value are located in the coefficient matrix $C_{UL}$ may be used to determine positions of the $L_k$ delay vectors in the predefined delay vector set. For example, column sequence numbers of the $L_k$ elements whose squares of the moduli each are greater than the preset value in the coefficient matrix $C_{UL}$ may be column sequence numbers of the $L_k$ delay vectors in the delay vector set. For the K angle vectors, a total quantity of delay vectors may be L. The L delay vectors are delay vectors selected from the delay vector set.

It may be understood that two possible implementations in which the network device determines the L delay vectors are described in detail above only for ease of understanding. A specific implementation in which the network device determines the L delay vectors is non-limiting.

It may be further understood that the L delay vectors may alternatively not be determined through uplink channel measurement. For example, the L delay vectors may be predefined, for example, defined in a protocol; or the L delay vectors may be determined by performing statistics collection based on one or more previous downlink channel measurements. A manner of obtaining the L delay vectors is not limited in the embodiments.

The network device may indicate the L delay vectors to the terminal device in a plurality of possible manners by using the second indication information. Several possible implementations are enumerated as examples below only for ease of understanding.

Manner 1: The network device indicates one or more selected delay vectors in a delay vector set by using a bitmap.

The second indication information may include K bitmaps, and a $k^{th}$ bitmap in the K bitmaps is used to indicate $L_k$ delay vectors that are in the delay vector set and that correspond to the $k^{th}$ angle vector.

A quantity of bits included in each bitmap or a length of each bitmap may be, for example, a quantity of delay vectors included in the delay vector set.

When delay vectors corresponding to at least two angle vectors are different, the network device may indicate one or more corresponding delay vectors based on each angle vector. The network device may indicate, by using each of the K bitmaps, one or more delay vectors corresponding to each of the K angle vectors.

In other words, the K bitmaps may be in a one-to-one correspondence with the K angle vectors (or the K ports). Each bitmap may be used to indicate one or more delay vectors corresponding to one angle vector. The one or more delay vectors corresponding to each angle vector may be determined from the predefined delay vector set. For example, for the $k^{th}$ angle vector in the K angle vectors, the terminal device may indicate, by using the $k^{th}$ bitmap, the $L_k$ delay vectors corresponding to the $k^{th}$ angle vector.

Each bitmap may include a plurality of bits, and each bit corresponds to one delay vector in the predefined delay vector set. When a bit indicates "0", it may be considered that a delay vector corresponding to the bit is not selected. Alternatively, when a bit indicates "1", it may be considered that a delay vector corresponding to the bit is selected, in other words, the delay vector corresponding to the bit is a delay vector indicated by the terminal device to the network device, or is one of delay vectors indicated by the terminal device to the network device. It may be understood that a meaning expressed by a value of the indicator bit enumerated herein is merely an example, and shall not constitute any limitation on the embodiments.

In addition, when the delay vectors corresponding to the at least two angle vectors are different, the network device further indicates a correspondence between each angle vector and a delay vector. The network device may indicate the one or more delay vectors corresponding to each of the K angle vectors to the terminal device in a predefined order by using each of the K bitmaps. Because the precoded reference signals obtained through precoding based on the K angle vectors correspond to the K ports, the network device may indicate the K bitmaps respectively corresponding to the K angle vectors, for example, in descending or ascending order of port numbers, and the terminal device may also determine, in a predefined order, one or more delay vectors corresponding to each port. Alternatively, when indicating the K bitmaps respectively corresponding to the K angle vectors, the network device may indicate, by using an additional indicator bit, a port number corresponding to each bitmap, so that the terminal device determines one or more delay vectors corresponding to each port.

When any two of the K angle vectors correspond to L same delay vectors, the network device may generate indication information to indicate the L delay vectors only once. The network device may indicate the L delay vectors by using one bitmap. The bitmap may be used to indicate the L delay vectors that are in the delay vector set and that correspond to the K angle vectors.

The second indication information may include one bitmap, and the bitmap may be used to indicate $L_k$ delay vectors that are in the delay vector set and that correspond to the $k^{th}$ angle vector in the K angle vectors.

A length of the bitmap may be K times the quantity of delay vectors included in the delay vector set.

The bitmap is also equivalent to a bitmap that is obtained by splicing the K bitmaps and whose length is the quantity of delay vectors in the delay vector set. In other words, the bitmap may include K groups of indicator bits, and each group of indicator bits may be used to indicate one or more delay vectors corresponding to one angle vector.

The network device may arrange the K groups of indicator bits in a predefined order, so that the terminal device determines, in the predefined order, the one or more delay vectors corresponding to each angle vector (or each port).

Figure 4:
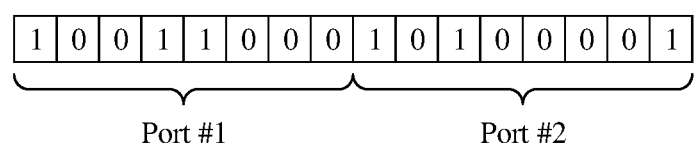
FIG. 4 is a schematic diagram of a bitmap according to an embodiment.

FIG. 4 is a schematic diagram of a bitmap according to an embodiment. The figure shows an example in which a quantity of ports is 2 (in other words, a quantity of angle vectors is: K=2) and a delay vector set includes eight delay vectors. The terminal device may indicate, by using a bitmap whose length is 16 bits, a delay vector corresponding to each angle vector. As shown in the figure, for an angle vector corresponding to a port #1, the network device selects a first delay vector, a fourth delay vector, and a fifth delay vector in the delay vector set; and for an angle vector corresponding to a port #2, the network device selects the first delay vector, a third delay vector, and an eighth delay vector in the delay vector set. The terminal device may determine, in a port number arrangement order, a delay vector corresponding to each port.

When any two of the K angle vectors correspond to L same delay vectors, the bitmap may be evolved into a bitmap whose length is the quantity of delay vectors in the delay vector set. The bitmap may be used to indicate the L delay vectors that are in the delay vector set and that correspond to the K angle vectors.

Manner 2: The network device may indicate one or more selected delay vectors by using an index of a delay vector combination.

The second indication information may include K indexes, and a $k^{th}$ index in the K indexes is an index, in the delay vector set, of a combination of $L_k$ delay vectors corresponding to the $k^{th}$ angle vector.

When delay vectors corresponding to at least two angle vectors are different, the network device may indicate one or more corresponding delay vectors based on each angle vector. The network device may indicate, by using each of the K indexes, one or more delay vectors corresponding to each of the K angle vectors.

In other words, the K indexes may be in a one-to-one correspondence with the K angle vectors (or the K ports). Each index may be used to indicate a position, in the predefined delay vector set, of a combination of one or more delay vectors corresponding to one angle vector. For example, the network device and the terminal device may predefine a one-to-one correspondence between a plurality of delay vector combinations and a plurality of indexes. Each index may be used to indicate one delay vector combination. Each combination may include one or more delay vectors. For example, for the $k^{th}$ angle vector in the K angle vectors, the terminal device may indicate, by using the $k^{th}$ index, the $L_k$ delay vectors corresponding to the $k^{th}$ angle vector.

Further, the foregoing predefined one-to-one correspondence between a plurality of delay vector combinations and a plurality of indexes may be defined based on combinations of different quantities of delay vectors. For example, for a combination of four delay vectors, a one-to-one correspondence between a plurality of combinations and a plurality of indexes may be predefined. For another example, for a combination of eight delay vectors, a one-to-one correspondence between a plurality of combinations and a plurality of indexes may be predefined. For the combinations of different quantities of delay vectors, indexes may be repeated.

The network device may determine an index based on to-be-fed-back delay vectors and a quantity, and the terminal device may determine the $L_k$ delay vectors based on the quantity of delay vectors and the index. For example, the network device may determine, based on the $L_k$ to-be-indicated delay vectors and the quantity $L_k$, an index of a combination of the $L_k$ delay vectors in the delay vector set. Because the value of $L_k$ may be determined by the network device, optionally, the second indication information may be further used to indicate the quantity of delay vectors corresponding to each of the K angle vectors. Therefore, the terminal device may determine the one or more selected delay vectors based on the quantity of delay vectors and the index.

It may be understood that the foregoing enumerated one-to-one correspondence between a plurality of delay vector combinations and a plurality of indexes is merely an example, and shall not constitute any limitation on the embodiments. For example, for the combinations of different quantities of delay vectors, indexes are alternatively not be repeated.

When the delay vectors corresponding to the at least two angle vectors are different, the network device may further indicate a correspondence between each angle vector and a delay vector. The network device may indicate, to the terminal device in a predefined order by using each of the K indexes, the one or more delay vectors corresponding to each of the K angle vectors. Because the precoded reference signals obtained through precoding based on the K angle vectors correspond to the K ports, the network device may indicate the K indexes respectively corresponding to the K angle vectors, for example, in descending or ascending order of port numbers, and the terminal device may also determine, in a predefined order, one or more delay vectors corresponding to each port. Alternatively, when indicating the K indexes respectively corresponding to the K angle vectors, the network device may indicate, by using an additional indicator bit, a port number corresponding to each index, so that the terminal device determines one or more delay vectors corresponding to each port.

When any two of the K angle vectors correspond to L same delay vectors, the network device may generate indication information to indicate the L delay vectors only once. The network device may indicate the L delay vectors by using one index. The index may be used to indicate the L delay vectors that are in the delay vector set and that correspond to the K angle vectors.

Manner 3: The network device may indicate one or more selected delay vectors by using a delay vector index.

The second indication information may include K groups of indexes, and a $k^{th}$ group of indexes in the K groups of indexes may include an index of each of $L_k$ delay vectors in the delay vector set.

When delay vectors corresponding to at least two angle vectors are different, the network device may indicate one or more corresponding delay vectors based on each angle vector. The network device may indicate, by using each of the K groups of indexes, one or more delay vectors corresponding to each of the K angle vectors. Each group of indexes may include one or more indexes respectively used to indicate one or more delay vectors in the delay vector set.

The K groups of indexes may be in a one-to-one correspondence with the K angle vectors (or the K ports). Each group of indexes may be used to indicate a position, in the predefined delay vector set, of one or more delay vectors corresponding to one angle vector. For example, the network device and the terminal device may predefine an index of each delay vector in the delay vector set. Each index corresponds to one delay vector. In this case, the $k^{th}$ group of indexes may include the index of each of the $L_k$ delay vectors in the delay vector set.

In addition, when the delay vectors corresponding to the at least two angle vectors are different, the network device further indicates a correspondence between each angle vector and a delay vector. The network device may indicate, to the terminal device in a predefined order by using each of the K groups of indexes, the one or more delay vectors corresponding to each of the K angle vectors. Because the precoded reference signals obtained through precoding based on the K angle vectors correspond to the K ports, the network device may indicate the K groups of indexes respectively corresponding to the K angle vectors, for example, in descending or ascending order of port numbers, and the terminal device may also determine, in a predefined order, one or more delay vectors corresponding to each port. Alternatively, when indicating the K groups of indexes respectively corresponding to the K angle vectors, the network device may indicate, by using an additional indicator bit, a port number corresponding to each index, so that the terminal device determines one or more delay vectors corresponding to each port.

When any two of the K angle vectors correspond to L same delay vectors, the network device may generate indication information to indicate the L delay vectors only once. The network device may indicate the L delay vectors by using one group of indexes. The group of indexes may include L indexes, to respectively indicate the L delay vectors that are in the delay vector set and that correspond to the K angle vectors.

Manner 4: The network device may indicate, by using an index of an angle delay pair combination, one or more delay vectors corresponding to each angle vector.

Because the one or more delay vectors corresponding to each angle vector are from a same delay vector set, the network device may combine each of the K angle vectors corresponding to the K ports with the delay vector set in a predefined order, to obtain an angle-delay pair set. It may be understood that the combination of each of the K angle vectors and the delay vector set may be a logical combination, and is not necessarily a combination of an angle vector set and a delay vector set. Therefore, the angle-delay pair set may be a logical set, and the network device and the terminal device do not necessarily pre-store the angle-delay pair set.

After the network device repeatedly uses the delay vector set for K times in a predefined order, K delay vector sets that are in a one-to-one correspondence with the K angle vectors may be obtained. The K delay vector sets are the same in pairs, and each delay vector set includes a plurality of delay vectors. The K delay vector sets may be combined with the K angle vectors to construct K angle-delay pair sets. Each angle-delay pair set may correspond to one of the K angle vectors and all delay vectors in one delay vector set.

During specific implementation, the network device may combine the one or more delay vectors corresponding to each of the K angle vectors, and indicate, by using fourth indication information, an index, in a vector set formed by the K delay vector sets, of a combination of a plurality of delay vectors corresponding to the K angle vectors. The K delay vector sets may be obtained by repeatedly using a same delay vector set for K times. Delay vectors included in any two delay vector sets are the same, and each delay vector set may include a plurality of delay vectors. It may be understood that some of the plurality of delay vectors corresponding to the K angle vectors may be repeated. However, because the repeated delay vectors are combined with different angle vectors to constitute different angle-delay pairs, the index implicitly indicates the plurality of angle-delay pairs.

When delay vectors corresponding to at least two angle vectors are different, the network device may indicate a combination of $$\sum_{k=1}^{K} L_k$$

delay vectors by using the index.

For the $k^{th}$ angle vector in the K angle vectors, the network device may determine $L_k$ delay vectors from the delay vector set. For the K angle vectors, it may be considered that the network device separately determines K groups of delay vectors from the delay vector set, where a quantity of delay vectors in a $k^{th}$ group is $L_k$. Therefore, the network device may indicate the index of the combination of the $$\sum_{k=1}^{K} L_k$$

delay vectors in the K delay vector sets to the terminal device. The index may be used to indicate positions of the $$\sum_{k=1}^{K} L_k$$

delay vectors in the K delay vector sets. In addition, the K groups of delay vectors may be arranged in a predefined order. For example, the K groups of delay vectors respectively corresponding to the K ports are arranged in ascending or descending order of port numbers. Therefore, the index may implicitly indicate a correspondence between each port and a delay vector. This is equivalent to indicating a correspondence between each angle vector and a delay vector, and therefore is equivalent to implicitly indicating a plurality of angle-delay pairs.

For ease of understanding, descriptions are provided herein with reference to the bitmap shown in FIG. 4. The index may be used, for example, to indicate positions of the six selected delay vectors shown in FIG. 4 in the 16 delay vectors (that is, the delay vector set is reused twice).

When any two of the K angle vectors correspond to L same delay vectors, the network device may indicate positions of the L delay vectors in the delay vector set by using an index of a combination of the L delay vectors. In this case, the index is the same as the index described in Manner 2.

It may be understood that, when indicating the one or more delay vectors corresponding to each angle vector to the terminal device, the network device may implicitly or explicitly indicate the correspondence between each angle vector and a delay vector. The foregoing enumerated implementations show possible implementations that may be used to indicate the correspondence between each angle vector and a delay vector. A specific implementation in which the network device indicates the correspondence between each angle vector and a delay vector is not limited in the embodiments.

It may be further understood that, in the plurality of manners enumerated above, if the delay vector set is extended to a plurality of subsets by using an oversampling factor, the network device may select, from one or more subsets, a delay vector corresponding to each angle vector. In this case, the network device may further indicate, by using the second indication information or additional signaling, a subset to which the selected delay vector belongs. A specific method in which the network device selects, from one or more subsets, a delay vector corresponding to each angle vector may be implemented by using a method in the conventional technology. For brevity, detailed descriptions of the specific process are omitted herein.

It may be further understood that the foregoing enumerates several possible implementations in which the network device indicates a delay vector corresponding to each angle vector. A specific manner in which the network device indicates a delay vector corresponding to each angle vector is not limited in the embodiments.

The second indication information may be carried in physical layer signaling. The physical layer signaling may include, for example, DCI.

When the delay changes relatively fast, the network device may add the second indication information to the DCI, so that the terminal device performs downlink channel measurement based on delay information obtained through latest measurement. Therefore, the terminal device may accurately feed back downlink channel information in time.

Further, the second indication information may be jointly encoded with a CSI request, or may be separately encoded with a CSI request.

The second indication information may be carried in higher layer signaling. The higher layer signaling may include, for example, a MAC CE message or an RRC message.

When the delay changes relatively slowly, the network device may add the second indication information to the MAC CE message or the RRC message, so that signaling overheads can be reduced.

It may be understood that the foregoing enumerated signaling used to carry the second indication information is merely an example, and shall not constitute any limitation on the embodiments. The embodiments do not exclude a possibility that the second indication information is carried in other signaling.

In an embodiment, the K angle vectors and the L delay vectors may be obtained through uplink channel measurement. Because of angle reciprocity between uplink and downlink channels, the network device may precode a downlink reference signal based on an angle vector determined through uplink channel measurement, so that the terminal device performs channel estimation based on a precoded reference signal. In addition, there is delay reciprocity between the uplink and downlink channels. However, if a delay vector is also loaded to a downlink reference signal, a relatively large quantity of delays may cause relatively high pilot overheads. Therefore, the network device may indicate the delay vector to the terminal device by using signaling, so that the terminal device can process a channel estimation value based on the pre-obtained delay vector, to determine a weighting coefficient that corresponds to an angle-delay pair and that is used to construct a precoding matrix. Therefore, downlink channel measurement is performed by using an angle and a delay that are reciprocal on the uplink and downlink channels, so that feedback overheads of the terminal device are reduced, and calculation complexity of the terminal device is reduced.

Step 230: The terminal device may generate first indication information based on the preconfigured delay vectors and the received precoded reference signals, where the first indication information may be used to indicate P weighting coefficients corresponding to P angle-delay pairs.

After receiving the precoded reference signals from the network device, the terminal device may perform channel estimation on each RB. In addition, after determining the delay vector corresponding to each angle vector, the terminal device may process the received downlink channel estimation value, to determine the P weighting coefficients corresponding to the P angle-delay pairs.

The P angle-delay pairs may be used to construct a precoding matrix that adapts to the downlink channel. The P angle-delay pairs may be determined based on the K angle vectors and the L delay vectors described above. Each angle-delay pair includes one of the K angle vectors and one of the L delay vectors. Angle vectors and/or delay vectors included in any two angle-delay pairs are different.

The following describes in detail a process in which the terminal device determines, based on the L delay vectors and the precoded reference signals, the P weighting coefficients corresponding to the P angle-delay pairs.

As described above, the space-frequency matrix $H_{DL}$ satisfies: $H_{DL} \times SC_{DL}F^H$ In an embodiment, a dimension of $H_{DL}$ may be T×N. There may be K angle vectors, and a length of each angle vector may be T. In this case, a dimension of S may be T×K. There may be L delay vectors, and a length of each delay vector may be N. In this case, a dimension of F may be N×L. $S^H H_{DL} = C_{DL} F^H$ may be obtained by transforming the foregoing formula, and then $(H_{DL}{}^H S)^H = C_{DL} F^H$ may be further obtained. Herein, $H_{DL}{}^H S$ is a real channel on which space domain precoding is performed, that is, a real channel observed by the terminal device; and a dimension of the real channel may be N×K. Each row in the matrix may represent a channel estimation value $y^{(n)}$ obtained through estimation on one RB based on a received precoded reference signal. Each element in the row vector $y^{(n)}$ may correspond to one of the K angle vectors, that is, a channel estimation value obtained by performing estimation on an $n^{th}$ RB based on the received encoded reference signal corresponding to the $k^{th}$ port.

The following coefficient matrix may be obtained by transforming the foregoing formula: $C_{DL} = (H_{DL}{}^H S)^H F$. To be specific, the terminal device may determine each element in the coefficient matrix $C_{DL}$ according to this calculation formula. In other words, each element in the coefficient matrix $C_{DL}$ may be obtained by multiplying a column in F by a row in a conjugate transpose $(H_{DL}{}^H S)$ of the real channel $H_{DL}{}^H S$.

An element in an $l^{th}$ row and a $k^{th}$ column in the coefficient matrix $C_{DL}$ is obtained by multiplying an $l^{th}$ row in $(H_{DL}{}^H S)^H$ and a $k^{th}$ column in F. The element in the $l^{th}$ row and the $k^{th}$ column in the coefficient matrix $C_{DL}$ is a weighting coefficient corresponding to the $k^{th}$ angle vector and an $l^{th}$ delay vector.

It may be understood from a matrix multiplication operation that a quantity of elements included in each row vector in $(H_{DL}{}^H S)$ is the same as a quantity of elements included in each column vector in F. In an embodiment, both the quantity of elements included in each row vector in $(H_{DL}{}^H S)^H$ and the quantity of elements included in each column vector in F may be N. When a row vector is multiplied by a column vector, each element (for example, an $n^{th}$ element, where n is a value traversed from 1 to N) in the row vector needs to be multiplied by a corresponding element (for example, an $n^{th}$ element, where n is a value traversed from 1 to N) in the column vector, and then a sum is obtained. In addition, N elements in each row in $(H_{DL}{}^H S)^H$ correspond to N RBs (for example, frequency domain units). Therefore, after loading each element in each delay vector to a channel estimation value of each RB, the terminal device sums up the channel estimation values of the N RBs obtained by loading a same delay vector, to obtain a weighting coefficient corresponding to the delay vector.

If precoding on a reference signal is not considered, for each receive antenna, a dimension of a downlink channel may be N×T. A dimension of a downlink channel on one receive antenna and one RB may be 1×T.

Because the network device precodes the reference signal based on each of the K angle vectors, the precoded reference signals received by the terminal device may correspond to the K ports. A real channel received by the terminal device may be represented as $H_{DH}{}^H S$ and a dimension of the real channel is N×K. The N rows correspond to the N RBs, and a dimension of each row is 1×K, which indicates a channel estimation value that is received on one RB and that corresponds to the K ports. K elements in each row vector correspond to the K angle vectors, in other words, the K ports. In this case, if the terminal device performs channel estimation based on a precoded reference signal that is received on one receive antenna and one RB and that is obtained through precoding based on one angle vector, a downlink channel whose dimension is 1×1 may be obtained. The downlink channel whose dimension is 1×1 is a downlink channel estimation value that is received by the terminal device on one receive antenna and one RB and that corresponds to one port.

It is assumed that a channel estimation value obtained by the terminal device by performing downlink channel estimation on the $n^{th}$ RB is denoted as $y^{(n)}$. A $k^{th}$ element in the channel estimation value $y^{(n)}$ may correspond to the $k^{th}$ port in the K ports. In other words, the $k^{th}$ element in the channel estimation value $y^{(n)}$ may correspond to the $k^{th}$ angle vector in the K angle vectors.

In an implementation, the terminal device may determine, based on a downlink channel estimation value obtained through estimation based on a precoded reference signal received on each receive antenna and each RB, a weighting coefficient corresponding to each angle-delay pair.

As described above, a dimension of a downlink channel estimation value that is received by the terminal device on one receive antenna and one RB and that corresponds to one port is 1×1. The terminal device may perform, based on each of the L preconfigured delay vectors, weighted summation on N channel estimation values that are obtained through estimation on the N RBs and that correspond to a same port, to determine one weighting coefficient. In a weighted summation process, a weighting coefficient of an $n^{th}$ channel estimation value in the N channel estimation values may be an $n^{th}$ element in the delay vector. For example, for the $l^{th}$ delay vector in the L delay vectors, the terminal device may respectively use N elements in the delay vector as weighting coefficients of downlink channel estimation values that are obtained through estimation on the N RBs and that correspond to the $k^{th}$ port, to determine a weighting coefficient $\alpha_{k,l_k}$ corresponding to an angle-delay pair formed by the $k^{th}$ angle vector and the $l^{th}$ delay vector. The weighting coefficient $\alpha_{k,l}$ may also be determined by using a calculation formula $$\alpha_{k,l} = \sum_{n=1}^{N} \overline{y}_k^{(n)} b(\tau_l)_n.$$

Herein, $y_k^{(n)}$ represents a $k^{th}$ element in a vector $y^{(n)}$, $\overline{y}_k^{(n)}$ represents a conjugate of $y_k^{(n)}$, and $b(\tau_l)_n$ represents an $n^{th}$ element in a vector $b(\tau_l)$.

Because the weighting coefficient is obtained by performing, based on one delay vector, weighted summation on estimation values obtained by performing channel estimation based on precoded reference signals corresponding to a same port, the weighting coefficient may be a weighting coefficient corresponding to one angle-delay pair.

The L delay vectors may be L delay vectors corresponding to each of the K angle vectors, or may be a universal set of one or more delay vectors corresponding to each of the K angle vectors. In other words, for an $l_k^{th}$ delay vector $b(\tau_{l_k})$ in the $L_k$ delay vectors corresponding to the $k^{th}$ angle vector, the terminal device may determine a weighting coefficient $\alpha_{k,l_k}$ corresponding to an angle-delay pair formed by the $k^{th}$ angle vector and the $l_k^{th}$ delay vector. The weighting coefficient $\alpha_{k,l_k}$ may also be determined by using a calculation formula $$\alpha_{k,l_k} = \sum_{n=1}^{N} \overline{y}_k^{(n)} b(\tau_{l_k})_n.$$

When the L delay vectors correspond to each of the K angle vectors, the terminal device may alternatively perform, based on each of the L preconfigured delay vectors, weighted summation on channel estimation values obtained through estimation on the N RBs, to determine a weighting coefficient corresponding to each angle-delay pair.

For the $l^{th}$ delay vector in the L delay vectors, the terminal device may respectively use N elements in the $l^{th}$ delay vector as weighting coefficients of downlink channel estimation values obtained through estimation on the N RBs, to determine weighting coefficients corresponding to K angle-delay pairs, where the K angle-delay pairs may be K angle-delay pairs that each are formed by the $l^{th}$ delay vector and each of the K angle vectors, and may be referred to as weighting coefficients corresponding to the $l^{th}$ delay vector. The K weighting coefficients may be represented as a vector $c_l$ whose dimension is 1×K. In this case, the vector $c_l$ may be determined by using a calculation formula $$c_l = \sum_{n=1}^{N}(y^{(n)})^* b(\tau_l)^{(n)}.$$

It may be understood that a relationship between a space-frequency matrix $H_{DL}$ and a channel matrix shown in the embodiments are merely an example. Different definition manners may cause changes of the relationship between a space-frequency matrix and a channel matrix. However, regardless of a definition, only internal implementation of the network device and that of the terminal device are affected. Internal implementation behavior of the network device and that of the terminal device are non-limiting.

In another implementation, the terminal device may determine, based on a downlink channel estimation value obtained through estimation based on a precoded reference signal that is received on each receive antenna and that corresponds to each port, a weighting coefficient corresponding to each angle-delay pair.

The terminal device may determine, based on downlink channel estimation values that are received on the N RBs and that correspond to a same port, a downlink channel estimation value corresponding to each port. For example, for the $k^{th}$ port, a downlink channel estimation value may be a vector whose dimension is N×1, for example, denoted as $y^{(k)}$. An $n^{th}$ element in $y^{(k)}$ may be an estimation value obtained through channel estimation based on a precoded reference signal that is received on an $n^{th}$ RB and that corresponds to the $k^{th}$ port.

For the $l^{th}$ delay vector $b(\tau_l)$ in the L delay vectors, the terminal device may determine a weighting coefficient $\alpha_{k,l}$ corresponding to an angle-delay pair formed by the $k^{th}$ angle vector and the $l^{th}$ delay vector. The weighting coefficient $\alpha_{k,l}$ may also be determined by using a calculation formula $\alpha_{k,l}=(y^{(k)})^H b(\tau_l)$.

Actually, the L delay vectors may be L delay vectors corresponding to each of the K angle vectors, or may be a universal set of one or more delay vectors corresponding to each of the K angle vectors. In other words, for an $l_k^{th}$ delay vector $b(\tau_{l_k})$ in the $L_k$ delay vectors corresponding to the $k^{th}$ angle vector, the terminal device may determine a weighting coefficient $\alpha_{k,l_k}$ corresponding to an angle-delay pair formed by the $k^{th}$ angle vector and the $l_k^{th}$ delay vector. The weighting coefficient $\alpha_{k,l_k}$ may also be determined by using a calculation formula $\alpha_{k,l_k}=(y^{(k)})^H b(\tau_{l_k})$.

It may be understood that the foregoing enumerated method for determining a weighting coefficient corresponding to each angle-delay pair and the calculation formula are merely examples, and shall not constitute any limitation on the embodiments. A specific method for determining a weighting coefficient corresponding to each angle-delay pair is non-limiting. In addition, different delay vector definitions may cause changes of the calculation formula. For example, when the delay vector is a row vector, the weighting coefficient $\alpha_{k,l}$ may also be determined by using a calculation formula $\alpha_{k,l}=(y^{(k)})^H b(\tau_l)^T$. A specific form of each vector is not limited in the embodiments. Therefore, a vector operation manner is not limited either.

It may be noted that an example in which precoded reference signals carried on each RB correspond to K ports is shown above only for ease of understanding. The precoded reference signals carried on each RB may alternatively be obtained through precoding based on different angle vectors. In other words, angle vectors corresponding to the precoded reference signals carried on each RB may be at least partially different. In this case, quantities of ports corresponding to the precoded reference signals carried on each RB may be the same or may be different, and port numbers corresponding to the precoded reference signals carried on each RB may be the same or may be different.

The network device may group a plurality of RBs in the measurement bandwidth to obtain a plurality of frequency domain groups. Precoded reference signals carried on RBs in a same frequency domain group may correspond to a same angle vector, and precoded reference signals carried on RBs in different frequency domain groups may correspond to different angle vectors. When the network device groups the RBs, the terminal device may still perform, according to the following method, channel estimation on the plurality of RBs based on the precoded reference signal corresponding to each port, to obtain the plurality of channel estimation values, and further determine the P weighting coefficients corresponding to the P angle-delay pairs.

According to the foregoing enumerated method, the terminal device may determine the P weighting coefficients corresponding to the P angle-delay pairs. Then, the terminal device may generate the first indication information to indicate the P weighting coefficients.

The terminal device may indicate the P weighting coefficients, for example, through normalization.

For example, the terminal device may determine a weighting coefficient with a largest modulus (for example, denoted as a largest weighting coefficient) from the P weighting coefficients, and indicate a position of the largest weighting coefficient in the P weighting coefficients. The terminal device may further indicate relative values of the remaining P−1 weighting coefficients relative to the largest weighting coefficient. The terminal device may indicate the P−1 weighting coefficients by using quantized value indexes of the relative values. For example, the network device and the terminal device may predefine a one-to-one correspondence between a plurality of quantized values and a plurality of indexes, and the terminal device may feed back the relative values of the weighting coefficients relative to the largest weighting coefficient to the network device based on the one-to-one correspondence. Because the terminal device quantizes each weighting coefficient, and a quantized value may be the same as or approximate to an actual value, the quantized value is referred to as a quantized value of the weighting coefficient.

The terminal device may indicate, in a pre-agreed order, a weighting coefficient corresponding to each angle vector. For example, the P weighting coefficients are grouped into K groups based on the K ports, and the K groups of weighting coefficients are arranged into an ordered array in ascending or descending order of port numbers of the K ports. The first indication information may indicate a position of a normalized coefficient in the ordered array, and sequentially indicate the remaining P−1 weighting coefficients based on positions of the weighting coefficients in the ordered array other than the normalized coefficient. Therefore, the network device may determine the P weighting coefficients corresponding to the P angle-delay pairs.

If any two of the K angle vectors correspond to L same delay vectors, when indicating the P weighting coefficients by using the first indication information, the terminal device may further construct, based on the K angle vectors and the L delay vectors, a matrix whose dimension is K×L. An element in a $k^{th}$ row and an $l^{th}$ column in the matrix may be a weighting coefficient corresponding to the $k^{th}$ angle vector and the $l^{th}$ delay vector, that is, a weighting coefficient corresponding to an angle-delay pair formed by the $k^{th}$ angle vector and the $l^{th}$ delay vector. The first indication information may indicate a position of a normalized coefficient in the matrix, for example, a row and a column in which the normalized coefficient is located, and indicate the P−1 weighting coefficients other than the normalized coefficient in an order of "first row and then column" or "first column and then row". The network device may restore, in a same manner, the P weighting coefficients corresponding to the P angle-delay pairs.

The terminal device may alternatively construct, based on the L delay vectors and the K angle vectors, a matrix whose dimension is L×K. A correspondence between each element in a matrix and an angle-delay pair is similar to that described above. An element in an $l^{th}$ row and a $k^{th}$ column in the matrix may be a weighting coefficient corresponding to the $l^{th}$ delay vector and the $k^{th}$ angle vector, that is, a weighting coefficient corresponding to an angle-delay pair formed by the $l^{th}$ delay vector and the $k^{th}$ angle vector. The network device may restore, in a same manner, the P weighting coefficients corresponding to the P angle-delay pairs.

It may be understood that the foregoing enumerated manner of indicating each weighting coefficient through normalization is merely a possible implementation, and is not limiting. For example, a quantized value index of each of the P weighting coefficients may also be indicated.

It may be noted that the normalization mentioned above may mean determining a largest weighting coefficient by using each receive antenna as a unit, to perform normalization within a range of quantization information corresponding to each receive antenna. In an embodiment, the terminal device may alternatively determine a largest weighting coefficient by using a plurality of receive antennas, one polarization direction, a plurality of polarization directions, or one port as a unit, to perform normalization within a range of quantization information corresponding to the plurality of receive antennas, each polarization direction, the plurality of polarization directions, or the one port.

It may be further understood that the first indication information may be used to directly or indirectly indicate the P weighting coefficients. For example, for the largest weighting coefficient, a position of the largest weighting coefficient in the P weighting coefficients may be indicated. For another example, for a weighting coefficient whose quantized value is zero, a position of the weighting coefficient in the P weighting coefficients may also be indicated. In other words, the first indication information does not necessarily indicate a quantized value of each of the P weighting coefficients, provided that the network device can restore the P weighting coefficients based on the first indication information.

It may be noted that a specific process in which the terminal device generates the first indication information is described in detail above by using a transmit antenna and a receive antenna in one polarization direction as an example. In other words, the P weighting coefficients may be determined based on a precoded reference signal that is sent by a transmit antenna in one polarization direction and that is received by one receive antenna.

When a plurality of receive antennas are configured for the terminal device, one receive antenna described above as an example may be any one of the plurality of receive antennas configured for the terminal device. In other words, the terminal device may determine the P weighting coefficients for each receive antenna according to the foregoing method.

When transmit antennas in a plurality of polarization directions are configured for the network device, the polarization direction described above as an example may be any one of the plurality of polarization directions. In other words, the terminal device may determine, according to the foregoing method, the P weighting coefficients based on a precoded reference signal sent for a transmit antenna in each polarization direction.

If a quantity of polarization directions is 1, and a quantity of receive antennas is R, where R>1, and R is an integer, the first indication information may be used to indicate R groups of weighting coefficients corresponding to the R receive antennas, and each group of weighting coefficients may include P weighting coefficients.

Herein, the R groups of weighting coefficients corresponding to the R receive antennas are R groups of weighting coefficients determined based on a precoded reference signal received on each of the R receive antennas.

When indicating, by using the first indication information, the R groups of weighting coefficients corresponding to the R receive antennas, the terminal device may determine and indicate one group of weighting coefficients based on the precoded reference signal received on each receive antenna. Each group of weighting coefficients may include the P weighting coefficients corresponding to the P angle-delay pairs. When the first indication information is used to indicate a weighting coefficient, the first indication information may include indication information of R×P weighting coefficients.

When the first indication information is used to indicate the R×P weighting coefficients corresponding to the R receive antennas, the P weighting coefficients corresponding to each receive antenna may be indicated through normalization by using each receive antenna as a unit.

An implementation in which the terminal device performs normalization within a quantization range of one receive antenna to indicate P weighting coefficients has been described in detail above. For brevity, details are not described herein again.

It may be understood that the terminal device may indicate, in a pre-agreed order through normalization, the R groups of weighting coefficients corresponding to the R receive antennas. For example, the terminal device may indicate the R groups of weighting coefficients in the predefined order of indicating the R receive antennas. The order of indicating the R groups of weighting coefficients corresponding to the R receive antennas is non-limiting, provided that the network device can restore, based on the first indication information, the R×P weighting coefficients corresponding to the R receive antennas.

The first indication information may alternatively be used to indicate the R×P weighting coefficients on the R receive antennas through normalization by using a plurality of receive antennas as a unit.

A largest weighting coefficient may be determined from the RX P weighting coefficients corresponding to the plurality of receive antennas, to indicate a position of the largest weighting coefficient. The terminal device may further determine relative values of the remaining R×P−1 weighting coefficients relative to the largest weighting coefficient, to indicate the R×P−1 weighting coefficients by using quantized value indexes of the relative values.

In the pre-agreed order of indicating the R receive antennas, the terminal device may construct a matrix whose dimension is R×P, where an element in an $r^{th}$ row in the matrix may be P weighting coefficients corresponding to an $r^{th}$ receive antenna; or may construct a matrix whose dimension is P×R, where an element in an $r^{th}$ column in the matrix may be P weighting coefficients corresponding to an $r^{th}$ receive antenna. The first indication information may indicate a position of a normalized coefficient in the matrix, for example, a row and a column in which the normalized coefficient is located, and indicate the remaining R×P−1 weighting coefficients in an order of "first row and then column" or "first column and then row". Therefore, the network device determines the R groups of weighting coefficients corresponding to the R receive antennas.

The terminal device may connect, in the pre-agreed order of indicating the R receive antennas, the R×P weighting coefficients in an order from a first receive antenna to an $R^{th}$ receive antenna, to obtain an ordered array including R×P elements. The first indication information may indicate a position of a normalized coefficient in the ordered array, and sequentially indicate the remaining P−1 weighting coefficients based on positions of the weighting coefficients in the ordered array other than the normalized coefficient. Therefore, the network device may determine the R groups of weighting coefficients corresponding to the R receive antennas.

It may be understood that a specific method in which the terminal device performs normalization within a range of quantization information of a plurality of receive antennas is the same as a specific method for performing normalization within a range of quantization information of one receive antenna. For brevity, details are not described herein again.

It may be further understood that the terminal device may indicate, in a pre-agreed order through normalization, the weighting coefficients corresponding to a plurality of receive antennas. For example, the terminal device may indicate the weighting coefficients other than the normalized coefficient in the predefined order of indicating the R receive antennas. The order in which the terminal device indicates weighting coefficients is non-limiting, provided that the network device can restore, based on the first indication information, the R×P weighting coefficients corresponding to the R receive antennas.

It may be further understood that quantities of weighting coefficients in the R groups of weighting coefficients corresponding to the R receive antennas are not necessarily the same. When quantities of delay vectors indicated by the network device for different receive antennas are different, quantities of angle-delay pairs determined based on the K angle vectors may also be different. For example, for an $r^{th}$ receive antenna, the first indication information may indicate $P_r$ weighting coefficients. It can be understood that $P_r$ may be considered as an example of P. The terminal device may still indicate, in the foregoing enumerated manner, the R groups of weighting coefficients corresponding to the R receive antennas.

If a quantity of receive antennas is 1, and a quantity of polarization directions is J, where J>1, and J is an integer, the first indication information may be used to indicate J groups of weighting coefficients corresponding to the J polarization directions. Each group of weighting coefficients may include P weighting coefficients.

Herein, the J groups of weighting coefficients corresponding to the J polarization directions are J groups of weighting coefficients determined based on a precoded reference signal transmitted by a transmit antenna in each of the J polarization directions.

When indicating, by using the first indication information, the J groups of weighting coefficients corresponding to the J polarization directions, the terminal device may determine and indicate one group of weighting coefficients based on the precoded reference signal transmitted in each polarization direction. Each group of weighting coefficients may include the P weighting coefficients corresponding to the P angle-delay pairs. When the first indication information is used to indicate a weighting coefficient, the first indication information may include indication information of J×P weighting coefficients.

When the first indication information is used to indicate the JXP weighting coefficients corresponding to the J polarization directions, the P weighting coefficients corresponding to each polarization direction may be indicated through normalization by using each polarization direction as a unit.

An implementation in which the terminal device performs normalization within a quantization range of one polarization direction to indicate P weighting coefficients has been described in detail above. For brevity, details are not described herein again.

It may be understood that the terminal device may indicate, in a pre-agreed order through normalization, the J groups of weighting coefficients corresponding to the J polarization directions. For example, the terminal device may indicate the J groups of weighting coefficients in the predefined order of indicating the J polarization directions. The order of indicating the J groups of weighting coefficients corresponding to the J polarization directions is non-limiting, provided that the network device can restore, based on the first indication information, the J×P weighting coefficients corresponding to the J polarization directions.

The first indication information may alternatively be used to indicate the J×P weighting coefficients in the J polarization directions through normalization by using a plurality of polarization directions as a unit.

A largest weighting coefficient may be determined from the J×P weighting coefficients corresponding to the plurality of polarization directions, to indicate a position of the largest weighting coefficient. The terminal device may further determine relative values of the remaining J×P−1 weighting coefficients relative to the largest weighting coefficient, to indicate the J×P−1 weighting coefficients by using quantized value indexes of the relative values.

It may be understood that a specific method in which the terminal device performs normalization within a range of quantization information of a plurality of polarization directions is the same as a specific method for performing normalization within a range of quantization information of one polarization direction. For brevity, details are not described herein again.

It may be further understood that the terminal device may indicate, in a pre-agreed order through normalization, weighting coefficients corresponding to a plurality of polarization directions. For example, the terminal device may indicate the weighting coefficients other than the normalized coefficient in the predefined order of indicating the J polarization directions. The order in which the terminal device indicates weighting coefficients is not limited in the embodiments, provided that the network device can restore, based on the first indication information, the J×P weighting coefficients corresponding to the J polarization directions.

It may be further understood that quantities of weighting coefficients in the J groups of weighting coefficients corresponding to the J polarization directions are not necessarily the same. When quantities of delay vectors indicated by the network device for different polarization directions are different, quantities of angle-delay pairs determined based on the K angle vectors may also be different. For example, for a $j^{th}$ polarization direction, the first indication information may indicate $P_j$ weighting coefficients. It may be understood that $P_j$ may be considered as an example of P. The terminal device may still indicate, in the foregoing enumerated manner, the J groups of weighting coefficients corresponding to the J polarization directions.

If a quantity of receive antennas is R, and a quantity of polarization directions is J, the first indication information may be used to indicate J×R groups of weighting coefficients corresponding to the J polarization directions and the R receive antennas. Each group of weighting coefficients may include P weighting coefficients.

A weighting coefficient corresponding to one polarization direction and one receive antenna may be a weighting coefficient determined based on a precoded reference signal that is sent by a transmit antenna in the polarization direction and that is received on the receive antenna.

The first indication information may be used to indicate J×R×P weighting coefficients corresponding to the J polarization directions and the R receive antennas, through normalization by using the J polarization directions and the R receive antennas as a unit, or through normalization by using one polarization direction and the R receive antennas as a unit, or through normalization by using the J polarization directions and one receive antenna as a unit.

It may be understood that a specific method in which the terminal device indicates a plurality of weighting coefficients through normalization has been described in detail above. For brevity, details are not described herein again.

It may be further understood that the terminal device may indicate, in a pre-agreed order through normalization, weighting coefficients corresponding to a plurality of polarization directions and a plurality of receive antennas. For example, the terminal device may indicate the weighting coefficients other than the normalized coefficient in the predefined order of indicating the J polarization directions and the R receive antennas. The order in which the terminal device indicates weighting coefficients is not limited in the embodiments, provided that the network device can restore, based on the first indication information, the J×R×P weighting coefficients corresponding to the J polarization directions and the R receive antennas.

It may be further understood that the manner of indicating a weighting coefficient through normalization is merely a possible implementation, and shall not constitute any limitation on the embodiments. A specific manner in which the first indication information indicates a weighting coefficient is not limited in the embodiments.

When a weighting coefficient is fed back based on a receive antenna, the terminal device may further indicate a quantity of receive antennas. The method 200 may further include: The terminal device sends seventh indication information, where the seventh indication information is used to indicate a quantity of receive antennas. Correspondingly, the network device receives the seventh indication information.

The seventh indication information and the first indication information may be sent by using same signaling, for example, a PMI or CSI, or may be sent by using different signaling.

It may be understood that the quantity of receive antennas of the terminal device may alternatively be predefined, for example, defined in a protocol. In this case, the terminal device may not indicate the quantity of receive antennas by using additional signaling.

Actually, the terminal device may feed back a downlink channel measurement result based on each receive antenna, or the terminal device may feed back a downlink channel measurement result based on a transport layer.

There may be one or more transport layers.

When a quantity of transport layers is greater than 1, the transport layers may share one or more same delay vectors. For example, the transport layers and the polarization directions may share L same delay vectors, or delay vectors corresponding to the polarization directions are different from each other. If a quantity of delay vectors corresponding to the J polarization directions is J×L, the transport layers may share the J×L same delay vectors. The terminal device indicates, according to the foregoing method, one or more delay vectors by using the first indication information.

After determining, according to the foregoing method, a weighting coefficient corresponding to each polarization direction and each receive antenna, the terminal device may further process the weighting coefficient, to obtain a weighting coefficient fed back based on each transport layer.

That a quantity of polarization directions is J and a quantity of receive antennas is R is used as an example. The terminal device may construct a coefficient matrix based on the J×R×P weighting coefficients corresponding to the J polarization directions and the R receive antennas. The coefficient matrix may be a matrix with J×P rows and R columns, and elements in each column may be J×P weighting coefficients corresponding to one receive antenna.

The following shows an example of the coefficient matrix:

$$\begin{bmatrix} \alpha_{1,1} & \alpha_{1,2} & \ldots & \alpha_{1,R} \\ \vdots & \vdots & \ldots & \vdots \\ \alpha_{P,1} & \alpha_{P,2} & \ldots & \alpha_{P,R} \\ \alpha_{P+1,1} & \alpha_{P+1,2} & \ldots & \alpha_{P+1,R} \\ \vdots & \vdots & \ldots & \vdots \\ \alpha_{2P,1} & \alpha_{2P,2} & \ldots & \alpha_{2P,R} \end{bmatrix}.$$

The quantity of polarization directions is: J=2. A first row to a $P^{th}$ row in the coefficient matrix may include weighting coefficients corresponding to one polarization direction, and $\alpha_{p,r}$ may represent a weighting coefficient corresponding to a $p^{th}$ angle-delay pair and an $r^{th}$ receive antenna in a first polarization direction. A $(P+1)^{th}$ row to a $2P^{th}$ row in the coefficient matrix may include weighting coefficients corresponding to another polarization direction, and $\alpha_{P+p,r}$ may represent a weighting coefficient corresponding to a $p^{th}$ angle-delay pair and an $r^{th}$ receive antenna in a second polarization direction. Herein, p=1, 2, . . . , or P; and r=1, 2, . . . , or R.

The terminal device may perform SVD on the coefficient matrix to obtain the weighting coefficient fed back based on the transport layer.

Assuming that a quantity of transport layers is Z, the weighting coefficient fed back based on the transport layer may include Z×P weighting coefficients.

The terminal device may indicate the Z×P weighting coefficients through normalization. For example, the terminal device may indicate, through normalization by using one transport layer as a unit, P weighting coefficients corresponding to each transport layer. Alternatively, the terminal device may indicate, through normalization by using the Z transport layers as a unit, the Z×P weighting coefficients corresponding to the Z transport layers.

It may be understood that a method in which the terminal device indicates a plurality of weighting coefficients through normalization has been described in detail above. For brevity, details are not described herein again.

It may be further understood that the manner of indicating a weighting coefficient through normalization is merely a possible implementation, and shall not constitute any limitation on the embodiments. A specific manner in which the first indication information indicates a weighting coefficient is not limited in the embodiments.

When a weighting coefficient is fed back based on a transport layer, the terminal device may further indicate a quantity of transport layers. The method 200 may further include: The terminal device sends eighth indication information, where the eighth indication information is used to indicate a quantity of transport layers. Correspondingly, the network device receives the eighth indication information.

The eighth indication information may be a rank indicator (RI).

It may be understood that the RI is merely an example of the eighth indication information, and is non-limiting.

It may be further understood that the eighth indication information and the first indication information may be sent by using same signaling, for example, CSI, or may be sent by using different signaling.

It may be further understood that the foregoing enumerated method for constructing a coefficient matrix and performing SVD on the coefficient matrix to determine a weighting coefficient corresponding to each transport layer is merely an example, and is non-limiting.

Step 240: The terminal device sends the first indication information. Correspondingly, the network device receives the first indication information.

The first indication information may be, for example, CSI, or may be some information elements in CSI, or may be other information. The first indication information may be carried in one or more messages in the conventional technology and sent by the terminal device to the network device, or may be carried in one or more newly designed messages and sent by the terminal device to the network device. For example, the terminal device may send the first indication information to the network device by using a physical uplink resource such as a physical uplink shared channel (PUSCH) or a physical uplink control channel (PUCCH), so that the network device determines the precoding matrix based on the first indication information.

A method in which the terminal device sends the first indication information to the network device by using the physical uplink resource may be the same as that in the conventional technology. For brevity, detailed descriptions of the specific process are omitted herein.

Step 250: The network device determines the precoding matrix based on the first indication information.

As described above, the terminal device may feed back a weighting coefficient based on a receive antenna, or may feed back a weighting coefficient based on a transport layer. The network device may determine the precoding matrix based on different feedback granularities and the first indication information.

If the terminal device feeds back a weighting coefficient based on a receive antenna, the weighting coefficients indicated by the first indication information may include weighting coefficients corresponding to one or more receive antennas. The network device may reconstruct the downlink channel based on the weighting coefficient corresponding to each receive antenna and the angle-delay pair corresponding to each weighting coefficient, to further determine the precoding matrix corresponding to each RB.

Because the P weighting coefficients corresponding to each receive antenna may be in a one-to-one correspondence with the P angle-delay pairs, the network device may construct, based on the P weighting coefficients corresponding to each receive antenna and an angle vector and a delay vector that are included in each of the P angle-delay pairs, a space-frequency matrix corresponding to each receive antenna.

In an embodiment, a space-frequency matrix corresponding to an $r^{th}$ receive antenna may be determined by using P angle-delay pairs and P weighting coefficients corresponding to the $r^{th}$ receive antenna. The P angle-delay pairs may be used to construct P space-frequency component matrices. As described above, a space-frequency component matrix $a(\theta_k) \times b(\tau_l)^H$ may be constructed by using the $k^{th}$ angle vector $a(\theta_k)$ in the K angle vectors and the $l^{th}$ delay vector $b(\tau_l)$ in the L delay vectors. The space-frequency matrix $H_{DL}^{(r)}$ corresponding to the $r^{th}$ receive antenna may be a weighted sum of the P space-frequency component matrices. In other words, $$H_{DL}^{(r)} = \sum_{l=1}^{L}\sum_{k=1}^{K} \alpha_{k,l}^{(r)} a(\theta_k) \times b(\tau_l)^H,$$

where $\alpha_{k,l}^{(r)}$ represents a weighting coefficient that is fed back based on an $r^{th}$ transport layer and that corresponds to the angle-delay pair formed by the $k^{th}$ angle vector and the $l^{th}$ delay vector. A dimension of the space-frequency matrix may be T×N.

It may be assumed that the calculation formula of the space-frequency matrix $H_{DL}^{(r)}$ shown above is shared by the K angle vectors and the L delay vectors. When delay coefficients corresponding to at least two angle vectors are different, the following formula may be obtained by transforming the foregoing formula:

$$H_{DL}^{(r)} = \sum_{l_k=1}^{L_k}\sum_{k=1}^{K} \alpha_{k,l_k}^{(r)} a(\theta_k) \times b(\tau_{l_k})^H,$$

where $\alpha_{k,l_k}^{(r)}$ represents a weighting coefficient that is fed back based on the $r^{th}$ receive antenna and that corresponds to the angle-delay pair formed by the $k^{th}$ angle vector and the $l_k^{th}$ delay vector corresponding to the $k^{th}$ angle vector.

For ease of description, $$H_{DL}^{(r)} = \sum_{l=1}^{L}\sum_{k=1}^{K} \alpha_{k,l}^{(r)} a(\theta_k) \times b(\tau_l)^H$$

is used as an example below. It may be understood that regardless of whether delay vectors corresponding to angle vectors are the same, precoding matrix determining is not affected.

It may be noted that, for ease of understanding, the foregoing uses one polarization direction of the transmit antenna as an example to describe a specific process of determining a space-frequency matrix corresponding to the receive antenna. When the quantity of polarization directions of the transmit antenna is greater than 1, the network device may still determine, according to the foregoing method, the space-frequency matrix corresponding to each receive antenna.

For example, if the quantity of polarization directions is 2, the space-frequency matrix corresponding to the $r^{th}$ receive antenna may be determined by using the following calculation formula:

$$H_{DL}^{(r)} = \begin{bmatrix} \sum_{l=1}^{L}\sum_{k=1}^{K}\alpha_{k,l,1}^{(r)}a(\theta_k) \times b(\tau_l)^H \\ \sum_{l=1}^{L}\sum_{k=1}^{K}\alpha_{k,l,2}^{(r)}a(\theta_k) \times b(\tau_l)^H \end{bmatrix}.$$

Herein, $\alpha_{k,l,1}^{(r)}$ represents a weighting coefficient that is fed back based on the $r^{th}$ receive antenna and that corresponds to the angle-delay pair formed by the $k^{th}$ angle vector and the $l^{th}$ delay vector in the first polarization direction; and $\alpha_{k,l,2}^{(r)}$ represents a weighting coefficient that is fed back based on the $r^{th}$ receive antenna and that corresponds to the angle-delay pair formed by the $k^{th}$ angle vector and the $l^{th}$ delay vector in the second polarization direction.

It may be understood that the foregoing calculation formula of the space-frequency matrix $H_{DL}^{(r)}$ that is defined for the two polarization directions is merely an example, and is non-limiting. For example, quantities of delay vectors and/or quantities of angle vectors loaded in different polarization directions may be the same or may be different, and delay vectors and/or angle vectors loaded in different polarization directions may be the same or may be different.

For the R receive antennas, the network device may determine space-frequency matrices $H_{DL}^{(1)}$ to $H_{DL}^{(r)}$ based on the P weighting coefficients corresponding to each receive antenna. Therefore, the network device may determine a downlink channel matrix corresponding to each RB.

For example, for the $n^{th}$ RB in the N RBs, the network device may first determine a conjugate transpose $(V^{(n)})^H$ of a downlink channel matrix corresponding to the $n^{th}$ RB. The matrix $(V^{(n)})^H$ may be determined by using an $n^{th}$ column vector in each of the R space-frequency matrices $H_{DL}^{(1)}$ to $H_{DL}^{(R)}$ that are respectively determined based on the R receive antennas. For example, an $n^{th}$ column in $H_{DL}^{(1)}$ is used as a first column in the matrix $(V^{(n)})^H$, an $n^{th}$ column in $H_{DL}^{(2)}$ is used as a second column in the matrix $(V^{(n)})^H$, and by analogy, an $n^{th}$ column in $H_{DL}^{(R)}$ may be used as an $r^{th}$ column in the matrix $(V^{(n)})^H$. Therefore, the matrix $(V^{(n)})^H$ may be obtained, so that the downlink channel matrix $V^{(n)}$ corresponding to the $n^{th}$ RB can be further determined.

The downlink channel matrix corresponding to each RB may be determined according to the foregoing method.

The network device may further determine, based on the downlink channel matrix corresponding to each RB, the precoding matrix corresponding to each RB. For example, the network device may determine the precoding matrix by performing SVD on the downlink channel matrix or a covariance matrix of the channel matrix, or by performing eigenvalue decomposition (EVD) on the covariance matrix of the downlink channel matrix.

It may be understood that, for a specific manner in which the network device determines a precoding matrix based on a channel matrix, refer to the conventional technology. The manner of determining a precoding matrix is not limited in the embodiments.

It may be further understood that the specific process in which the network device determines a downlink channel matrix based on a space-frequency matrix to determine a precoding matrix is shown above only for ease of understanding. For example, the network device may alternatively directly determine the precoding matrix based on the space-frequency matrix.

If the terminal device feeds back a weighting coefficient based on a transport layer, the weighting coefficients indicated by the first indication information may include weighting coefficients corresponding to one or more transport layers. The network device may determine, based on the weighting coefficient corresponding to each transport layer and the angle-delay pair corresponding to each weighting coefficient, the space-frequency matrix corresponding to the transport layer, to further determine the precoding matrix corresponding to each RB.

Because the P weighting coefficients corresponding to each transport layer may be in a one-to-one correspondence with the P angle-delay pairs, the network device may construct, based on the P weighting coefficients corresponding to each transport layer and an angle vector and a delay vector that are included in each of the P angle-delay pairs, a precoding vector corresponding to the transport layer.

In an embodiment, a space-frequency matrix $H_{DL}^{(z)}$ corresponding to a $z^{th}$ transport layer may be determined by using P angle-delay pairs and P weighting coefficients corresponding to the $z^{th}$ transport layer. The P angle-delay pairs may be used to construct P space-frequency component matrices. A precoding vector corresponding to the $z^{th}$ transport layer may be a weighted sum of the P space-frequency component matrices. In other words, $$H_{DL}^{(z)} = \sum_{l=1}^{L}\sum_{k=1}^{K}\alpha_{k,l}^{(z)}a(\theta_k) \times b(\tau_l)^H.$$

A dimension of the space-frequency matrix may be T×N.

It may be assumed that the calculation formula of the space-frequency matrix $H_{DL}^{(z)}$ shown above is shared by the K angle vectors and the L delay vectors. When delay coefficients corresponding to at least two angle vectors are different, the following formula may be obtained by transforming the foregoing formula:

$$H_{DL}^{(z)} = \sum_{l_k=1}^{L_k}\sum_{k=1}^{K}\alpha_{k,l_k}^{(z)}a(\theta_k) \times b(\tau_{l_k})^H,$$

where $\alpha_{k,l_k}^{(z)}$ represents a weighting coefficient that is fed back based on the $z^{th}$ transport layer and that corresponds to the angle-delay pair formed by the $k^{th}$ angle vector and the $l_k^{th}$ delay vector corresponding to the $k^{th}$ angle vector.

For ease of description, $$H_{DL}^{(z)} = \sum_{l=1}^{L}\sum_{k=1}^{K}\alpha_{k,l}^{(z)}a(\theta_k) \times b(\tau_l)^H$$

is used as an example below. It may be understood that regardless of whether delay vectors corresponding to angle vectors are the same, precoding matrix determining is not affected.

It may be noted that, for ease of understanding, the foregoing uses one polarization direction of the transmit antenna as an example to describe a specific process of determining a space-frequency matrix corresponding to the receive antenna. When the quantity of polarization directions of the transmit antenna is greater than 1, the network device may still determine, according to the foregoing method, the space-frequency matrix corresponding to each receive antenna.

If the quantity of polarization directions is 2, the space-frequency matrix corresponding to the $r^{th}$ receive antenna may be determined by using the following calculation formula:

$$H_{DL}^{(z)} = \begin{bmatrix} \sum_{l=1}^{L}\sum_{k=1}^{K}\alpha_{k,l,1}^{(z)}a(\theta_k) \times b(\tau_l)^H \\ \sum_{l=1}^{L}\sum_{k=1}^{K}\alpha_{k,l,2}^{(z)}a(\theta_k) \times b(\tau_l)^H \end{bmatrix}.$$

Herein, $\alpha_{k,l,1}^{(z)}$ represents a weighting coefficient that is fed back based on the $z^{th}$ transport layer and that corresponds to the angle-delay pair formed by the $k^{th}$ angle vector and the $l^{th}$ delay vector in the first polarization direction; and $\alpha_{k,l,2}^{(z)}$ represents a weighting coefficient that is fed back based on the $z^{th}$ transport layer and that corresponds to the angle-delay pair formed by the $k^{th}$ angle vector and the $l^{th}$ delay vector in the second polarization direction.

It may be understood that the foregoing calculation formula of the space-frequency matrix $H_{DL}^{(z)}$ that is defined for the two polarization directions is merely an example, and is non-limiting. For example, quantities of delay vectors and/or quantities of angle vectors loaded in different polarization directions may be the same or may be different, and delay vectors and/or angle vectors loaded in different polarization directions may be the same or may be different.

For the Z transport layers, the network device may determine, based on the P weighting coefficients corresponding to each transport layer, space-frequency matrices $H_{DL}^{(1)}$ to $H_{DL}^{(Z)}$ corresponding to the transport layers. Therefore, the network device may determine the precoding matrix $W^{(n)}$ corresponding to each RB. The precoding matrix $W^{(n)}$ corresponding to the $n^{th}$ RB may be constructed by using an $n^{th}$ column vector in each of the Z space-frequency matrices $H_{DL}^{(1)}$ to $H_{DL}^{(Z)}$ that are respectively determined based on the Z transport layers. For example, an $n^{th}$ column in $H_{DL}^{(1)}$ is used as a first column in the downlink channel matrix $W^{(n)}$, an $n^{th}$ column in $H_{DL}^{(2)}$ is used as a second column in the downlink channel matrix $W^{(n)}$, and by analogy, an $n^{th}$ column in $H_{DL}^{(z)}$ is used as a $z^{th}$ column in the downlink channel matrix $W^{(n)}$. The precoding matrix corresponding to each RB may be determined according to the foregoing method.

It may be understood that, only for ease of understanding, the foregoing uses a space-frequency component matrix as an example to describe in detail the specific process in which the network device determines a precoding matrix. Alternatively, the network device may determine P space-frequency component vectors based on the P angle-delay pairs, to further determine the precoding matrix. A person of ordinary skill in the art may construct P space-frequency basic units in different forms based on the P angle-delay pairs, to further determine the precoding matrix.

It may be further understood that the foregoing description is merely an example, and shows a possible implementation in which the network device determines the precoding matrix based on the first indication information. A specific implementation in which the network device determines the precoding matrix based on the first indication information is non-limiting. Based on a same concept, a person of ordinary skill in the art may perform transform or equivalent replacement on the foregoing enumerated matrix operation.

It may be further understood that the precoding matrix determined above is a precoding matrix corresponding to an RB. It may be further understood that the precoding matrix determined above is a precoding matrix corresponding to an RB. Herein, the RB is an example of a frequency domain unit. A precoding matrix corresponding to an RB may be a precoding matrix determined at a granularity of an RB based on a channel matrix corresponding to the RB, or a precoding matrix determined based on a precoded reference signal received on the RB, and may be used to precode data transmitted through the RB. A downlink channel corresponding to an RB may be a downlink channel determined based on a precoded reference signal received on the RB, and may be used to determine a precoding matrix corresponding to the RB.

When a granularity of a frequency domain unit is relatively large, for example, when the frequency domain unit is a subband, a PRG, or a PRB, the network device may determine a precoding matrix for the frequency domain unit based on a precoding matrix corresponding to each RB in each frequency domain unit.

For example, if each frequency domain unit includes one RB used to carry a reference signal, the network device may use a precoding matrix corresponding to the RB as a precoding matrix corresponding to the frequency domain unit to which the RB belongs. For another example, if each frequency domain unit includes a plurality of RBs used to carry a reference signal, the network device may perform SVD after averaging correlation matrices of precoding matrices corresponding to a plurality of RBs in a same frequency domain unit, to determine a precoding matrix corresponding to the frequency domain unit, or the network device may use an average of precoding matrices corresponding to a plurality of RBs in a same frequency domain unit as a precoding matrix corresponding to the frequency domain unit.

It may be understood that, for a method in which the network device determines, based on precoding matrices corresponding to a plurality of RBs in a frequency domain unit, a precoding matrix corresponding to the frequency domain unit, refer to the technology, and the method is not limited to the foregoing enumerated method. A method in which the network device determines, based on precoding matrices corresponding to a plurality of RBs in a frequency domain unit, a precoding matrix corresponding to the frequency domain unit is non-limiting.

It may be further understood that a weighting coefficient that is mentioned above and that corresponds to an angle vector and a delay vector is a weighting coefficient corresponding to an angle-delay pair formed by the angle vector and the delay vector. For example, a weighting coefficient corresponding to the $k^{th}$ angle vector and the $l^{th}$ delay vector is a weighting coefficient corresponding to an angle-delay pair formed by the $k^{th}$ angle vector and the $l^{th}$ delay vector. For brevity, examples are not described one by one herein.

In an embodiment, the network device precodes a downlink reference signal based on an angle determined through uplink channel measurement, so that the terminal device performs downlink channel measurement based on a precoded reference signal. In addition, the network device may indicate, to the terminal device by using signaling, a delay determined through uplink channel measurement, so that the terminal device determines, based on the precoded reference signal and the delay, a weighting coefficient that corresponds to each angle-delay pair and that can be used to construct a precoding matrix. Based on angle reciprocity and delay reciprocity between uplink and downlink channels, the terminal device may not need to determine and feed back a space domain vector and a frequency domain vector (for example, the angle vector and the delay vector described above), but only needs to determine and feed back a weighting coefficient corresponding to each angle-delay pair. Therefore, a downlink channel measurement process performed by the terminal device is simplified, calculation complexity of the terminal device in the channel measurement process is reduced, and feedback overheads of the terminal device are reduced. In addition, a precoding matrix may be constructed based on a plurality of space domain vectors and a plurality of frequency domain vectors, so that the precoding matrix determined by the network device can adapt to a downlink channel. This still ensures relatively high feedback precision while reducing the feedback overheads. Moreover, precoding a downlink reference signal based on an angle vector can reduce a quantity of reference signal ports, thereby reducing pilot overheads.

It may be understood that a specific process of performing downlink channel measurement and determining a precoding matrix when a space-frequency matrix is obtained based on a conjugate transpose of a real channel is shown in an embodiment only for ease of understanding. It may be understood that a relationship between the real channel and the space-frequency matrix $H_{DL}$ is not fixed. Different definitions of the space-frequency matrix and the space-frequency component matrix may change the relationship between the real channel and the space-frequency matrix $H_{DL}$. For example, the space-frequency matrix $H_{DL}$ may be obtained based on the conjugate transpose of the real channel, or may be obtained based on a transpose of the real channel.

When the relationship between the space-frequency matrix and the channel matrix is defined differently, operations performed by the network device during delay and angle loading are also different, and operations performed by the terminal device during channel measurement and feedback also correspondingly change. However, these operations are only implementation behavior of the terminal device and the network device, and are non-limiting. The definition of the channel matrix, the dimension and the definition of the space-frequency matrix, and a transform relationship between the channel matrix and the space-frequency matrix are non-limiting. Likewise, a transform relationship between the space-frequency matrix and the precoding matrix are non-limiting.

In the foregoing method embodiment, the channel measurement method provided is described in detail by using an example of precoding a reference signal based on an angle vector and is non-limiting. Alternatively, the network device may precode a reference signal based on only a delay vector, so that the terminal device performs downlink channel measurement based on a precoded reference signal.

For ease of understanding the embodiments, in the following embodiments, one polarization direction of the transmit antenna is first used as an example to describe in detail a channel measurement method 500 provided in an embodiment. It may be understood that the polarization direction may be any one of one or more polarization directions of the transmit antenna. In other words, channel measurement may be performed in any one of the one or more polarization directions according to the method 500 provided in an embodiment. It may be further understood that a quantity of polarization directions of the transmit antenna is non-limiting. For example, there may be one polarization direction, that is, a single polarization direction; or there may be a plurality of polarization directions, for example, dual polarization directions.

Figure 5:
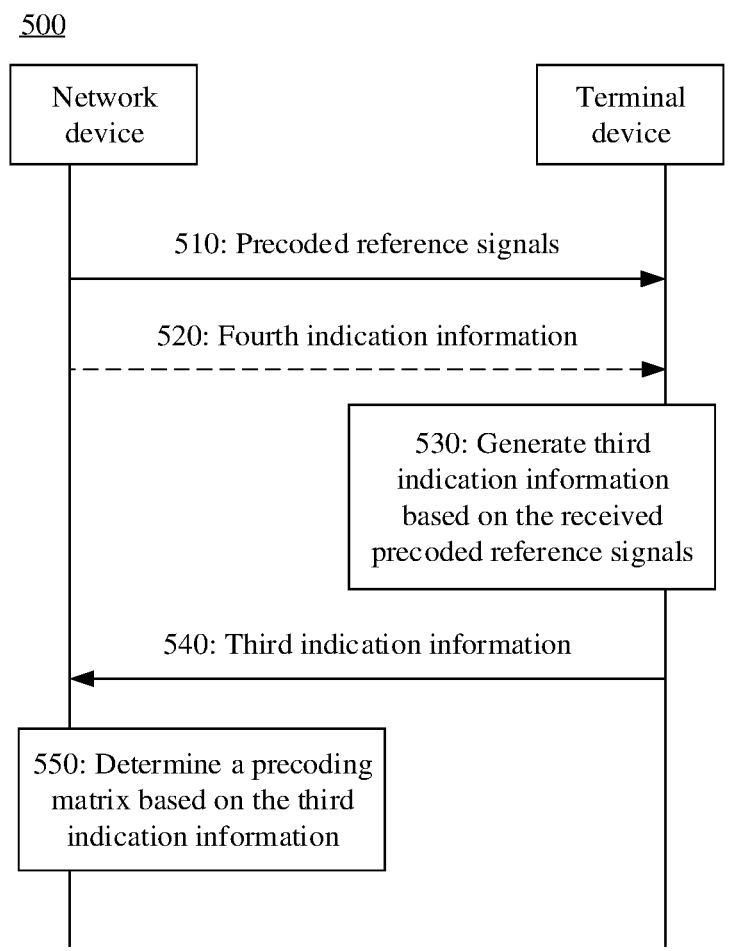
FIG. 5 is a schematic flowchart of a channel measurement method according to another embodiment.

FIG. 5 is a schematic flowchart of the channel measurement method 500 from the perspective of device interaction according to an embodiment. As shown in the figure, the method 500 may include step 510 to step 550. The following describes the steps in the method 500 in detail.

Step 510: A terminal device receives precoded reference signals, where the precoded reference signals are obtained by precoding reference signals based on L delay vectors. Correspondingly, a network device sends the precoded reference signals, where L≥1, and L is an integer.

In an embodiment, the network device may precode the reference signals based on the L delay vectors. Because no space domain precoding is performed on the reference signals, precoded reference signals obtained through precoding based on one delay vector may correspond to some or all of T transmit antenna ports, where T is a quantity of transmit antenna ports in one polarization direction, T≥1, and T is an integer.

Because of delay reciprocity between uplink and downlink channels, the L delay vectors may be determined through uplink channel measurement. The network device may determine L relatively strong delays based on an uplink channel matrix obtained through pre-estimation, where the L delays may be represented by using L delay vectors.

The L delay vectors may be obtained, for example, from a predefined angle vector set. Each delay vector in the delay vector set may be obtained from a DFT matrix.

The network device may determine the L delay vectors, for example, by using a JADE algorithm in the conventional technology, or by performing DFT on the uplink channel matrix. A method in which the network device determines the L delay vectors is non-limiting.

The process in which the network device determines the K angle vectors is described in detail above by using an example in which DFT is performed on a space-frequency matrix of an uplink channel. This is similar to a method in which the network device determines the L delay vectors by performing DFT on a space-frequency matrix of an uplink channel. For brevity, details are not described herein again.

In addition, the uplink channel matrix may be, for example, obtained by the network device through channel estimation based on a pre-received uplink reference signal such as an SRS. For a method in which the network device estimates an uplink channel matrix based on an uplink reference signal, refer to the conventional technology. For brevity, detailed descriptions of the method are omitted herein.

It may be understood that the L delay vectors may alternatively not be determined through uplink channel measurement. For example, the L delay vectors may be predefined, for example, defined in a protocol; or the L delay vectors may be determined by performing statistics collection based on one or more previous downlink channel measurements. A manner of obtaining the L delay vectors is non-limiting.

The network device may precode the downlink reference signals such as CSI-RSs based on the L delay vectors, to obtain the precoded reference signals, and may transmit the precoded reference signals by using a preconfigured reference signal resource.

The method 500 may further include: The terminal device receives fifth indication information, where the fifth indication information is used to configure one or more reference signal resources. Correspondingly, the network device may send the fifth indication information.

The one or more reference signal resources configured by using the fifth indication information may be used to carry precoded reference signals. Precoded reference signals carried on a same reference signal resource may correspond to one or more ports. When the fifth indication information is used to configure a plurality of reference signal resources, delay vectors and/or transmit antenna ports corresponding to precoded reference signals carried on the reference signal resources may be different from each other, and the reference signal resources do not overlap in frequency domain and/or time domain. In an embodiment, a precoded reference signal corresponding to each port corresponds to one transmit antenna port and one delay vector.

Because the fifth indication information has been described in detail above, for brevity, details are not described herein again.

In an implementation, the network device may traverse the L delay vectors; precode, based on each of the L delay vectors, reference signals carried on each RB in a measurement bandwidth; and send precoded reference signals through the T transmit antenna ports. T×L different combinations are obtained by traversing the L delay vectors and the T transmit antenna ports. Because no space domain precoding is involved, each combination may correspond to one delay vector. In other words, a total of T×L different combinations of delay vectors and transmit antenna ports may be obtained by loading the L delay vectors to reference signals on different transmit antenna ports.

The network device may preconfigure one reference signal resource for the terminal device. For example, the network device may configure the reference signal resource for the terminal device by using higher layer signaling such as the fifth indication information. The reference signal resource may include one or more RBs, for example, N RBs. Precoded reference signals carried on each RB in the reference signal resource may correspond to T×L ports, and a precoded reference signal corresponding to each port may be obtained by precoding a reference signal on one of the T transmit antenna ports based on one of the L delay vectors.

In addition, because the L delay vectors are loaded to each RB in the reference signal resource, and each RB corresponds to a relatively large quantity of ports, relatively high pilot overheads may be caused. Therefore, the network device may configure a relatively small pilot density by using the higher layer signaling such as the fifth indication information, to reduce the pilot overheads.

A correspondence between a port and a precoded reference signal carried on each RB in a reference signal resource is described in detail above with reference to FIG. 3 when RBs are not grouped. This is similar to a correspondence between a port and a precoded reference signal carried on each RB in an embodiment, and only the angle vector in the foregoing embodiment is replaced with the transmit antenna port. For brevity, details are not described herein with reference to the accompanying drawings.

If the precoded reference signals on each RB are all obtained through precoding by traversing the L delay vectors, relatively high pilot overheads are caused when there are a relatively large quantity of RBs. To reduce the pilot overheads, the RBs may be grouped. A precoded reference signal carried in each frequency domain group may be obtained through precoding based on some of P combinations of angle vectors and delay vectors, for example, a combination of one delay vector and an angle vector corresponding to the delay vector, or a combination of one angle vector and a delay vector corresponding to the angle vector, or a combination of one delay vector and one angle vector. This may greatly reduce the pilot overheads.

In another possible implementation, the network device may traverse the L delay vectors; precode, based on one or more of the L delay vectors, reference signals carried on some RBs in a measurement bandwidth; and send precoded reference signals through the T transmit antenna ports. Precoded reference signals obtained through precoding based on different delay vectors may be mapped to different RBs, and precoded reference signals carried on each RB may be obtained through precoding based on some of the L delay vectors. In the plurality of RBs, precoded reference signals carried on at least two RBs are obtained through precoding based on different delay vectors. In other words, a total of T×L' different combinations of delay vectors and transmit antenna ports may be obtained by loading the L delay vectors to different RBs and sending the L delay vectors through the T transmit antenna ports, where $1 \leq L' \leq L$, and L' is an integer.

The network device may preconfigure a plurality of reference signal resources for the terminal device. For example, the network device may configure the plurality of reference signal resources for the terminal device by using higher layer signaling such as the fifth indication information. Each of the plurality of reference signal resources may include one or more RBs. Precoded reference signals carried in each reference signal resource may correspond to one or more ports, for example, T×L' ports. Delay vectors and/or transmit antenna ports corresponding to precoded reference signals carried in the reference signal resources are different, and a precoded reference signal corresponding to each port may be obtained by precoding a reference signal on one transmit antenna port based on one of the L delay vectors. In addition, the reference signal resources do not overlap in frequency domain and/or time domain. For example, the reference signal resources are arranged in a staggered manner in frequency domain. Therefore, precoded reference signals obtained through precoding based on different delay vectors may be carried by using different time-frequency resources.

If one delay vector may be loaded to each RB, the precoded reference signals carried on each RB may correspond to T ports, and precoded reference signals carried on at least two RBs may correspond to different delay vectors. When precoded reference signals carried on two RBs correspond to different delay vectors, port numbers corresponding to the precoded reference signals carried on the two RBs may be the same or may be different.

The network device may group the plurality of RBs, and perform frequency domain precoding based on different frequency domain groups. The N RBs may be grouped into a plurality of frequency domain groups, for example, M frequency domain groups, where M>1, and M is an integer. Each frequency domain group may include $\lfloor N/M \rfloor$ RBs. If N cannot be exactly divided by M, a quantity of RBs in the last frequency domain group may be a quantity of remaining RBs, to be specific, a quantity of RBs included in an $M^{th}$ frequency domain group may be less than $\lfloor N/M \rfloor$.

When the RBs are grouped, precoded reference signals carried in each frequency domain group may be obtained through precoding based on some of the L delay vectors, for example, L' delay vectors.

Optionally, M=L. A quantity of frequency domain groups may be equal to a quantity of delay vectors. In this case, each frequency domain group may include $\lfloor N/L \rfloor$ RBs. An $l^{th}$ frequency domain group in the L frequency domain groups may include an $l^{th}$ RB, an $(l+L)^{th}$ RB, and an $(l+2L)^{th}$ RB to $(l+(\lfloor N/L \rfloor -1) \times L)^{th}$ RB in the N RBs. In other words, the $k^{th}$ frequency domain group in the L frequency domain groups includes an $1+(i-1) \times L^{th}$ RB in the N RBs, where i=1, 2, ..., $\lfloor N/L \rfloor$.

The $l^{th}$ RB in the N RBs may be a first RB in the $l^{th}$ frequency domain group, the $(1+L)^{th}$ RB in the N RBs may be a second RB in the $l^{th}$ frequency domain group, the $(1+2L)^{th}$ RB in the N RBs may be a third RB in the $l^{th}$ frequency domain group, and the RB in the N RBs may be an $(\lfloor N/L \rfloor)^{th}$ RB in the $l^{th}$ frequency domain group. By analogy, an $(1+(n-1) \times L)^{th}$ RB in the N RBs may be an $n^{th}$ RB in the $l^{th}$ frequency domain group.

The network device may perform, based on an $l^{th}$ delay vector in the L delay vectors, frequency domain precoding on a reference signal carried on each RB in the $l^{th}$ frequency domain group in the L frequency domain groups. Each frequency domain group may correspond to one delay vector, and an RB in each frequency domain group may correspond to one element in the delay vector.

A quantity of ports corresponding to precoded reference signals carried on each RB may be T. The T ports may specifically correspond to the T transmit antenna ports.

FIG. 6 shows another example in which a plurality of RBs carry precoded reference signals corresponding to a plurality of ports. The figure shows an example in which a quantity of RBs is 16.

In the 16 RBs shown in FIG. 6, a precoded reference signal carried on each RB may be obtained through precoding based on one delay vector. The 16 RBs may be grouped into four frequency domain groups. An RB #1, an RB #5, an RB #9, and an RB #13 may be grouped into a frequency domain group #1; an RB #2, an RB #6, an RB #10, and an RB #14 may be grouped into a frequency domain group #2; an RB #3, an RB #7, an RB #11, and an RB #15 may be grouped into a frequency domain group #3; and an RB #4, an RB #8, an RB #12, and an RB #16 may be grouped into a frequency domain group #4.

The 16 RBs may belong to four reference signal resources. Each frequency domain group may be one reference signal resource. The four frequency domain groups may be used as an example of the plurality of reference signal resources. Precoded reference signals carried in a same frequency domain group may be obtained through precoding based on a same delay vector. For example, if L=4, the L delay vectors may include $b(\tau_1)$, $b(\tau_2)$, $b(\tau_3)$, and $b(\tau_4)$, and precoded reference signals carried on each frequency domain group may be obtained through precoding based on one delay vector, in other words, L'=1. In this case, precoded reference signals carried on the RB #1, the RB #5, the RB #9, and the RB #13 may be obtained through precoding based on a same delay vector, for example, the delay vector $b(\tau_1)$; precoded reference signals carried on the RB #2, the RB #6, the RB #10, and the RB #14 may be obtained through precoding based on a same delay vector, for example, the delay vector $b(\tau_2)$; precoded reference signals carried on the RB #3, the RB #7, the RB #11, and the RB #15 may be obtained through precoding based on a same delay vector, for example, the delay vector $b(\tau_3)$; and precoded reference signals carried on the RB #4, the RB #8, the RB #12, and the RB #16 may be obtained through precoding based on a same delay vector, for example, the delay vector $b(\tau_4)$.

Because precoded reference signals carried in a same frequency domain group are obtained through precoding based on a same delay vector, the precoded reference signals carried in the same frequency domain group may correspond to the same delay vector, or may correspond to a same port group, where each port group includes T transmit antenna ports. Because precoded reference signals carried in different frequency domain groups are obtained through precoding based on different delay vectors, the precoded reference signals carried in the different frequency domain groups may correspond to the different delay vectors, and ports numbers corresponding to the precoded reference signals carried in the different frequency domain groups may be the same or may be different. For example, precoded reference signals carried in each of the frequency domain group #1 to the frequency domain group #4 may correspond to a port #1 to a port #T. For another example, the precoded reference signals carried in the frequency domain group #1 may correspond to the port #1 to the port #T; the precoded reference signals carried in the frequency domain group #2 may correspond to a port #T+1 to a port #2T; the precoded reference signals carried in the frequency domain group #3 may correspond to a port #2T+1 to a port #3T; and the precoded reference signals carried in the frequency domain group #4 may correspond to a port #3T+1 to a port #4T.

It may be understood that loading one delay vector to each frequency domain group is merely an example for ease of understanding. A quantity of delay vectors loaded to each frequency domain group is non-limiting.

The precoded reference signals carried on each RB shown in the figure may correspond to more ports, for example, 2T ports, in other words, L'=2. For example, precoded reference signals corresponding to eight ports may be obtained by precoding reference signals on the T transmit antenna ports based on two delay vectors, where the two delay vectors may be selected from the foregoing four delay vectors.

It may be understood that the value of L and the quantity L' of delay vectors loaded to each frequency domain group enumerated above are merely examples, and are non-limiting.

It may be understood that, when the quantity of delay vectors loaded to each frequency domain group is L, it is equivalent to that the RBs are not grouped.

It may be understood that FIG. 6 is merely an example for ease of understanding, and does not show all REs in one RB. A quantity of REs in each RB is not limited. In addition, ports corresponding to precoded reference signals carried on each RB and a specific manner of multiplexing a resource between the reference signals corresponding to the ports are non-limiting.

Further, a delay vector length may be $\lfloor N/M \rfloor$. For each port, $\lfloor N/M \rfloor$ elements in the corresponding delay vector may be in a one-to-one correspondence with $\lfloor N/M \rfloor$ RBs. Therefore, a value of a precoded reference signal corresponding to each port on an $n^{th}$ RB in an $m^{th}$ ($1 \leq m \leq M$, and m is an integer) frequency domain group in M frequency domain groups is determined based on at least an $n^{th}$ element in an $m^{th}$ delay vector in M delay vectors.

A delay vector length may be $\lfloor N/L \rfloor$. For each port, $\lfloor N/L \rfloor$ elements in the corresponding delay vector may be in a one-to-one correspondence with $\lfloor N/L \rfloor$ RBs. Therefore, a value of a precoded reference signal corresponding to each port on an $n^{th}$ RB in an $l^{th}$ ($1 \le l \le L$, and l is an integer) frequency domain group in L frequency domain groups is determined based on at least an $n^{th}$ element in an $l^{th}$ delay vector in L delay vectors.

A precoded reference signal carried on a first RB (namely, the RB #1) in the 16 RBs, that is, a first RB in the frequency domain group #1 is determined based on at least a first element in the delay vector $b(\tau_1)$; a precoded reference signal carried on a fifth RB (namely, the RB #5) in the 16 RBs, that is, a second RB in the frequency domain group #1 is determined based on at least a second element in the delay vector $b(\tau_1)$; a precoded reference signal carried on a ninth RB (namely, the RB #9) in the 16 RBs, that is, a third RB in the frequency domain group #1 is determined based on at least a third element in the delay vector b (z); and a precoded reference signal carried on a thirteenth RB (namely, the RB #14) in the 16 RBs, that is, a fourth RB in the frequency domain group #1 is determined based on at least a fourth element in the delay vector $b(\tau_1)$.

It may be understood that a correspondence between each RB in another frequency domain group and each element in a delay vector is similar to this correspondence. For brevity, the correspondences are not enumerated one by one herein.

It may be noted that a length of each of the L delay vectors determined by the network device through uplink channel measurement may be N. After the RBs are grouped, a length of a delay vector used to precode a reference signal is $\lfloor N/L \rfloor$. The network device may extract some elements from each delay vector based on the L delay vectors determined through uplink channel measurement, to form L new delay vectors. Herein, for ease of distinguishing and description, the L delay vectors determined through uplink channel measurement are referred to as L original delay vectors.

If the N RBs are grouped into the L frequency domain groups, the $l^{th}$ frequency domain group in the L frequency domain groups corresponds to an $l^{th}$ original delay vector in the L original delay vectors, and the first RB to the $(\lfloor N/L \rfloor)^{th}$ RB in the $l^{th}$ frequency domain group respectively correspond to an $l^{th}$ element, an $(l+L)^{th}$ element, an $(l+2L)^{th}$ element, and an $(l+(\lfloor N/L \rfloor-1) \times L)^{th}$ element in the $l^{th}$ original delay vector. By analogy, the $n^{th}$ RB in the $l^{th}$ frequency domain group may correspond to an $(l+(n-1) \times L)^{th}$ element in the $l^{th}$ original delay vector.

It may be understood that the original delay vector is defined above only for distinguishing. In the following embodiments, the original delay vector is not involved. All delay vectors in the following embodiments may be understood as delay vectors used to perform frequency domain precoding on reference signals. A delay vector length may be N, or may be $\lfloor N/M \rfloor$.

It may be further understood that a process of grouping the N RBs and performing frequency domain precoding on the reference signals on the L frequency domain groups based on the L delay vectors is described in detail above with reference to the accompanying drawings only for ease of understanding. HA manner of grouping the N RBs is not limited. A correspondence between each frequency domain group and a delay vector is not limited. A correspondence between each RB in each frequency domain group and each element in a delay vector is not limited.

It may be further understood that the correspondence between a port and a precoded reference signal carried on each RB is enumerated above only for ease of understanding. A correspondence among a precoded reference signal carried on each RB, a delay vector, and a port is not limited.

It may be further understood that FIG. 6 is merely an example to describe in detail the specific process of loading a delay vector to a reference signal.

It may be further understood that the process of precoding reference signals based on a plurality of delay vectors and mapping precoded reference signals to an RB is described with reference to the accompanying drawings only for ease of understanding. A quantity of RBs, a quantity of frequency domain groups, a quantity of delay vectors, a quantity of transmit antenna ports, and a quantity of ports corresponding to precoded reference signals are non-limiting. A position of an RE corresponding to each port on each RB is non-limiting.

It may be further understood that the foregoing definition of the quantity of ports based on each RB is merely a possible implementation, and is non-limiting. The embodiments further provide a method for defining a quantity of ports. The quantity of ports may be a quantity of ports corresponding to precoded reference signals carried on each reference signal resource. In other words, the quantity of ports may be defined across RBs.

Such a manner of defining a quantity of ports may be applied to a case in which RBs are grouped.

The method 400 may further include: The terminal device receives sixth indication information, where the sixth indication information is used to configure one reference signal resource. Correspondingly, the network device sends the sixth indication information.

The reference signal resource configured by using the sixth indication information may be used to carry precoded reference signals, and the precoded reference signals carried on the reference signal resource may be the reference signals obtained through precoding based on the L delay vectors. In addition, in the reference signal resource, precoded reference signals carried on at least two RBs are obtained through precoding based on different delay vectors. Moreover, when precoded reference signals carried on two RBs correspond to different delay vectors, port numbers corresponding to the precoded reference signals carried on the two RBs may be different. In other words, the precoded reference signals carried on the at least two RBs correspond to different ports. Therefore, in a same reference signal resource, ports corresponding to precoded reference signals carried on RBs are not necessarily the same.

In an embodiment, one reference signal resource may include, for example, the 16 RBs described above with reference to FIG. 6, in other words, may include a plurality of frequency domain groups, and precoded reference signals carried on the reference signal resource may correspond to T×L ports.

It may be noted that, when the network device groups RBs to precode, by using different delay vectors, reference signals carried on different RBs, the network device may transmit precoded reference signals based on the plurality of reference signal resources configured by using the fifth indication information, or may transmit precoded reference signals based on the one reference signal resource configured by using the sixth indication information.

The terminal device may perform channel estimation based on the received precoded reference signals, and process a downlink channel estimation value based on one or more preconfigured angle vectors, to determine a weighting coefficient that corresponds to each angle-delay pair and that is used to construct a precoding matrix.

The preconfigured delay vector may be predetermined by the network device, and indicated by using signaling. The preconfigured delay vector may alternatively be predefined, for example, defined in a protocol.

The method 500 further includes step 520: The terminal device receives fourth indication information, where the fourth indication information is used to indicate one or more angle vectors corresponding to each of the L delay vectors. Correspondingly, the network device sends the fourth indication information.

In an embodiment, a quantity of angle vectors may be denoted as, for example, K, where K≥1, and K is an integer.

For example, the network device may determine the K angle vectors through uplink channel measurement, or may determine the K angle vectors by performing statistics collection based on one or more previous downlink channel measurements.

In a possible design, the K angle vectors correspond to each of the L delay vectors. In other words, any two of the L delay vectors may correspond to K same angle vectors. For example, in the L delay vectors, K angle vectors corresponding to a first delay vector are the same as K angle vectors corresponding to a second delay vector. The first delay vector and the second delay vector may be any two delay vectors in the L delay vectors. The network device may determine the K angle vectors based on the L delay vectors. The network device may traverse the L delay vectors and the K angle vectors, to obtain K×L combinations of delay vector and angle vector. Each combination may correspond to one path. Each combination may be used to determine one angle-delay pair.

In another possible design, one or more of the K angle vectors may correspond to one of the L delay vectors. In other words, angle vectors corresponding to at least two of the L delay vectors are different. Because each delay may have one or more angles, the one or more angles may correspond to one or more paths that have a same delay but different angles. The network device may determine one or more angle vectors based on each delay vector. Herein, each delay and an angle corresponding to the delay may be determined based on a same path, and may be used to determine an angle-delay pair. For example, for an $l^{th}$ delay vector in the L delay vectors, the network device may determine $K_l$ ($K_l$≥1, and $K_l$ is an integer) angle vectors. The $l^{th}$ delay vector and any one of the $K_l$ angle vectors may be used to determine one angle-delay pair. For the L delay vectors, K may satisfy:

$$K \le \sum_{l=1}^{L} K_l.$$

Herein, that angle vectors corresponding to at least two delay vectors are different may mean that the angle vectors corresponding to the at least two of the L delay vectors are different, but angle vectors corresponding to other delay vectors may be the same or may be different. In other words, the angle vectors corresponding to the delay vectors are partially or all different.

That angle vectors corresponding to two delay vectors are different may mean that the angle vectors corresponding to the two delay vectors are all different, in other words, the angle vectors corresponding to the two delay vectors are not repeated or have no intersection. For example, the delay vector $b(\tau_1)$ corresponds to the angle vector $a(\theta_2)$, and the delay vector $b(\tau_2)$ corresponds to the angle vector $a(\theta_1)$. That angle vectors corresponding to two delay vectors are different may alternatively mean that the angle vectors corresponding to the two delay vectors are partially different, in other words, the angle vectors corresponding to the two delay vectors are partially repeated but are not all the same, or the angle vectors corresponding to the two delay vectors have an intersection but are not all the same. For example, the delay vector $b(\tau_1)$ corresponds to the angle vector $a(\theta_2)$, and the delay vector $b(\tau_2)$ corresponds to the angle vectors $a(\theta_1)$ and $a(\theta_2)$.

When angle vectors corresponding to any two of the L delay vectors are different from each other, $$K = \sum_{l=1}^{L} K_l;$$

or when angle vectors corresponding to two or more of the L delay vectors are partially repeated, $$K < \sum_{l=1}^{L} K_l.$$

Therefore, the network device may obtain $$\sum_{l=1}^{L} K_l$$

combinations of angle vectors and delay vectors based on the L delay vectors and the K angle vectors. Each combination may correspond to one path. Each combination may be used to determine one angle-delay pair.

For example, the network device may determine, by using a JADE algorithm in the conventional technology, the one or more delay vectors corresponding to each angle vector, or may determine, through DFT, the one or more delay vectors corresponding to each angle vector. A specific manner in which the network device determines a delay vector corresponding to each angle vector is not limited.

It may be understood that a specific process of determining a delay vector corresponding to each angle vector is described in detail in the foregoing method 200 by using an example in which DFT is performed on an uplink channel. In an embodiment, the specific method for determining a delay vector corresponding to each angle vector is similar to the specific method for determining an angle vector corresponding to each delay vector. For brevity, details are not described herein again.

It may be further understood that the K angle vectors may alternatively not be determined through uplink channel measurement. For example, the K angle vectors may be predefined, for example, defined in a protocol; or the K angle vectors may be determined by performing statistics collection based on one or more previous downlink channel measurements. A manner of obtaining the K angle vectors is not limited in the embodiments.

The network device may indicate the K angle vectors to the terminal device in a plurality of possible manners by using the fourth indication information. Several possible implementations are enumerated as examples below only for ease of understanding.

Manner 1: The network device indicates one or more selected angle vectors in an angle vector set by using a bitmap.

The fourth indication information may include L bitmaps, and an $l^{th}$ bitmap in the L bitmaps may be used to indicate Ki delay vectors that are in the angle vector set and that correspond to an $l^{th}$ angle vector.

Each bitmap may be, for example, a quantity of angle vectors in the angle vector set.

When angle vectors corresponding to at least two delay vectors are different, the network device may indicate one or more corresponding angle vectors based on each delay vector. The network device may indicate, by using each of the L bitmaps, one or more angle vectors corresponding to each of the L delay vectors.

In other words, the L bitmaps may be in a one-to-one correspondence with the L delay vectors. Each bitmap may be used to indicate one or more angle vectors corresponding to one delay vector. The one or more angle vectors corresponding to each delay vector may be determined from the predefined angle vector set. For example, for the $l^{th}$ delay vector in the L delay vectors, the terminal device may indicate, by using an $l^{th}$ bitmap, $K_l$ angle vectors corresponding to the $l^{th}$ delay vector.

A method for indicating a selected angle vector by using each indicator bit in a bitmap has been described in detail above. For brevity, details are not described herein again.

In addition, when the angle vectors corresponding to the at least two delay vectors are different, the network device may further indicate a correspondence between each delay vector and an angle vector. The network device may indicate the one or more angle vectors corresponding to each of the L delay vectors to the terminal device in a predefined order by using each of the L bitmaps.

The foregoing method 200 has described in detail a method in which the network device indicates, in a predefined order, one or more delay vectors corresponding to each of the K angle vectors. A method in which the network device indicates, in a predefined order, one or more angle vectors corresponding to the L delay vectors may be similar to this method. For brevity, details are not described herein again.

When any two of the L delay vectors correspond to K same angle vectors, the network device may generate indication information to indicate the K angle vectors only once. The network device may indicate the K angle vectors by using one bitmap. The bitmap may be used to indicate the K angle vectors that are in the angle vector set and that correspond to the L delay vectors.

The fourth indication information includes one bitmap, and the bitmap is used to indicate $K_l$ angle vectors that are in the angle vector set and that correspond to the $l^{th}$ delay vector.

A length of the bitmap may be L times the quantity of angle vectors included in the angle vector set.

The bitmap is also equivalent to a bitmap that is obtained by splicing the L bitmaps and whose length is the quantity of angle vectors in the angle vector set. In other words, the bitmap may include L groups of indicator bits, and each group of indicator bits may be used to indicate one or more angle vectors corresponding to one delay vector.

The network device may arrange the L groups of indicator bits in a predefined order, so that the terminal device determines, in the predefined order, the one or more angle vectors corresponding to each delay vector (or each group of ports).

When any two of the L delay vectors correspond to K same angle vectors, the bitmap may be evolved into a bitmap whose length is the quantity of angle vectors in the angle vector set. The bitmap may be used to indicate the K angle vectors that are in the angle vector set and that correspond to the L delay vectors.

Manner 2: The network device may indicate one or more selected delay vectors by using an index of an angle vector combination.

The fourth indication information includes L indexes, and an $l^{th}$ index in the L indexes is an index, in an angle vector set, of a combination of $K_l$ angle vectors corresponding to the $l^{th}$ delay vector.

When angle vectors corresponding to at least two delay vectors are different, the network device may indicate one or more corresponding angle vectors based on each delay vector. The network device may indicate, by using each of the L indexes, one or more angle vectors corresponding to each of the L delay vectors.

In other words, the L indexes may be in a one-to-one correspondence with the L delay vectors. Each index may be used to indicate a position, in the predefined angle vector set, of a combination of one or more angle vectors corresponding to one delay vector. For example, the network device and the terminal device may predefine a one-to-one correspondence between a plurality of angle vector combinations and a plurality of indexes. Each index may be used to indicate one angle vector combination. Each combination may include one or more angle vectors. For example, for the $l^{th}$ delay vector in the L delay vectors, the terminal device may indicate, by using an $l^{th}$ index, $K_l$ angle vectors corresponding to the $l^{th}$ delay vector.

Further, the foregoing predefined one-to-one correspondence between a plurality of angle vector combinations and a plurality of indexes may be defined based on combinations of different quantities of angle vectors. For example, for a combination of four angle vectors, a one-to-one correspondence between a plurality of combinations and a plurality of indexes may be predefined. For another example, for a combination of eight angle vectors, a one-to-one correspondence between a plurality of combinations and a plurality of indexes may be predefined. For the combinations of different quantities of angle vectors, indexes may be repeated.

In other words, the network device may determine an index based on to-be-fed-back angle vectors and a quantity, and the terminal device may determine the $K_l$ angle vectors based on the quantity of angle vectors and the index. For example, the network device may determine, based on the $K_l$ to-be-indicated angle vectors and the quantity $K_l$, an index of a combination of the $K_l$ angle vectors in the angle vector set. Because the value of $K_l$ may be determined by the network device, optionally, the fourth indication information is further used to indicate the quantity of angle vectors corresponding to each of the L delay vectors. Therefore, the terminal device determines the one or more selected angle vectors based on the quantity of angle vectors and the index.

It may be understood that the foregoing enumerated one-to-one correspondence between a plurality of angle vector combinations and a plurality of indexes is merely an example, and are non-limiting. For example, for the combinations of different quantities of angle vectors, indexes are alternatively not be repeated.

In addition, when the angle vectors corresponding to the at least two delay vectors are different, the network device further indicates a correspondence between each delay vector and an angle vector. The network device may indicate the one or more angle vectors corresponding to each of the L delay vectors to the terminal device in a predefined order by using each of the L indexes. When any two of the L delay vectors correspond to K same angle vectors, the network device may generate indication information to indicate the K angle vectors only once. The network device may indicate the K angle vectors by using one index. The index may be used to indicate the K angle vectors that are in the angle vector set and that correspond to the L delay vectors.

Manner 3: The network device may indicate one or more selected angle vectors by using an angle vector index.

The second indication information includes L groups of indexes, and an $l^{th}$ group of indexes in the L groups of indexes includes an index of each of $K_l$ angle vectors in an angle vector set.

When angle vectors corresponding to at least two delay vectors are different, the network device may indicate one or more corresponding angle vectors based on each delay vector. The network device may indicate, by using each of the L groups indexes, one or more angle vectors corresponding to each of the L delay vectors. Each group of indexes may include one or more indexes respectively used to indicate one or more angle vectors in the angle vector set.

In other words, the L groups of indexes may be in a one-to-one correspondence with the L delay vectors. Each group of indexes may be used to indicate a position, in the predefined angle vector set, of one or more angle vectors corresponding to one delay vector. For example, the network device and the terminal device may predefine an index of each angle vector in the angle vector set. Each index corresponds to one angle vector. In this case, the $l^{th}$ group of indexes may include the index of each of the Ki angle vectors in the angle vector set.

In addition, when the angle vectors corresponding to the at least two delay vectors are different, the network device further indicates a correspondence between each delay vector and an angle vector. The network device may indicate the one or more angle vectors corresponding to each of the L delay vectors to the terminal device in a predefined order by using each of the L groups of indexes.

When any two of the L delay vectors correspond to K same angle vectors, the network device may generate indication information to indicate the K angle vectors only once. The network device may indicate the K angle vectors by using one group of indexes. The group of indexes may include K indexes respectively used to indicate the K angle vectors that are in the angle vector set and that correspond to the L delay vectors.

Manner 4: The network device may indicate, by using an index of an angle-delay pair combination, one or more angle vectors corresponding to each delay vector.

Because the one or more angle vectors corresponding to each delay vector are from a same angle vector set, the network device may combine each of the K angle vectors corresponding to the K ports with the delay vector set in a predefined order, to obtain an angle-delay pair set. It may be understood that the combination of each of the K angle vectors and the delay vector set may be a logical combination, and is not necessarily a combination of an angle vector set and a delay vector set. Therefore, the angle-delay pair set may be a logical set, and the network device and the terminal device do not necessarily pre-store the angle-delay pair set.

After the network device repeatedly uses the delay vector set for K times in a predefined order, K delay vector sets that are in a one-to-one correspondence with the K angle vectors may be obtained. The K delay vector sets are the same in pairs, and each delay vector set includes a plurality of delay vectors. The K delay vector sets may be combined with the K angle vectors to construct K angle-delay pair sets. Each angle-delay pair set may correspond to one of the K angle vectors and all delay vectors in one delay vector set.

During an exemplary implementation, the network device may combine the one or more angle vectors corresponding to each of the L delay vectors, and indicate, by using the fourth indication information, an index, in a vector set formed by the L angle vector sets, of a combination of a plurality of angle vectors corresponding to the L delay vectors. The L angle vector sets may be obtained by repeatedly using a same angle vector set for L times. Angle vectors included in any two angle vector sets are the same, and each angle vector set may include a plurality of angle vectors. It may be understood that some of the plurality of angle vectors corresponding to the L delay vectors may be repeated. However, because the repeated angle vectors are combined with different delay vectors to constitute different angle-delay pairs, the index also implicitly indicates the plurality of angle-delay pairs.

For example, when angle vectors corresponding to at least two delay vectors are different, the network device may indicate a combination of $$\sum_{l=1}^{L} K_l$$

angle vectors by using the index.

For the $l^{th}$ delay vector in the L delay vectors, the network device may determine $K_l$ angle vectors in the angle vector set. For the L delay vectors, it may be considered that the network device separately determines L groups of angle vectors from the L angle vector sets, where a quantity of angle vectors in an $l^{th}$ group is $K_l$. Therefore, the network device may indicate the index of the combination of the $$\sum_{l=1}^{L} K_l$$

angle vectors in the L angle vector sets to the terminal device. The index may be used to indicate positions of the $$\sum_{l=1}^{L} K_l$$

angle vectors in the L angle vector sets. In addition, the L groups of angle vectors may be arranged in a predefined order. For example, the L groups of angle vectors respectively corresponding to the L groups of ports are arranged in ascending or descending order of port group identifiers. Therefore, the index may implicitly indicate a correspondence between each group of ports and an angle vector. This is equivalent to indicating a correspondence between each delay vector and an angle vector, and therefore is equivalent to implicitly indicating a plurality of angle-delay pairs.

When any two of the L delay vectors correspond to K same angle vectors, the network device may indicate positions of the K angle vectors in the angle vector set by using an index of a combination of the K angle vectors. In this case, the index is the same as the index described in Manner 2.

It may be understood that, when indicating the one or more angle vectors corresponding to each delay vector to the terminal device, the network device may implicitly or explicitly indicate the correspondence between each delay vector and an angle vector. The foregoing enumerated implementations show possible implementations that may be used to indicate the correspondence between each delay vector and an angle vector. A an implementation in which the network device indicates a correspondence between each delay vector and an angle vector is not limited in the embodiments.

It may be further understood that, in the plurality of manners enumerated above, if the angle vector set is extended to a plurality of subsets by using an oversampling factor, the network device may select, from one or more subsets, an angle vector corresponding to each delay vector. In this case, the network device may further indicate, by using the fourth indication information or additional signaling, a subset to which the selected angle vector belongs. A specific method in which the network device selects, from one or more subsets, an angle vector corresponding to each delay vector may be implemented by using a method in the conventional technology. For brevity, detailed descriptions of the specific process are omitted herein.

It may be further understood that the foregoing enumerates several possible implementations in which the network device indicates an angle vector corresponding to each delay vector. A manner in which the network device indicates an angle vector corresponding to each delay vector is not limited in the embodiments.

The fourth indication information may be carried in physical layer signaling. The physical layer signaling may include, for example, DCI.

When the delay changes relatively fast, the network device may add the fourth indication information to the DCI, so that the terminal device performs downlink channel measurement based on delay information obtained through latest measurement. Therefore, the terminal device can accurately feed back downlink channel information in time.

Further, the fourth indication information may be jointly encoded with a CSI request, or may be separately encoded with a CSI request.

The fourth indication information may be carried in higher layer signaling. The higher layer signaling may include, for example, a MAC CE message or an RRC message.

When the delay changes relatively slowly, the network device may add the fourth indication information to the MAC CE message or the RRC message. In this way, signaling overheads can be reduced.

It may be understood that the foregoing enumerated signaling used to carry the fourth indication information is merely an example, and is non-limiting. The embodiments do not exclude a possibility that the fourth indication information is carried in other signaling.

In an embodiment, the K angle vectors and the L delay vectors may be obtained through uplink channel measurement. Because of delay reciprocity between uplink and downlink channels, the network device may precode a downlink reference signal based on a delay vector determined through uplink channel measurement, so that the terminal device performs channel estimation based on a precoded reference signal. In addition, there is angle reciprocity between the uplink and downlink channels. Therefore, the network device may indicate the angle vector to the terminal device by using signaling, so that the terminal device can process a channel estimation value based on the pre-obtained angle vector, to determine a weighting coefficient that corresponds to an angle-delay pair and that can be used to construct a precoding matrix. Therefore, downlink channel measurement is performed by using an angle and a delay that are reciprocal on the uplink and downlink channels, so that feedback overheads of the terminal device are reduced, and calculation complexity of the terminal device is reduced.

Step 530: The terminal device may generate third indication information based on the preconfigured angle vectors and the received precoded reference signals, where the third indication information may be used to indicate P weighting coefficients corresponding to P angle-delay pairs.

After receiving the precoded reference signals from the network device, the terminal device may perform channel estimation on each RB. In addition, after determining the angle vector corresponding to each delay vector, the terminal device may process the received downlink channel estimation value, to determine the P weighting coefficients corresponding to the P angle-delay pairs.

The P angle-delay pairs may be used to construct a precoding matrix that adapts to the downlink channel. The P angle-delay pairs may be determined based on the K angle vectors and the L delay vectors described above. Each angle-delay pair includes one of the K angle vectors and one of the L delay vectors. Angle vectors and/or delay vectors included in any two angle-delay pairs are different.

The following describes in detail a specific process in which the terminal device determines, based on the K angle vectors and the precoded reference signals, the P weighting coefficients corresponding to the P angle-delay pairs.

If precoding on a reference signal is not considered, for each receive antenna, a dimension of a downlink channel may be N×T. A dimension of a downlink channel on one receive antenna and one RB may be 1×T.

As described above, if the network device precodes the reference signals based on the L delay vectors, a real channel seen by the terminal device may be represented as $F^H H_{DL}{}^H$. In this case, a coefficient matrix CDL may be determined by using a calculation formula $C_{DL} = S^H (F^H H_{DL}{}^H)^H$. Each element in the coefficient matrix $C_{DL}$ may be obtained by left-multiplying $S^H$ by a conjugate transpose $(F^H H_{DL}{}^H)^H$ of the real channel $F^H H_{DL}{}^H$ on which frequency domain precoding is performed.

It may be understood from a matrix multiplication operation that, when $S^H$ is left-multiplied by $(F^H H_{DL}{}^H)^H$ a quantity of elements included in each row vector in $(F_H H_{DL}{}^H)^H$ is the same as a quantity of elements included in each column vector in $S^H$. In an embodiment, both the quantity of elements included in each row vector in $(F^H H_{DL}{}^H)^H$ and the quantity of elements included in each column vector in $S^H$ may be T. When the row vector is multiplied by the column vector, summation needs to be performed after each element (for example, a $t^{th}$ element, where t is a value traversed in 1 to T) in the row vector is multiplied by a corresponding element (for example, a $t^{th}$ element, where t is a value traversed in 1 to T) in the column vector. Therefore, after loading an angle vector to a channel estimation value of each RB, the terminal device sums up the channel estimation values of the N RBs obtained by loading a same angle vector, to obtain a weighting coefficient corresponding to the angle vector.

It may be understood that a relationship between a space-frequency matrix $H_{DL}$ and a channel matrix shown is merely an example. Different definition manners may cause changes of the relationship between a space-frequency matrix and a channel matrix. However, regardless of a definition, only internal implementation of the network device and that of the terminal device are affected. Internal implementation behavior of the network device and that of the terminal device are not limited in the embodiment. If the network device precodes, based on each of the L delay vectors, reference signals carried on a same RB, precoded reference signals carried on the RB may correspond to L×T ports, in other words, L groups of ports. Each group of ports includes T ports. Each group of ports corresponds to one of the L delay vectors.

In an implementation, the terminal device may determine, based on a downlink channel estimation value obtained through estimation based on a precoded reference signal that is received on each receive antenna and that corresponds to each group of ports, a weighting coefficient corresponding to each angle-delay pair.

The terminal device may determine, based on downlink channel estimation values that are received on the N RBs and that correspond to a same group of ports, a downlink channel estimation value corresponding to each group of ports. For example, for an $l^{th}$ group of ports, a downlink channel estimation value may be a vector whose dimension is 1×T, for example, denoted as $y^{(l)}$.

For the $k^{th}$ angle vector $a(\theta_k)$ in the K angle vectors, the terminal device may determine a weighting coefficient $\alpha_{k,l}$, corresponding to an angle-delay pair formed by the $k^{th}$ angle vector and the $l^{th}$ delay vector. The weighting coefficient $\alpha_{k,l}$ may also be determined by using a calculation formula $\alpha_{k,l}=(a(\theta_k))^H(y^{(l)})^H$.

Actually, the K angle vectors may be K angle vectors corresponding to each of the L delay vectors, or may be a universal set of one or more delay vectors corresponding to each of the L delay vectors. In other words, for the $K_l^{th}$ angle vector $a(\theta_{k_l})$ in the K angle vectors corresponding to the $l^{th}$ delay vector, the terminal device may determine a weighting coefficient $\alpha_{k_l,l}$ corresponding to an angle-delay pair formed by the $l^{th}$ delay vector and the $K_l^{th}$ angle vector. The weighting coefficient $\alpha_{k_l,l}$ may also be determined by using a calculation formula $\alpha_{k_l,l}=(a(\theta_{k_l}))^H (y^{(l)})^H$.

It may be understood that the foregoing enumerated method for determining a weighting coefficient corresponding to each angle-delay pair and the calculation formula are merely examples, and are non-limiting. In addition, different angle vector definitions may cause changes of the calculation formula. A specific form of each vector is not limited in the embodiments. Therefore, a vector operation manner is not limited either.

In another implementation, the terminal device may determine, based on a downlink channel estimation value obtained through estimation based on a precoded reference signal received on each receive antenna and each RB, a weighting coefficient corresponding to each angle-delay pair.

The terminal device performs channel estimation based on precoded reference signals obtained through precoding based on the $l^{th}$ delay vector, and a dimension of an obtained downlink channel estimation value y m may still be 1×T. It is assumed that an estimation value obtained by the terminal device by performing channel estimation on an $n^{th}$ RB in the N RBs based on the precoded reference signals obtained through precoding based on the $l^{th}$ delay vector is denoted as $y_n^{(l)}$, and a dimension of the estimation value is also I× T. In this case, the terminal device may determine, based on the $k^{th}$ angle vector in the K angle vectors and the N downlink channel estimation values obtained through estimation on the N RBs, a weighting coefficient $\alpha_{k,l}$ corresponding to an angle-delay pair formed by the $l^{th}$ delay vector and the $k^{th}$ angle vector. The weighting coefficient $\alpha_{k,l}$ may also be determined by using a calculation formula $$\alpha_{k,l} = \sum_{n=1}^{N}(a(\theta_k))^H(y_n^{(l)})^H.$$

Actually, the K angle vectors may be K angle vectors corresponding to each of the L delay vectors, or may be a universal set of one or more delay vectors corresponding to each of the L delay vectors. In other words, for the $K_l^{th}$ angle vector $a(\theta_{k_l})$ in the K angle vectors corresponding to the $l^{th}$ delay vector, the terminal device may determine a weighting coefficient $\alpha_{k_l,l}$ corresponding to an angle-delay pair formed by the $l^{th}$ delay vector and the $K_l^{th}$ angle vector. The weighting coefficient $\alpha_{k_l,l}$ may also be determined by using a calculation formula $$\alpha_{k_l,l} = \sum_{n=1}^{N}(a(\theta_{k_l}))^H(y_n^{(l)})^H.$$

It may be understood that the foregoing enumerated method for determining a weighting coefficient corresponding to each angle-delay pair and the calculation formula are merely examples, and are non-limiting. In addition, different angle vector definitions may cause changes of the calculation formula. A specific form of each vector is not limited in the embodiments. Therefore, a vector operation manner is not limited either.

It may be noted that a method for determining a weighting coefficient corresponding to each angle-delay pair when precoded reference signals carried on each RB correspond to L groups of ports is shown above only for ease of understanding. The precoded reference signals carried on each RB may alternatively be obtained based on different delay vectors. For example, the precoded reference signals carried on each RB may be obtained by using an example described above with reference to FIG. 6. In other words, the precoded reference signals carried on each RB may alternatively be at least partially different. In this case, the terminal device may still perform, according to the foregoing method, channel estimation on the plurality of RBs based on the precoded reference signals corresponding to each group of ports, to obtain the plurality of channel estimation values, and further determine the P weighting coefficients corresponding to the P angle-delay pairs.

The precoded reference signals carried on the RBs may alternatively be transmitted through different transmit antenna ports based on a same delay vector. In other words, precoded reference signals carried on at least two RBs are transmitted through different transmit antenna ports. In this case, the groups of ports may include different quantities of ports. However, the terminal device may still perform, according to the foregoing method, channel estimation on the plurality of RBs based on the precoded reference signals corresponding to each group of ports, to obtain the plurality of channel estimation values, and further determine the P weighting coefficients corresponding to the P angle-delay pairs.

According to the foregoing enumerated method, the terminal device may determine the P weighting coefficients corresponding to the P angle-delay pairs. Then, the terminal device may generate the third indication information to indicate the P weighting coefficients.

A method in which the terminal device indicates the P weighting coefficients by using the third indication information may be similar to the specific method in which the terminal device indicates the P weighting coefficients by using the first indication information in the foregoing method 200. For brevity, details are not described herein again.

It may be noted that a specific process in which the terminal device generates the first indication information is described in detail above by using a transmit antenna and a receive antenna in one polarization direction as an example. In other words, the P weighting coefficients may be determined based on a precoded reference signal that is sent by a transmit antenna in one polarization direction and that is received by one receive antenna.

When a plurality of receive antennas are configured for the terminal device, one receive antenna described above as an example may be any one of the plurality of receive antennas configured for the terminal device. In other words, the terminal device may determine the P weighting coefficients for each receive antenna according to the foregoing method.

When transmit antennas in a plurality of polarization directions are configured for the network device, the polarization direction described above as an example may be any one of the plurality of polarization directions. In other words, the terminal device may determine, according to the foregoing method, the P weighting coefficients based on a precoded reference signal sent for a transmit antenna in each polarization direction.

If a quantity of polarization directions is 1, and a quantity of receive antennas is R, where R>1, and R is an integer, the third indication information may be used to indicate R groups of weighting coefficients corresponding to the R receive antennas, and each group of weighting coefficients may include P weighting coefficients. Herein, P weighting coefficients corresponding to one receive antenna are P weighting coefficients determined based on a precoded reference signal received on the receive antenna.

Content in the first indication information in this case has been described in detail in the foregoing method 200. In this case, specific content in the third indication information may be similar to the specific content in the first indication information. For brevity, details are not described herein again.

If a quantity of receive antennas is 1, and a quantity of polarization directions is J, where J>1, and J is an integer, the third indication information may be used to indicate J groups of weighting coefficients corresponding to the J polarization directions, and each group of weighting coefficients may include P weighting coefficients. Herein, P weighting coefficients corresponding to one polarization direction are P weighting coefficients determined based on a precoded reference signal transmitted in the polarization direction.

Content in the first indication information in this case has been described in detail in the foregoing method 200. In this case, specific content in the third indication information may be similar to the specific content in the first indication information. For brevity, details are not described herein again.

If a quantity of receive antennas is R, and a quantity of polarization directions is J, the third indication information may be used to indicate J×R groups of weighting coefficients corresponding to the J polarization directions and the R receive antennas, and each group of weighting coefficients may include P weighting coefficients.

Content in the first indication information in this case has been described in detail in the foregoing method 200. In this case, specific content in the third indication information may be similar to the specific content in the first indication information. For brevity, details are not described herein again.

In addition, when a weighting coefficient is fed back based on a receive antenna, the terminal device may further indicate a quantity of receive antennas. The method 500 may further include: The terminal device may send seventh indication information, where the seventh indication information is used to indicate a quantity of receive antennas. Correspondingly, the network device may receive the seventh indication information.

The seventh indication information and the first indication information may be sent by using same signaling, for example, a PMI or CSI, or may be sent by using different signaling.

It may be understood that the quantity of receive antennas of the terminal device may alternatively be predefined, for example, defined in a protocol. In this case, the terminal device may not indicate the quantity of receive antennas by using additional signaling.

The terminal device may feed back a downlink channel measurement result based on each receive antenna, or the terminal device may feed back a downlink channel measurement result based on a transport layer.

In an embodiment, after determining, according to the foregoing method, a weighting coefficient corresponding to each polarization direction and each receive antenna, the terminal device may further process the weighting coefficient, to obtain a weighting coefficient fed back based on each transport layer.

In the foregoing method 200, a method in which the terminal device determines P weighting coefficients corresponding to each transport layer is described in detail, and a method in which the terminal device indicates, by using the first indication information, a weighting coefficient corresponding to each transport layer is also described in detail. In an embodiment, a method in which the terminal device determines P weighting coefficients corresponding to each transport layer and a specific method for indicating, by using the third indication information, P weighting coefficients corresponding to each transport layer may be similar to the foregoing methods. For brevity, details are not described herein again.

When a weighting coefficient is fed back based on a transport layer, the terminal device may further indicate a quantity of transport layers. The method 500 may further include: The terminal device sends eighth indication information, where the eighth indication information may used to indicate a quantity of transport layers. Correspondingly, the network device may receive the eighth indication information.

The eighth indication information may be an RI.

It may be understood that the RI is merely an example of the eighth indication information, and is non-limiting.

It may be further understood that the eighth indication information and the first indication information may be sent by using same signaling, for example, CSI, or may be sent by using different signaling.

It may be further understood that the foregoing enumerated method for constructing a coefficient matrix and performing SVD on the coefficient matrix to determine a weighting coefficient corresponding to each transport layer is merely an example, and is non-limiting.

Step 540: The terminal device sends the third indication information.

Correspondingly, the network device receives the third indication information.

It may be understood that a specific process of step 540 is the same as that of step 240 in the method 200. Because step 240 has been described in detail in the foregoing method 200, for brevity, details are not described herein again.

Step 550: The network device determines the precoding matrix based on the third indication information.

As described above, the terminal device may feed back a weighting coefficient based on a receive antenna, or may feed back a weighting coefficient based on a transport layer. The network device may determine the precoding matrix based on different feedback granularities and the third indication information.

If the terminal device feeds back a weighting coefficient based on a receive antenna, the weighting coefficients indicated by the third indication information may include weighting coefficients corresponding to one or more receive antennas. The network device may reconstruct the downlink channel based on the weighting coefficient corresponding to each receive antenna and the angle-delay pair corresponding to each weighting coefficient, to further determine the precoding matrix corresponding to each RB.

The P weighting coefficients corresponding to each receive antenna may be in a one-to-one correspondence with the P angle-delay pairs. Because no space domain precoding is performed on a reference signal, the network device may construct, based on the P weighting coefficients corresponding to each receive antenna and one or more angle vectors that are included in the P angle-delay pairs and that correspond to each delay vector, a space-frequency matrix corresponding to each receive antenna.

In an embodiment, a space-frequency matrix corresponding to an $r^{th}$ receive antenna may be determined by using P angle-delay pairs corresponding to the $r^{th}$ receive antenna and P weighting coefficients corresponding to the $r^{th}$ receive antenna. The P angle-delay pairs may be used to construct P space-frequency component matrices. As described above, a space-frequency component matrix $a(\theta_{k_l}) \times b(\tau_l)^H$ may be constructed by using the $l^{th}$ delay vector $b(z)$ in the L delay vectors and the $k_l^{th}$ angle vector $a(\theta_{k_l})$ in the $K_l$ angle vectors corresponding to the $l^{th}$ delay vector. The space-frequency matrix $H_{DL}^{(r)}$ corresponding to the $r^{th}$ receive antenna may be a weighted sum of the P space-frequency component matrices. In other words, $$H_{DL}^{(r)} = \sum_{l=1}^{L} \sum_{k_l=1}^{K_l} \alpha_{l,k_l}^{(r)} a(\theta_{k_l}) \times b(\tau_l)^H.$$

Herein, $\alpha_{l,k_l}^{(r)}$ represents a weighting coefficient that is fed back based on the $r^{th}$ receive antenna and that corresponds to the angle-delay pair formed by the $l^{th}$ delay vector and the $k_l^{th}$ angle vector corresponding to the $l^{th}$ delay vector. A dimension of the space-frequency matrix may be T×N.

It may be noted that, for ease of understanding, the foregoing may use one polarization direction of the transmit antenna as an example to describe a specific process of determining a space-frequency matrix corresponding to the receive antenna. When the quantity of polarization directions of the transmit antenna is greater than 1, the network device may still determine, according to the foregoing method, the space-frequency matrix corresponding to each receive antenna.

If the quantity of polarization directions is 2, the space-frequency matrix corresponding to the $r^{th}$ receive antenna may be determined by using the following calculation formula:

$$H_{DL}^{(r)} = \begin{bmatrix} \sum_{l=1}^{L} \sum_{k_l=1}^{K_l} \alpha_{l,k_l,1}^{(r)} a(\theta_{k_l}) \times b(\tau_l)^H \\ \sum_{l=1}^{L} \sum_{k_l=1}^{K_l} \alpha_{l,k_l,2}^{(r)} a(\theta_{k_l}) \times b(\tau_l)^H \end{bmatrix}.$$

Herein, $\alpha_{l,k_l,1}^{(r)}$ represents a weighting coefficient that is fed back based on the $r^{th}$ receive antenna and that corresponds to the angle-delay pair formed by the $l^{th}$ delay vector and the $k_l^{th}$ delay vector corresponding to the $l^{th}$ delay vector in a first polarization direction; and $\alpha_{l,k_l,2}^{(r)}$ represents a weighting coefficient that is fed back based on the $r^{th}$ receive antenna and that corresponds to the angle-delay pair formed by the $l^{th}$ delay vector and the kith delay vector corresponding to the $l^{th}$ delay vector in a second polarization direction.

It may be understood that, when any two of the L delay vectors correspond to K same angle vectors, l in subscripts $k_l$ and $K_l$ in the foregoing calculation formula may be omitted, to be specific, $$H_{DL}^{(r)} = \sum_{l=1}^{L} \sum_{k=1}^{K_l} \alpha_{k,l}^{(r)} a(\theta_k) \times b(\tau_l)^H,$$

and $$H_{DL}^{(r)} = \begin{bmatrix} \sum_{l=1}^{L} \sum_{k=1}^{K} \alpha_{k,l,1}^{(r)} a(\theta_k) \times b(\tau_l)^H \\ \sum_{l=1}^{L} \sum_{k=1}^{K} \alpha_{k,l,2}^{(r)} a(\theta_k) \times b(\tau_l)^H \end{bmatrix}.$$

It may be understood that the foregoing calculation formula of the space-frequency matrix $H_{DL}^{(r)}$ that is defined for the two polarization directions is merely an example, and are non-limiting. For example, quantities of delay vectors and/or quantities of angle vectors loaded in different polarization directions may be the same or may be different, and delay vectors and/or angle vectors loaded in different polarization directions may be the same or may be different.

For the R receive antennas, the network device may determine space-frequency matrices $H_{DL}^{(1)}$ to $H_{DL}^{(R)}$ based on the P weighting coefficients corresponding to each receive antenna. Therefore, the network device may determine a downlink channel matrix corresponding to each RB.

For example, for the $n^{th}$ RB in the N RBs, the network device may determine a transpose $(V^{(n)})^T$ of a downlink channel matrix corresponding to the $n^{th}$ RB. The matrix $(V^{(n)})^T$ may be determined by using an $n^{th}$ column vector in each of the R space-frequency matrices $H_{DL}^{(1)}$ to $H_{DL}^{(R)}$ that are respectively determined based on the R receive antennas. For example, an $n^{th}$ column in $H_{DL}^{(1)}$ is used as a first column in the matrix $(V^{(n)})^T$, a $n^{th}$ column in $H_{DL}^{(2)}$ is used as a second column in the matrix $(V^{(n)})^T$, and by analogy, a $n^{th}$ column in $H_{DL}^{(r)}$ may be used as an $r^{th}$ column in the matrix $(V^{(n)})$. Therefore, the matrix $(V^{(n)})^T$ may be obtained, so that the downlink channel matrix $V^{(n)}$ corresponding to the $n^{th}$ RB can be further determined.

The downlink channel matrix corresponding to each RB may be determined according to the foregoing method.

The network device may further determine, based on the downlink channel matrix corresponding to each RB, the precoding matrix corresponding to each RB. For example, the network device may determine the precoding matrix by performing SVD on the downlink channel matrix or a covariance matrix of the channel matrix, or by performing EVD on the covariance matrix of the downlink channel matrix.

It may be understood that, for a specific manner in which the network device determines a precoding matrix based on a channel matrix, refer to the conventional technology. The manner of determining a precoding matrix is not limited in the embodiments.

It may be further understood that the specific process in which the network device determines a downlink channel matrix based on a space-frequency matrix to determine a precoding matrix is shown above only for ease of understanding. For example, the network device may alternatively directly determine the precoding matrix based on the space-frequency matrix.

If the terminal device feeds back a weighting coefficient based on a transport layer, the weighting coefficients indicated by the third indication information may include weighting coefficients corresponding to one or more transport layers. The network device may construct, based on the weighting coefficient corresponding to each transport layer and one or more angle vectors that are in the P angle-delay pairs and that correspond to each delay vector, a space-frequency matrix corresponding to each transport layer, to further determine the precoding matrix corresponding to each RB.

Because the P weighting coefficients corresponding to each transport layer may be in a one-to-one correspondence with the P angle-delay pairs, the network device may construct, based on the P weighting coefficients corresponding to each transport layer and one or more angle vectors that are in the P angle-delay pairs and that correspond to the delay vector, a space-frequency matrix corresponding to the transport layer.

In an embodiment, a space-frequency matrix $H_{DL}^{(z)}$ corresponding to a $z^{th}$ transport layer may be determined by using P angle-delay pairs and P weighting coefficients corresponding to the $z^{th}$ transport layer. The P angle-delay pairs may be used to construct P space-frequency component matrices. As described above, a space-frequency component matrix $a(\theta_{k_l}) \times b(\tau_l)^H$ may be constructed by using the $l^{th}$ delay vector $b(\tau_l)$ in the L delay vectors and the $k_l^{th}$ angle vector $a(\theta_{k_l})$ in the $K_l$ angle vectors. The space-frequency matrix corresponding to the $z^{th}$ transport layer may be a weighted sum of the P space-frequency component matrices. In other words, $$H_{DL}^{(z)} = \sum_{l=1}^{L} \sum_{k_l=1}^{K_l} \alpha_{l,k_l}^{(z)} a(\theta_{k_l}) \times b(\tau_l)^H,$$

where $\alpha_{l,k_l}^{(z)}$ represents a weighting coefficient that is fed back based on the $z^{th}$ transport layer and that corresponds to the angle-delay pair formed by the $l^{th}$ delay vector and the $k_l^{th}$ angle vector corresponding to the $l^{th}$ delay vector. A dimension of the space-frequency matrix may be T×N.

It may be noted that, for ease of understanding, the foregoing uses one polarization direction of the transmit antenna as an example to describe a specific process of determining a space-frequency matrix corresponding to the receive antenna. When the quantity of polarization directions of the transmit antenna is greater than 1, the network device may still determine, according to the foregoing method, the space-frequency matrix corresponding to each receive antenna.

For example, if the quantity of polarization directions is 2, the space-frequency matrix corresponding to the $r^{th}$ receive antenna may be determined by using the following calculation formula:

$$H_{DL}^{(z)} = \begin{bmatrix} \sum_{l=1}^{L} \sum_{k_l=1}^{K_l} \alpha_{l,k_l,1}^{(z)} a(\theta_{k_l}) \times b(\tau_l)^H \\ \sum_{l=1}^{L} \sum_{k_l=1}^{K_l} \alpha_{l,k_l,2}^{(z)} a(\theta_{k_l}) \times b(\tau_l)^H \end{bmatrix}.$$

Herein, $\alpha_{l,k_l,1}^{(z)}$ represents a weighting coefficient that is fed back based on the $z^{th}$ transport layer and that corresponds to the angle-delay pair formed by the $k^{th}$ angle vector and the $l_k^{th}$ delay vector corresponding to the $k^{th}$ angle vector in the first polarization direction; and $\alpha_{l,k_l,2}^{(z)}$ represents a weighting coefficient that is fed back based on the $z^{th}$ transport layer and that corresponds to the angle-delay pair formed by the $k^{th}$ angle vector and the $l_k^{th}$ delay vector corresponding to the $k^{th}$ angle vector in the second polarization direction.

It may be understood that, when any two of the K angle vectors correspond to L same delay vectors, l in subscripts $k_l$ and $K_l$ in the foregoing calculation formula may be omitted, to be specific, $$H_{DL}^{(z)} = \sum_{l=1}^{L} \sum_{k=1}^{K} \alpha_{k,l}^{(z)} a(\theta_k) \times b(\tau_l)^H,$$

and $$H_{DL}^{(z)} = \begin{bmatrix} \sum_{l=1}^{L} \sum_{k=1}^{K} \alpha_{k,l,1}^{(z)} a(\theta_k) \times b(\tau_l)^H \\ \sum_{l=1}^{L} \sum_{k=1}^{K} \alpha_{k,l,2}^{(z)} a(\theta_k) \times b(\tau_l)^H \end{bmatrix}.$$

It may be understood that the foregoing calculation formula of the space-frequency matrix $H_{DL}^{(z)}$ that is defined for the two polarization directions is merely an example, and is non-limiting. For example, quantities of delay vectors and/or quantities of angle vectors loaded in different polarization directions may be the same or may be different, and delay vectors and/or angle vectors loaded in different polarization directions may be the same or may be different.

For the Z transport layers, the network device may determine, based on the P weighting coefficients corresponding to each transport layer, space-frequency matrices $H_{DL}^{(1)}$ to $H_{DL}^{(Z)}$ corresponding to the transport layers. Therefore, the network device may determine the precoding matrix $W^{(n)}$ corresponding to each RB.

For example, for the $n^{th}$ RB in the N RBs, the network device may first determine a conjugate $(W^{(n)})$ of a precoding matrix $W^{(n)}$ corresponding to the $n^{th}$ RB. The conjugate of the precoding matrix corresponding to the $n^{th}$ RB may be constructed by an $n^{th}$ column vector in each of the Z space-frequency matrices $H_{DL}^{(1)}$ to $H_{DL}^{(Z)}$ that are respectively determined based on the Z transport layers. For example, an $n^{th}$ column in $H_{DL}^{(1)}$ is used as a first column in the downlink channel matrix $(W^{(n)})^*$, an $n^{th}$ column in $H_{DL}^{(2)}$ is used as a second column in the downlink channel matrix $(W^{(n)})^*$, and by analogy, an $n^{th}$ column in $H_{DL}^{(z)}$ is used as a $z^{th}$ column in the downlink channel matrix $(W^{(n)})^*$. Therefore, the matrix $(W^{(n)})^*$ may be obtained, so that the precoding matrix $W^{(n)}$ corresponding to the $n^{th}$ RB can be further determined.

The precoding matrix corresponding to each RB may be determined according to the foregoing method. It may be understood that, only for ease of understanding, the foregoing uses a space-frequency component matrix as an example to describe in detail the specific process in which the network device determines a precoding matrix. Alternatively, the network device may determine P space-frequency component vectors based on the P angle-delay pairs, to further determine the precoding matrix. A person of ordinary skill in the art may construct P space-frequency basic units in different forms based on the P angle-delay pairs, to further determine the precoding matrix.

It may be further understood that the foregoing description is merely an example, and shows a possible implementation in which the network device determines the precoding matrix based on the third indication information. An implementation in which the network device determines the precoding matrix based on the fifth indication information is not limited in the embodiments. Based on a same concept, a person of ordinary skill in the art may perform transform or equivalent replacement on the foregoing enumerated matrix operation.

It may be further understood that the precoding matrix determined above is a precoding matrix corresponding to an RB. Herein, the RB is an example of a frequency domain unit. A precoding matrix corresponding to an RB may be a precoding matrix determined at a granularity of an RB based on a channel matrix corresponding to the RB, or a precoding matrix determined based on a precoded reference signal received on the RB, and may be used to precode data transmitted through the RB. A downlink channel corresponding to an RB may be a downlink channel determined based on a precoded reference signal received on the RB, and may be used to determine a precoding matrix corresponding to the RB.

When a granularity of a frequency domain unit is relatively large, for example, when the frequency domain unit is a subband, a PRG, or a PRB, the network device may determine a precoding matrix for the frequency domain unit based on a precoding matrix corresponding to each RB in each frequency domain unit. A method in which the network device determines, based on a precoding matrix corresponding to each RB in each frequency domain unit, a precoding matrix corresponding to the frequency domain unit has been described in detail in the foregoing method 200. For brevity, details are not described herein again.

It may be further understood that a weighting coefficient that is mentioned above and that corresponds to an angle vector and a delay vector is a weighting coefficient corresponding to an angle-delay pair formed by the angle vector and the delay vector. For example, a weighting coefficient corresponding to the $k^{th}$ angle vector and the $l^{th}$ delay vector is a weighting coefficient corresponding to an angle-delay pair formed by the $k^{th}$ angle vector and the $l^{th}$ delay vector. For brevity, examples are not described one by one herein.

In an embodiment, the network device precodes a downlink reference signal based on a delay determined through uplink channel measurement, so that the terminal device performs downlink channel measurement based on a precoded reference signal. In addition, the network device may indicate, to the terminal device by using signaling, an angle determined through uplink channel measurement, so that the terminal device determines, based on the precoded reference signal and the angle, a weighting coefficient that corresponds to each angle-delay pair and that can be used to construct a precoding matrix. Based on angle reciprocity and delay reciprocity between uplink and downlink channels, the terminal device may not need to determine and feed back a space domain vector and a frequency domain vector (for example, the angle vector and the delay vector described above), but only needs to determine and feed back a weighting coefficient corresponding to each angle-delay pair. Therefore, a downlink channel measurement process performed by the terminal device is simplified, calculation complexity of the terminal device in the channel measurement process is reduced, and feedback overheads of the terminal device are reduced. In addition, a precoding matrix is constructed based on a plurality of space domain vectors and a plurality of frequency domain vectors, so that the precoding matrix determined by the network device can adapt to a downlink channel. This still ensures relatively high feedback precision while reducing the feedback overheads.

It may be understood that a process of performing downlink channel measurement and determining a precoding matrix when a space-frequency matrix is obtained based on a conjugate transpose of a real channel is shown in an embodiment only for ease of understanding. It may be understood that a relationship between the real channel and the space-frequency matrix $H_{DL}$ is not fixed. Different definitions of the space-frequency matrix and the space-frequency component matrix may change the relationship between the real channel and the space-frequency matrix $H_{DL}$. For example, the space-frequency matrix $H_{DL}$ may be obtained based on the conjugate transpose of the real channel, or may be obtained based on a transpose of the real channel.

When the relationship between the space-frequency matrix and the channel matrix is defined differently, operations performed by the network device during delay and angle loading are also different, and operations performed by the terminal device during channel measurement and feedback also correspondingly change. However, these operations are only implementation behavior of the terminal device and the network device, and are non-limiting. The definition of the channel matrix, the dimension and the definition of the space-frequency matrix, and a transform relationship between the channel matrix and the space-frequency matrix are non-limiting. Likewise, a transform relationship between the space-frequency matrix and the precoding matrix are non-limiting.

It may be further understood that sequence numbers of the processes do not mean execution sequences in the foregoing embodiments. The execution sequences of the processes may be determined based on functions and internal logic of the processes, and are non-limiting.

Figure 7:
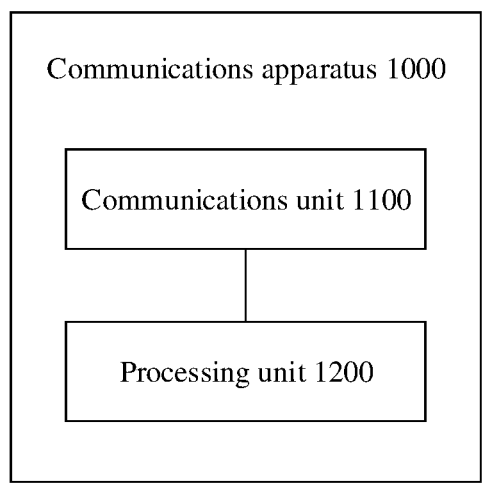
FIG. 7 is a schematic block diagram of a communications apparatus according to an embodiment.
Figure 8:
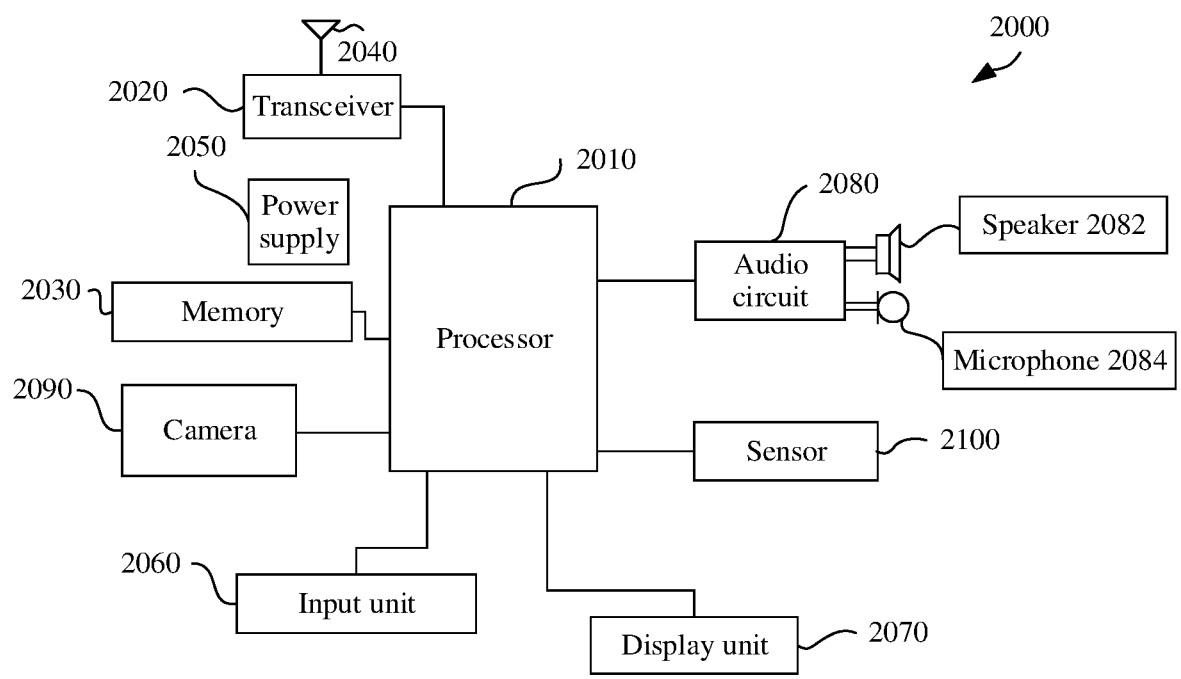
FIG. 8 is a schematic structural diagram of a terminal device according to an embodiment.
Figure 9:
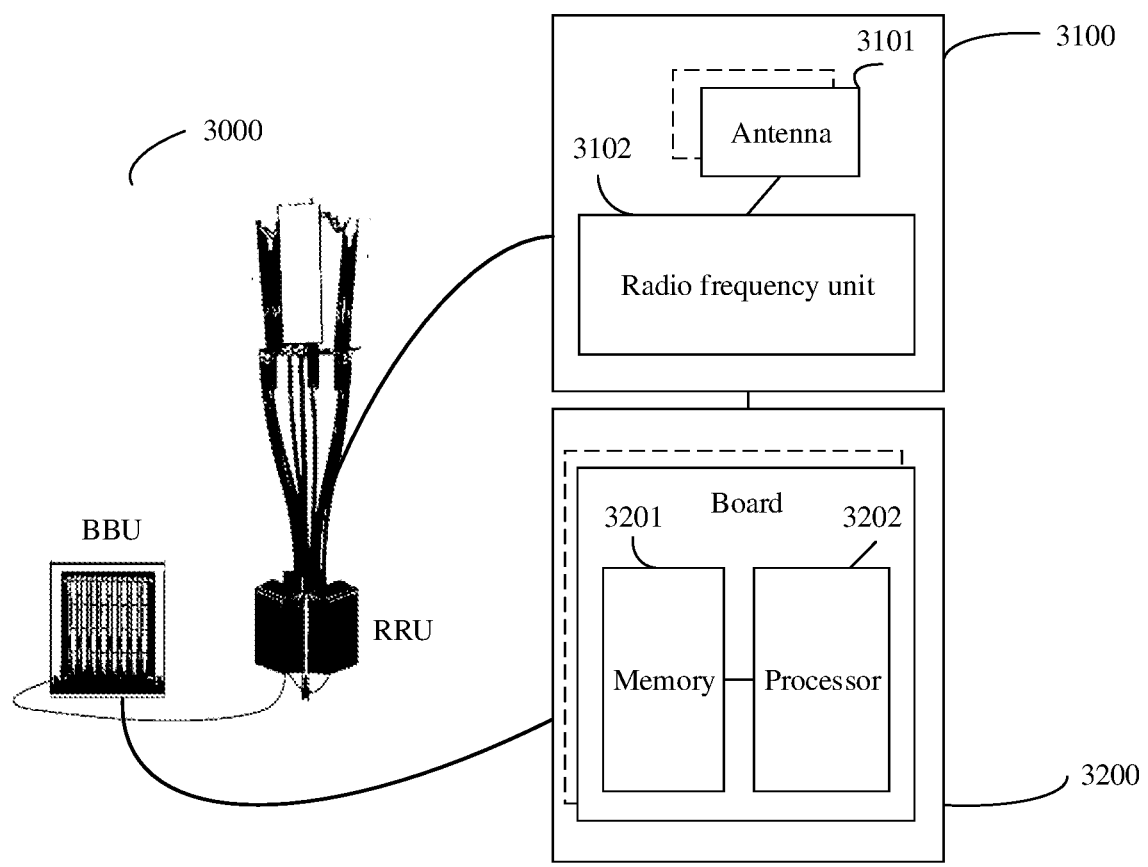
FIG. 9 is a schematic structural diagram of a network device according to an embodiment.

With reference to FIG. 2 to FIG. 6, the foregoing describes in detail the precoding vector indication and determining methods provided in the embodiments. With reference to FIG. 7 to FIG. 9, the following describes in detail communications apparatuses provided in the embodiments.

FIG. 7 is a schematic block diagram of a communications apparatus according to an embodiment. As shown in the figure, the communications apparatus 1000 may include a communications unit 1100 and a processing unit 1200.

In a possible design, the communications apparatus 1000 may correspond to the terminal device in the foregoing method embodiments. For example, the communications apparatus 1000 may be a terminal device, or may be a chip disposed in the terminal device.

The communications apparatus 1000 may correspond to the terminal device in the method 200 or the method 500 in the embodiments. The communications apparatus 1000 may include units configured to perform the method 200 in FIG. 2 or the method 500 in FIG. 5 performed by the terminal device. In addition, the units in the communications apparatus 1000 and the foregoing other operations and/or functions are separately intended to implement corresponding procedures of the method 200 in FIG. 2 or the method 500 in FIG. 5.

When the communications apparatus 1000 is configured to perform the method 200 in FIG. 2, the communications unit 1100 may be configured to perform step 210, step 220, and step 240 in the method 200, and the processing unit 1200 may be configured to perform step 230 in the method 200.

When the communications apparatus 1000 is configured to perform the method 500 in FIG. 5, the communications unit 1100 may be configured to perform step 510, step 520, and step 540 in the method 500, and the processing unit 1200 may be configured to perform step 530 in the method 500.

It may be understood that specific processes in which the units perform the foregoing corresponding steps are described in detail in the foregoing method embodiments. For brevity, details are not described herein again.

It may be further understood that, when the communications apparatus 1000 is a terminal device, the communications unit 1100 in the communications apparatus 1000 may correspond to a transceiver 2020 in a terminal device 2000 shown in FIG. 8, and the processing unit 1200 in the communications apparatus 1000 may correspond to a processor 2010 in the terminal device 2000 shown in FIG. 8.

It may be further understood that, when the communications apparatus 1000 is a chip disposed in a terminal device, the communications unit 1100 in the communications apparatus 1000 may be an input/output interface.

In another possible design, the communications apparatus 1000 may correspond to the network device in the foregoing method embodiments. For example, the communications apparatus 1000 may be a network device, or may be a chip disposed in the network device.

The communications apparatus 1000 may correspond to the network device in the method 200 or the method 500 in the embodiments. The communications apparatus 1000 may include units configured to perform the method 200 in FIG. 2 or the method 500 in FIG. 5 performed by the network device. In addition, the units in the communications apparatus 1000 and the foregoing other operations and/or functions are separately intended to implement corresponding procedures of the method 200 in FIG. 2 or the method 500 in FIG. 5.

When the communications apparatus 1000 is configured to perform the method 200 in FIG. 2, the communications unit 1100 may be configured to perform step 210, step 220, and step 240 in the method 200, and the processing unit 1200 may be configured to perform step 250 in the method 200.

When the communications apparatus 1000 is configured to perform the method 500 in FIG. 5, the communications unit 1100 may be configured to perform step 510, step 520, and step 540 in the method 500, and the processing unit 1200 may be configured to perform step 550 in the method 500.

It may be further understood that, when the communications apparatus 1000 is a network device, the communications unit in the communications apparatus 1000 may correspond to a transceiver 3200 in a network device 3000 shown in FIG. 9, and the processing unit 1200 in the communications apparatus 1000 may correspond to a processor 3100 in the network device 3000 shown in FIG. 9.

It may be further understood that, when the communications apparatus 1000 is a chip disposed in a network device, the communications unit 1100 in the communications apparatus 1000 may be an input/output interface.

FIG. 8 is a schematic structural diagram of a terminal device 2000 according to an embodiment. The terminal device 2000 may be applied to the system shown in FIG. 1, and perform the functions of the terminal device in the foregoing method embodiments. As shown in the figure, the terminal device 2000 includes a processor 2010 and a transceiver 2020. The terminal device 2000 may further include a memory 2030. The processor 2010, the transceiver 2002, and the memory 2030 may communicate with each other through an internal connection path, to transfer a control signal and/or a data signal. The memory 2030 is configured to store computer programs. The processor 2010 is configured to invoke the computer programs in the memory 2030 and run the computer programs, to control the transceiver 2020 to receive or send a signal. The terminal device 2000 may further include an antenna 2040, configured to send, by using a radio signal, uplink data or uplink control signaling that is output by the transceiver 2020.

The processor 2010 and the memory 2030 may be integrated into one processing apparatus. The processor 2010 is configured to execute program code stored in the memory 2030, to implement the foregoing functions. During specific implementation, the memory 2030 may alternatively be integrated into the processor 2010, or may be independent of the processor 2010. The processor 2010 may correspond to the processing unit in FIG. 7.

The transceiver 2020 may correspond to the communications unit in FIG. 7, and may also be referred to as a transceiver unit. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It may be understood that the terminal device 2000 shown in FIG. 8 can implement each process performed by the terminal device in the method embodiment in FIG. 2 or FIG. 5. The operations and/or the functions of the modules in the terminal device 2000 are intended to implement corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments. The transceiver 2020 may be configured to perform an action that is of sending information by the terminal device to the network device or receiving information by the terminal device from the network device and that is described in the foregoing method embodiments. For details, refer to the descriptions in the foregoing method embodiments. Details are not described herein again.

The terminal device 2000 may further include a power supply 2050, configured to supply power to various components or circuits in the terminal device.

In addition, to improve functions of the terminal device, the terminal device 2000 may further include one or more of an input unit 2060, a display unit 2070, an audio circuit 2080, a camera 2090, a sensor 2100, and the like. The audio circuit may further include a speaker 2082, a microphone 2084, and the like.

FIG. 9 is a schematic structural diagram of a network device according to an embodiment, for example, may be a schematic structural diagram of a base station. The base station 3000 may be applied to the system shown in FIG. 1, and perform functions of the network device in the foregoing method embodiments. As shown in the figure, the base station 3000 may include one or more radio frequency units, for example, a remote radio unit (RRU) 3100 and one or more BBU (which may also be referred to as DU) 3200. The RRU 3100 may be referred to as a transceiver unit, and corresponds to the communications unit 1200 in FIG. 7. The transceiver unit 3100 may also be referred to as a transceiver machine, a transceiver circuit, a transceiver, or the like, and may include at least one antenna 3101 and a radio frequency unit 3102. The transceiver unit 3100 may include a receiving unit and a sending unit. The receiving unit may correspond to a receiver (or referred to as a receiver machine or a receiver circuit), and the sending unit may correspond to a transmitter (or referred to as a transmitter machine or a transmitter circuit). The RRU 3100 is mainly configured to: receive and send a radio frequency signal, and perform conversion between a radio frequency signal and a baseband signal. For example, the RRU 3100 is configured to send indication information to a terminal device. The BBU 3200 is mainly configured to: perform baseband processing, control the base station, and the like. The RRU 3100 and the BBU 3200 may be physically disposed together. Alternatively, the RRU 3100 and the BBU 3200 may be physically disposed separately, to be specific, the base station is a distributed base station.

The BBU 3200 is a control center of the base station, may be referred to as a processing unit, may correspond to the processing unit 1100 in FIG. 7, and is mainly configured to implement a baseband processing function, for example, channel coding, multiplexing, modulation, or spreading. For example, the BBU (the processing unit) may be configured to control the base station to perform an operation procedure related to the network device in the foregoing method embodiments, for example, to generate the foregoing indication information.

In an example, the BBU 3200 may include one or more boards, and a plurality of boards may jointly support a radio access network (such as an LTE network) having a single access standard, or may separately support radio access networks (such as an LTE network, a 5G network, or another network) having different access standards. The BBU 3200 further includes a memory 3201 and a processor 3202. The memory 3201 is configured to store a necessary instruction and necessary data. The processor 3202 is configured to control the base station to perform a necessary action, for example, configured to control the base station to perform the operation procedure related to the network device in the foregoing method embodiments. The memory 3201 and the processor 3202 may serve one or more boards. In other words, a memory and a processor may be independently disposed on each board, or a plurality of boards may share a same memory and a same processor. In addition, a necessary circuit may be further disposed on each board.

It may be understood that the base station 3000 shown in FIG. 9 can implement each process performed by the network device in the method embodiment in FIG. 2 or FIG. 5. Operations and/or functions of the modules in the base station 3000 are separately intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the network device and that is described in the foregoing method embodiments. The RRU 3100 may be configured to perform an action that is of sending information by the network device to the terminal device or receiving information by the network device from the terminal device and that is described in the foregoing method embodiments. For details, refer to the descriptions in the foregoing method embodiments. Details are not described herein again.

An embodiment further provides a processing apparatus including a processor and an interface. The processor is configured to perform the communication method in any one of the foregoing method embodiments.

It may be understood that the processing apparatus may be one or more chips. For example, the processing apparatus may be a field programmable gate array (FPGA), an application-specific integrated circuit (ASIC), a system-on-a-chip (SoC), a central processing unit (CPU), a network processor (NP), a digital signal processing circuit (DSP), a micro controller (MCU), a programmable controller (PLD), or another integrated chip.

In an implementation process, the steps in the foregoing methods may be implemented by using a hardware integrated logic circuit in the processor, or by using instructions in a form of software. The steps of the methods disclosed with reference to the embodiments may be directly executed and completed by a hardware processor, or may be executed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It may be noted that the processor in the embodiments may be an integrated circuit chip, and has a signal processing capability. In an implementation process, the steps in the foregoing method embodiments may be implemented by using a hardware integrated logic circuit in the processor, or by using instructions in a form of software. The foregoing processor may be a general-purpose processor, a digital signal processor (DSP), an ASIC, a FPGA or another programmable logic device, a discrete gate or a transistor logic device, or a discrete hardware component. The methods, steps, and logical block diagrams that are disclosed in the embodiments may be implemented or performed. The general-purpose processor may be a microprocessor, or the processor may be any conventional processor or the like. The steps of the methods disclosed with reference to the embodiments may be directly executed and completed by a hardware decoding processor, or may be executed and completed by using a combination of hardware in the decoding processor and a software module. The software module may be located in a mature storage medium in the art, such as a RAM, a flash memory, a ROM, a programmable ROM, an electrically erasable programmable memory, or a register. The storage medium is located in the memory, and the processor reads information in the memory and completes the steps in the foregoing methods in combination with hardware of the processor.

It may be understood that the memory in the embodiments may be a volatile memory or a nonvolatile memory, or may include a volatile memory and a nonvolatile memory. The nonvolatile memory may be a ROM, a programmable ROM, an erasable PROM (EPROM), an electrically EPROM (EEPROM), or a flash memory. The volatile memory may be a RAM, and is used as an external cache. By way of example and not limitation, many forms of RAMs may be used, for example, a static random access memory (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It may be noted that the memories in the systems and methods described include but are not limited to these memories and any memory of another suitable type.

According to the methods provided in the embodiments, a computer program product may be provided. The computer program product may include a computer program code. When the computer program code is run on a computer, the computer is enabled to perform the method according to either of the embodiments shown in FIG. 2 and FIG. 5.

According to the methods provided in the embodiments, a computer-readable medium may be provided. The computer-readable medium may store program code. When the program code is run on a computer, the computer is enabled to perform the method in either of the embodiments shown in FIG. 2 and FIG. 5.

According to the methods provided in the embodiments, a system may be provided. The system may include one or more terminal devices and one or more network devices described above.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, the procedure or functions according to the embodiments are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments correspond to the network device or the terminal device in the method embodiments, and a corresponding module or unit performs a corresponding step. For example, a communications unit (a transceiver) performs a receiving step or a sending step in the method embodiments, and a processing unit (a processor) may perform steps other than the sending step or the receiving step. For a function of a specific unit, refer to a corresponding method embodiment. There may be one or more processors.

The terms such as "component", "module", and "system" used in the embodiments are used to indicate computer-related entities, hardware, firmware, combinations of hardware and software, software, or software that is being executed. For example, a component may be but is not limited to a process that runs on a processor, a processor, an object, an executable file, an execution thread, a program, and/or a computer. As shown in figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system and/or a distributed system, and/or across a network such as the internet interacting with other systems by using the signal).

A person of ordinary skill in the art may be aware that units and algorithm steps in the examples described with reference to the embodiments may be implemented by electronic hardware or a combination of computer software and electronic hardware. Whether the functions are performed by hardware or software depends on particular applications and design constraints of the solutions. A person of ordinary skill in the art may use different methods to implement the described functions for each particular application.

It may be understood by a person of ordinary skill in the art that, for the purpose of convenient and brief description, for a detailed working process of the described system, apparatus, and unit, refer to a corresponding process in the foregoing method embodiments. Details are not described herein again.

In several embodiments, it may be understood that the disclosed system, apparatus, and method may be implemented in other manners. For example, the described apparatus embodiments are merely examples. For example, the division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected according to actual requirements to achieve the objectives of the solutions of the embodiments.

In addition, function units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the solutions, or the part contributing to the conventional technology, or some of the solutions may be implemented in the form of a software product. The computer software product is stored in a storage medium and includes several instructions for instructing a computer device (which may be a personal computer, a server, or a network device) to perform all or some of the steps of the methods described in the embodiments. The foregoing storage medium includes any medium that can store program code, for example, a USB flash drive, a removable hard disk, a ROM, a RAM, a magnetic disk, or an optical disc.

The foregoing descriptions are merely exemplary implementations. Any variation or replacement readily figured out by a person of ordinary skill in the art within the scope disclosed in the embodiments shall fall within the protection scope of the embodiments.

What is claimed is:

1. A channel measurement method, comprising:
receiving precoded reference signals, wherein the precoded reference signals are obtained by precoding reference signals based on K angle vectors but not based on a delay vector;
generating first indication information, wherein the first indication information is used to indicate P weighting coefficients corresponding to P angle-delay pairs, the P weighting coefficients are determined based on the precoded reference signals, each of the P angle-delay pairs comprises one of the K angle vectors and one of one or more delay vectors corresponding to the one angle vector, one or more delay vectors corresponding to each angle vector are preconfigured, and the P angle-delay pairs and the P weighting coefficients corresponding to the P angle-delay pairs are used to determine a precoding matrix, wherein both K and P are positive integers; and
sending the first indication information.

2. The method according to claim 1, further comprising:
receiving second indication information, wherein the second indication information is used to indicate the one or more delay vectors corresponding to each of the K angle vectors.

3. The method according to claim 2, wherein the second indication information comprises K bitmaps, a $k^{th}$ bitmap in the K bitmaps is used to indicate $L_k$ delay vectors that are in a delay vector set and that correspond to a $k^{th}$ angle vector in the K angle vectors, and the delay vector set comprises a plurality of delay vectors, wherein $L_k \geq 1$, and $L_k$ is an integer.

4. The method according to claim 2, wherein the second indication information comprises K indexes, a $k^{th}$ index in the K indexes is an index, in a delay vector set, of a combination of $L_k$ delay vectors corresponding to a $k^{th}$ angle vector in the K angle vectors, and the delay vector set comprises a plurality of delay vectors, wherein $L_k \geq 1$, and $L_k$ is an integer.

5. The method according to claim 4, wherein the second indication information is further used to indicate a quantity of delay vectors corresponding to each angle vector.

6. The method according to claim 2, wherein the second indication information is used to indicate an index of a combination of the P angle-delay pairs.

7. The method according to claim 1, wherein in the K angle vectors and one or more delay vectors corresponding to a first angle vector are the same as one or more delay vectors corresponding to a second angle vector, and the first angle vector and the second angle vector are any two angle vectors in the K angle vectors.

8. The method according to claim 1, wherein the K angle vectors and the one or more delay vectors corresponding to each angle vector are determined through uplink channel measurement.

9. The method according to claim 1, wherein the P weighting coefficients comprise one or more weighting coefficients fed back for each of the K angle vectors; and for the $k^{th}$ angle vector in the K angle vectors, the first indication information is used to indicate $L_k$ weighting coefficients, the $L_k$ weighting coefficients correspond to $L_k$ angle-delay pairs in the P angle-delay pairs, and each of the $L_k$ angle-delay pairs comprises the $k^{th}$ angle vector and one of the $L_k$ delay vectors corresponding to the $k^{th}$ angle vector, wherein $L_k \geq 1$, and $L_k$ is an integer.

10. The method according to claim 1, wherein the P weighting coefficients correspond to one receive antenna or one transport layer.

11. A channel measurement method, comprising:
sending precoded reference signals, wherein the precoded reference signals are obtained by precoding reference signals based on K angle vectors but not based on a delay vector;
receiving first indication information, wherein the first indication information is used to indicate P weighting coefficients corresponding to P angle-delay pairs, the P weighting coefficients are determined based on the precoded reference signals, each of the P angle-delay pairs comprises one of the K angle vectors and one of one or more delay vectors corresponding to the one angle vector, one or more delay vectors corresponding to each angle vector are preconfigured, and the P angle-delay pairs and the P weighting coefficients corresponding to the P angle-delay pairs are used to determine a precoding matrix, wherein both K and P are positive integers; and
determining the precoding matrix based on the first indication information.

12. The method according to claim 11, further comprising:
sending second indication information, wherein the second indication information is used to indicate the one or more delay vectors corresponding to each of the K angle vectors.

13. The method according to claim 12, wherein the second indication information comprises K bitmaps, a $k^{th}$ bitmap in the K bitmaps is used to indicate $L_k$ delay vectors that are in a delay vector set and that correspond to a $k^{th}$ angle vector in the K angle vectors, and the delay vector set comprises a plurality of delay vectors, wherein $L_k \geq 1$, and $L_k$ is an integer.

14. The method according to claim 12, wherein the second indication information comprises K indexes, a $k^{th}$ index in the K indexes is an index, in a delay vector set, of a combination of $L_k$ delay vectors corresponding to a $k^{th}$ angle vector in the K angle vectors, and the delay vector set comprises a plurality of delay vectors, wherein $L_k \geq 1$, and $L_k$ is an integer.

15. The method according to claim 14, wherein the second indication information is further used to indicate a quantity of delay vectors corresponding to each angle vector.

16. The method according to claim 12, wherein the second indication information is used to indicate an index of a combination of the P angle-delay pairs.

17. The method according to claim 11, wherein in the K angle vectors, one or more delay vectors corresponding to a first angle vector are the same as one or more delay vectors corresponding to a second angle vector, and the first angle vector and the second angle vector are any two angle vectors in the K angle vectors.

18. The method according to claim 11, wherein the K angle vectors and the one or more delay vectors corresponding to each angle vector are determined through uplink channel measurement.

19. The method according to claim 11, wherein the P weighting coefficients comprise one or more weighting coefficients fed back for each of the K angle vectors; and for the $k^{th}$ angle vector in the K angle vectors, the first indication information is used to indicate $L_k$ weighting coefficients, the $L_k$ weighting coefficients correspond to $L_k$ angle-delay pairs in the P angle-delay pairs, and each of the $L_k$ angle-delay pairs comprises the $k^{th}$ angle vector and one of the $L_k$ delay vectors corresponding to the $k^{th}$ angle vector, wherein $L_k \geq 1$, and $L_k$ is an integer.

20. The method according to claim 11, wherein the P weighting coefficients correspond to one receive antenna or one transport layer.

* * * * *